United States Patent
Fukuda

(10) Patent No.: US 9,541,627 B2
(45) Date of Patent: Jan. 10, 2017

(54) DATA PROCESSING SYSTEM

(71) Applicant: Michitaka Fukuda, Kanagawa (JP)

(72) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 211 days.

(21) Appl. No.: 14/049,315

(22) Filed: Oct. 9, 2013

(65) Prior Publication Data

US 2014/0106777 A1    Apr. 17, 2014

(30) Foreign Application Priority Data

Oct. 12, 2012  (JP) ................................ 2012-226947
May 28, 2013  (JP) ................................ 2013-112081

(51) Int. Cl.
  *G01S 5/00*  (2006.01)
  *G06Q 10/08*  (2012.01)
  (Continued)

(52) U.S. Cl.
  CPC ............ G01S 5/0027 (2013.01); G01S 1/68 (2013.01); G01S 5/0252 (2013.01);
  (Continued)

(58) Field of Classification Search
  CPC ............ H04W 4/02; H04W 4/04; H04W 4/20; H04W 8/20; H04W 8/04; H04W 8/06; H04W 8/10; H04W 8/12; H04W 8/18; H04W 8/30; H04W 24/04; H04W 68/02; H04W 92/14; H04W 36/32; H04W 68/00; H04W 68/08; H04W 16/00; H04W 16/02; H04W 16/04; H04W 16/06; H04W 16/10; H04W 16/12; H04W 16/28; H04W 48/10; G01C 21/206; G01S 1/68; G01S 5/0027; G01S 5/0252; G01S 5/0263; G01S 19/48; G06Q 10/0875
  (Continued)

(56) References Cited

U.S. PATENT DOCUMENTS 5,710,972 A * 1/1998 Lin ............................... 455/525
8,249,914 B2    8/2012 Umeda
(Continued)

FOREIGN PATENT DOCUMENTS

| JP | 2005-158007 | 6/2005 |
|---|---|---|
| JP | WO 2005/086375 | 9/2005 |
| JP | 2012-145457 | 8/2012 |

OTHER PUBLICATIONS

U.S. Appl. No. 13/919,232, filed Jun. 17, 2013.
(Continued)

*Primary Examiner* — Michael Mapa
(74) *Attorney, Agent, or Firm* — IPUSA, PLLC

(57) ABSTRACT

A data processing system includes a distribution apparatus and a communication terminal. The distribution apparatus includes a distribution unit that distributes a wireless signal containing unique data unique to the distribution apparatus. The communication terminal receives the wireless signal distributed by the distribution apparatus. A position data indicating a position of the distribution apparatus and a predetermined threshold value pertaining to a signal strength of the wireless signal received by the communication terminal are identifiable based on the unique data. The communication terminal includes a determination unit that determines whether to indicate that a current position of the communication terminal is the position data by referring to the predetermined threshold value.

1 Claim, 47 Drawing Sheets

(51) Int. Cl.
  *G01S 5/02* (2010.01)
  *G01S 1/68* (2006.01)
  *G01S 19/48* (2010.01)
(52) U.S. Cl.
  CPC ........ *G06Q 10/0875* (2013.01); *G01S 5/0263* (2013.01); *G01S 19/48* (2013.01)
(58) Field of Classification Search
  USPC ............... 455/414.2, 433, 440, 448, 450, 451,455/452.1, 464, 456.1–457; 359/214.1
  See application file for complete search history.

(56) References Cited

U.S. PATENT DOCUMENTS

| | | | |
|---|---|---|---|
| 8,280,398 B2 | 10/2012 | Ishii et al. | |
| 8,350,758 B1* | 1/2013 | Parvizi et al. | 342/452 |
| 8,618,978 B2* | 12/2013 | Torimoto et al. | 342/357.31 |
| 9,060,341 B2* | 6/2015 | Karr et al. | |
| 2004/0172190 A1* | 9/2004 | Tsunehara | G01S 5/0257 701/408 |
| 2008/0101277 A1* | 5/2008 | Taylor | G01S 5/0289 370/328 |
| 2010/0248640 A1* | 9/2010 | MacNaughtan | H04W 4/02 455/67.11 |
| 2011/0257885 A1* | 10/2011 | Tuck et al. | 701/214 |
| 2012/0135777 A1* | 5/2012 | Karpoor | H04W 52/40 455/522 |
| 2012/0315918 A1* | 12/2012 | Kadous | 455/456.1 |
| 2013/0090106 A1* | 4/2013 | Mathews | 455/418 |
| 2013/0244697 A1 | 9/2013 | Kusakari et al. | |

OTHER PUBLICATIONS

U.S. Appl. No. 13/864,554, filed Apr. 17, 2013.
U.S. Appl. No. 13/923,596, filed Jun. 21, 2013.
U.S. Appl. No. 13/893,522, filed May 14, 2013.

\* cited by examiner

FIG.6

| FL. NO. | LATITUDE | LONGITUDE | BLDG. NO. |
|---------|----------|-----------|-----------|
| 16 | 35.459555 | 139.387110 | C |

FIG.8

| FL. NO.<br>9bit | LATITUDE<br>21bit | LONGITUDE<br>21bit | BLDG. NO.<br>8bit |
|---|---|---|---|

FIG.9

| TRANSMISSION<br>DESTINATION | TRANSMISSION<br>SOURCE | DATA CONTENT |
|---|---|---|

FIG.13

| TERMINAL IDENTIFICATION DATA A | DEVICE NAME | OWNER NAME (ADMINISTRATOR NAME) | POSITION DATA X ||||  | RECEPTION DATE/TIME |
|---|---|---|---|---|---|---|---|
| | | | LATITUDE | LONGITUDE | FL. NO. | BLDG. NO. | |
| 002673abcd01 | PJ WX4310 | SALES DEPT. 1 | 35.459555 | 139.387110 | 16 | C | 11/12/12 13:30:01 |
| 002673abcd02 | UCS P3000 | SALES DEPT. 2 | 35.459483 | 139.388437 | 4 | A | 11/12/12 13:30:03 |
| ... | ... | ... | ... | ... | ... | ... | ... |

FIG.24

| SEARCH SCREEN | | |
|---|---|---|
| OWNER NAME | DEVICE NAME | |
| SALES DEPT. 1 | PJ WX4310 | |
| | UCS P3000 | |
| | ... | ... |
| SALES DEPT. 2 | PJ WX3231N No.1 | |
| | PJ WX3231N No.2 | |
| | PJ WX3231N No.3 | |

EXECUTE SEARCH

FIG.26

| Bit | SIGNAL STRENGTH THRESHOLD (dBHz) |
|---|---|
| 00 | 35 |
| 01 | 40 |
| 10 | 45 |
| 11 | 50 |

FIG.27

| LATITUDE | LONGITUDE | FL. NO. | BLDG. NO. | SIGNAL STRENGTH THRESHOLD (dBHz) |
|---|---|---|---|---|
| 35.459500-35.459599 | 139.387100-139.387199 | 16 | C | 40 |
| 35.459500-35.459599 | 139.388400-139.388499 | 4 | A | 35 |
| 35.459500-35.459599 | 139.389000-139.389099 | 5 | B | 45 |
| : | : | : | : | : |

FIG.31

| APPARATUS IDENTIFICATION DATA B | LATITUDE | LONGITUDE | FL. NO. | BLDG. NO. | TRANSMISSION OUTPUT (dBm) | SIGNAL STRENGTH THRESHOLD (dBHz) |
|---|---|---|---|---|---|---|
| 21.17.10.10 | 35.459555 | 139.387110 | 16 | C | −70 | 40 |
| 21.17.10.11 | 35.459583 | 139.388437 | 4 | A | −80 | 35 |
| 21.17.10.12 | 35.459550 | 139.389050 | 5 | B | −75 | 45 |
| .. | .. | .. | .. | .. | .. | .. |

POSITION DATA X: {LATITUDE, LONGITUDE, FL. NO., BLDG. NO.}

FIG.42

| MID | Frame Length (words) | Contents | Maximum Repetition Cycle(s) (PROVISIONAL) |
|---|---|---|---|
| 0 | 3 | Position 1 | 12 |
| 1 | 4 | Position 2 | |
| 2 | — | reserved | — |
| 3 | 1 | Short ID | — |
| 4 | 2 | Medium ID | — |
| 5 | — | Reserved | — |
| 6 | — | Reserved | — |
| 7 | — | Reserved | — |

FIG.43

| APPARATUS IDENTIFICATION DATA B | POSITION DATA X | | | | SIGNAL STRENGTH THRESHOLD T (dBHz) |
|---|---|---|---|---|---|
| | LATITUDE | LONGITUDE | FL. NO. | BLDG. NO. | |
| 1123456789a0 | 35.459500 | 139.387100 | 16 | C | 40 |
| 1123456789a1 | 35.459500 | 139.388400 | 4 | A | 35 |
| 1123456789a2 | 35.459500 | 139.389000 | 5 | B | 45 |
| .. | .. | .. | .. | .. | .. |

FIG.47

| IDENTIFICATION DATA Z | POSITION DATA X ||||| SIGNAL STRENGTH THRESHOLD T (dBHz) |
| | LATITUDE | LONGITUDE | FL. NO. | BLDG. NO. | |
| --- | --- | --- | --- | --- | --- |
| ff0 | 35.4595000 | 139.387100 | 16 | C | 40 |
| ff1 | 35.4595000 | 139.388400 | 4 | A | 35 |
| ff2 | 35.4595000 | 139.389000 | 5 | B | 45 |
| .. | .. | .. | .. | .. | .. |

DATA PROCESSING SYSTEM

BACKGROUND OF THE INVENTION

1. Field of the Invention

The present invention relates to a data processing system, a data processing method, and a computer-readable recording medium.

2. Description of the Related Art

Conventionally, the position of a communication terminal of a user is identified by using a GPS (Global Positioning System). With the GPS, wireless signals indicating time are transmitted from approximately 30 GPS satellites orbiting the earth. Then, a communication terminal located on earth uses its receiver to receive the wireless signals and calculates the difference between the time in which the wireless signals are transmitted from the GPS satellites and the time in which the wireless signals from the GPS satellites are received by the receiver of the communication terminal. The communication terminal performs the calculation with respect to at least 4 GPS satellites and identifies its position on earth based on the result of the calculation.

In recent years, size and power consumption of the receiver used for GPS communication are becoming smaller. For example, a GPS receiver is installed in a small battery-powered communication terminal such as a mobile phone.

However, with the GPS, it is difficult for the wireless signals of the GPS to reach a communication terminal located indoors. Therefore, another system is desired for indoor positioning. One example of such system is IMES (Indoor MEssaging System).

A distribution apparatus, which distributes wireless signals by using IMES, can distribute the wireless signals with the same electric waveform as the electric waveform of the wireless signals transmitted by GPS satellites. Therefore, the communication terminals that receive the wireless signals can use the same reception hardware (hardware used for reception) as the reception hardware used for GPS communication. Further, reception software (software used for reception) used for GPS communication can also be used by slightly modifying the reception software. Because position data indicating the position of the IMES distribution apparatus is distributed instead of distributing time data (data indicating time), the communication terminal that receives the wireless signals simply needs to receive the position data and does not need to calculate time difference unlike outdoor positioning.

For example, Japanese Laid-Open Patent Publication No. 2012-145457 discloses a method dedicated to measuring the walking movement of a person. That is, the disclosed method measures the position/direction of a pedestrian by using a sensor(s) (e.g., acceleration sensor, gyro sensor, magnetometric sensor, temperature sensor, barometric pressure sensor) installed in a communication terminal. This method is also referred to as a PDR (Pedestrian Dead Reckoning) method.

By combining an autonomous position measuring method using IMES and a relative position measuring method using PDR, a communication terminal installed with an IMES receiver can obtain current position data at any place of an indoor area. In a case where there is a significant error in the relative position data obtained by the relative position measuring method, it may become necessary to correct the current position data by referring to absolute position data obtained by the method using IMES. However, because position measurement signals of the IMES are transmitted throughout a predetermined range, the position data obtained from the IMES may also have a significant error depending on the position of the communication terminal receiving the position measurement signal.

SUMMARY OF THE INVENTION

The present invention may provide a data processing system, a data processing method, and a computer-readable recording medium that substantially obviates one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a data processing system, a data processing method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing system including a distribution apparatus and a communication terminal. The distribution apparatus includes a distribution unit configured to distribute a wireless signal containing unique data that is unique to the distribution apparatus. The communication terminal receives the wireless signal distributed by the distribution apparatus. A position data indicating a position of the distribution apparatus and a predetermined threshold value pertaining to a signal strength of the wireless signal received by the communication terminal are identifiable based on the unique data. The communication terminal includes a determination unit that determines whether to indicate that a current position of the communication terminal is the position data, by referring to the predetermined threshold value.

Other objects, features and advantages of the present invention will become more apparent from the following detailed description when read in conjunction with the accompanying drawings.

BRIEF DESCRIPTION OF THE DRAWINGS

FIG. 6 is a schematic diagram illustrating position data distributed by a distribution apparatus according to an embodiment of the present invention;

FIG. 8 is a schematic diagram illustrating an example of a format of position data according to an embodiment of the present invention;

FIG. 9 is a schematic diagram illustrating a data structure of data including position data according to an embodiment of the present invention;

FIG. 13 is a schematic diagram illustrating an example of management data managed by a position data management system according to an embodiment of the present invention;

FIG. 24 is a schematic diagram illustrating an example of a screen of a position data management system according to an embodiment of the present invention;

FIG. 26 illustrates an example of a method for expressing a signal strength threshold according to an embodiment of the present invention;

FIG. 27 is a schematic diagram illustrating signal threshold value data managed by a communication terminal according to a first example of the present invention;

FIG. 31 is a schematic diagram illustrating distribution apparatus data managed by a position data management system according to a second example of the present invention;

FIG. 42 is a schematic diagram illustrating examples of elements of a frame structure that are defined by an IMES standard;

FIG. 43 is a schematic diagram illustrating distribution apparatus data managed by a communication terminal according to a fourth example of the present invention;

FIG. 47 is a schematic diagram illustrating position/threshold value data managed by a communication terminal according to a fifth example of the present invention;

DETAILED DESCRIPTION OF THE PREFERRED EMBODIMENTS

Next, embodiments of the present invention are described with reference to the accompanying drawings.

Figure 1:
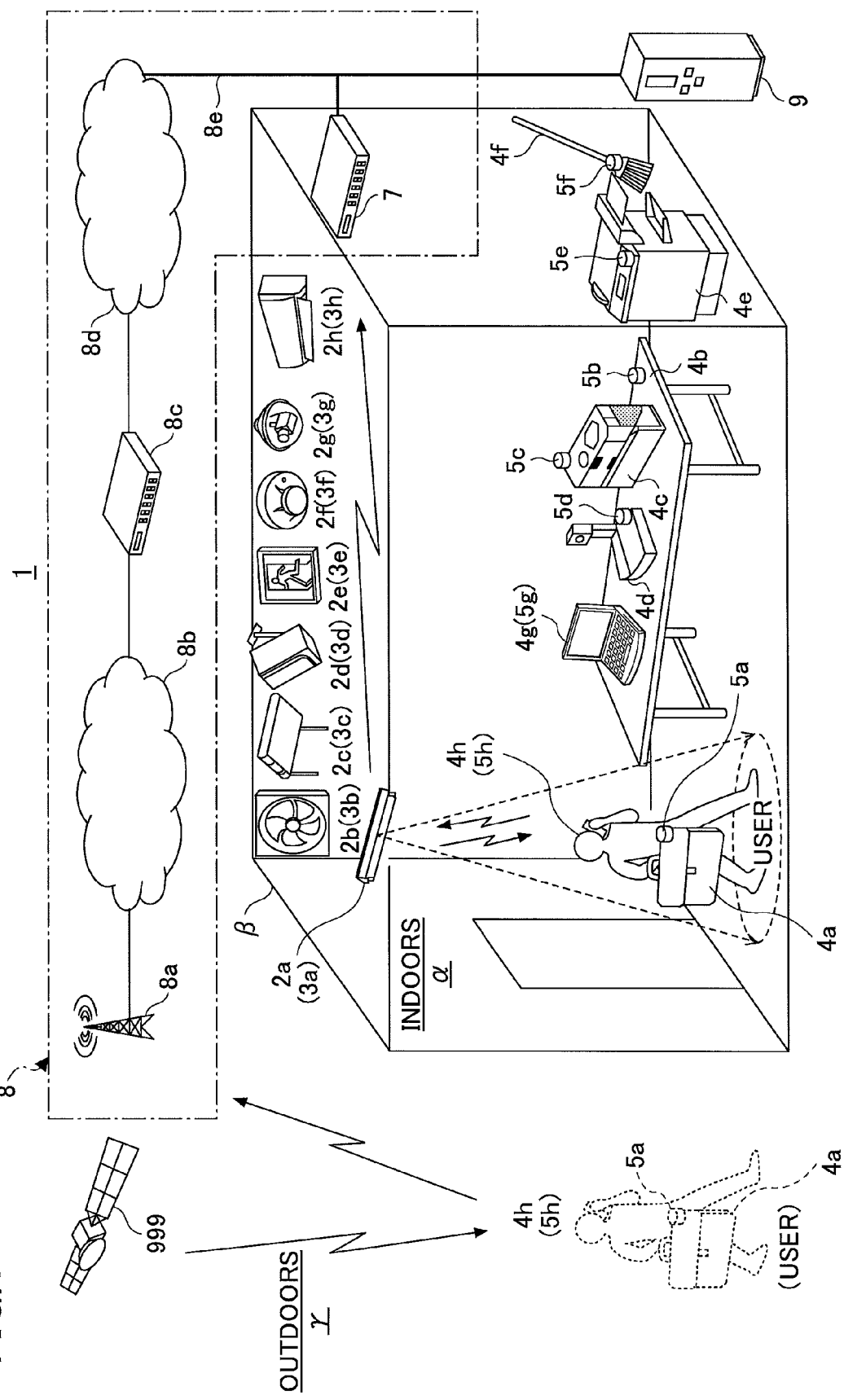
FIG. 1 is a schematic diagram illustrating an overall configuration of a position management system according to an embodiment of the present invention.

FIG. 1 is a schematic diagram illustrating an overall configuration of a position management system 1 according to an embodiment of the present invention.

As illustrated in FIG. 1, the position management system 1 according to an embodiment of the present invention includes, for example, multiple distribution apparatuses (3a, 3b, 3c, 3d, 3e, 3f, 3g, 3h) placed on a ceiling β in an indoor area α (also referred to as "indoors α"), multiple communication terminals (5a, 5b, 5c, 5d, 5e, 5f, 5g, 5h) placed on a floor in the indoor area α, and a position data management system 9.

Each of the distribution apparatuses (3a, 3b, 3c, 3d, 3e, 3f, 3g, 3h) stores position data (Xa, Xb, Xc, Xd, Xe, Xf, Xg, Xh) indicating a position in which each of the distribution apparatuses (3a, 3b, 3c, 3d, 3e, 3f, 3g, 3h) is to be placed. After the distribution apparatuses (3a, 3b, 3c, 3d, 3e, 3f, 3g, 3h) are placed at corresponding positions, the position data stored in each of the distribution apparatuses (3a, 3b, 3c, 3d, 3e, 3f, 3g, 3h) indicates the position in which each of the distribution apparatuses is being placed. Each of the distribution apparatuses (3a, 3b, 3c, 3d, 3e, 3f, 3g, 3h) distributes the stored position data (Xa, Xb, Xc, Xd, Xe, Xf, Xg, Xh) in a direction toward the floor of the indoor area α. Further, each of the distribution apparatuses (3a, 3b, 3c, 3d, 3e, 3f, 3g, 3h) stores apparatus identification data (Ba, Bb, Bc, Bd, Be, Bf, Bg, Bh) that identifies (distinguishes) each of the distribution apparatuses (3a, 3b, 3c, 3d, 3e, 3f, 3g, 3h).

A given distribution apparatus among the multiple distribution apparatus (3a, 3b, 3c, 3d, 3e, 3f, 3g, 3h) may be hereinafter indicated as "distribution apparatus 3". A given communication terminal among the multiple communication terminals (5a, 5b, 5c, 5d, 5e, 5f, 5g, 5h) may be hereinafter indicated as "communication terminal 5". Further, a given position data among the multiple position data (Xa, Xb, Xc, Xd, Xe, Xf, Xg, Xh) may be hereinafter indicated as "position data X". A given apparatus identification data among the multiple apparatus identification data (Ba, Bb, Bc, Bd, Be, Bf, Bg, Bh) may be hereinafter referred to as "apparatus identification data B". One example of the apparatus identification data B is a MAC (Media Access Control) address.

On the other hand, each of the communication terminals (5a, 5b, 5c, 5d, 5e, 5f, 5g, 5h) stores terminal identification data (Aa, Ab, Ac, Ad, Ae, Af, Ag, Ah) that identifies (distinguishes) each of the communication terminals (5a, 5b, 5c, 5d, Se, 5f, 5g, 5h). A given terminal identification data among the terminal identification data (Aa, Ab, Ac, Ad, Ae, Af, Ag, Ah) may be hereinafter referred to as "terminal identification data A". One example of the terminal identification data A is a MAC (Media Access Control) address. In a case where the communication terminal 5 receives position data X from the distribution apparatus 3, the communication terminal 5 transmits its own terminal identification data A (i.e. terminal identification data A of the communication terminal 5) and its own position data (position data X of the communication terminal 5) to the distribution apparatus 3.

Each distribution apparatus 3 is installed inside a corresponding electric device (2a, 2b, 2c, 2d, 2e, 2f, 2h) or externally mounted to the electric device (2a, 2b, 2c, 2d, 2e, 2f, 2h). The electric devices (2a, 2b, 2c, 2d, 2e, 2f, 2h) are placed at the ceiling β in the indoor area α. A given electric device among the electric devices (2a, 2b, 2c, 2d, 2e, 2f, 2h) may be hereinafter referred to as "electric device 2".

Each electric device 2 supplies electric power to each distribution apparatus 3. Among the electric devices 2 according to the embodiment of FIG. 1, the electric device 2a is an LED (Light Emitting Diode) type fluorescent lighting apparatus; the electric device 2b is a ventilation fan; the electric device 2c is an access point of a wireless LAN (Local Area Network); the electric device 2d is a speaker; the electric device 2e is an emergency lamp; the electric device 2f is a fire alarm or a smoke detector; the electric device 2g is a security camera; and the electric device 2h is an air conditioner.

The electric devices 2 are not limited to those illustrated in FIG. 1 as long as the electric device 2 can feed electric power to the transmitting device 3. For example, other than the electric devices 2 illustrated in FIG. 1, the electric device 2 may also be a typical lighting apparatus such as a fluorescent lamp other than an LED type fluorescent lamp or an incandescent lamp, or a burglar alarm for detecting intrusion from the outside.

On the other hand, each communication terminal 5 is mounted to the outside of the corresponding management objects (4a, 4b, 4c, 4d, 4e). The position of each of the management objects (4a, 4b, 4c, 4d, 4e) is managed by the position data management system 9.

Among the management objects (4a, 4b, 4c, 4d, 4e) according to the embodiment of FIG. 1, the management object 4a is a bag; the management object 4b is a table; the management object 4c is a projector; the management object 4d is a television conference terminal; the management object 4e is a MFP (Multi-Function Product) including, for example, a copying function; and the management object 4f is a broom.

Further, the management object 4g is a personal computer (PC). In a case where a function (s) of the communication terminal 5 is installed in the personal computer, the management object 4g is also a communication terminal 5g. The management object 4h is a mobile phone such as a smart phone. In a case where a function(s) of the communication terminal 5 is installed in the mobile phone, the management object 4h is also a communication terminal 5h. A given management object among the management objects (4a, 4b, 4c, 4d, 4e, 4f, 4g, 4h) may be hereinafter referred to as "management object 4".

The management objects 4 are not limited to those illustrated in FIG. 1. For example, other than the management objects 4 illustrated in FIG. 1, the management object 4 may also be a facsimile machine, a scanner, a printer, a copier, an electronic blackboard, an air cleaner, a shredder, a vending machine, a wristwatch, a camera, an electronic game device, a wheelchair, or a medical device such as an endoscope.

Next, an example of a method for managing position data by using the position management system 1 is described.

In this embodiment, the distribution apparatus 3a, which is provided at the ceiling β in the indoor area α, uses wireless communication to transmit the position data Xa indicating the position at which the distribution apparatus 3a is placed (installed). Thereby, the communication terminal 5a receives the position data Xa distributed from the distribution apparatus 3a. Then, the communication terminal 5a, uses wireless communication to transmit terminal identification data (data for identifying (distinguishing) a terminal) Aa and position data Xa of the communication terminal 5a to the distribution apparatus 3a. In this case, the communication terminal 5a transmits (returns) the identification data Xa received from the distribution apparatus 3a back to the distribution apparatus 3a.

Thereby, the distribution apparatus 3a receives the terminal identification data Aa and the position data Xa from the communication terminal 5a. Then, the distribution apparatus 3a uses wireless communication to transmit the terminal identification data Aa and the position data Xa to the gateway 7. Then, the gateway 7 transmits the terminal identification data Aa and the position data Xa to the position data management system 9 via a LAN 8e. An administrator of the position data management system 9 can locate the position of the communication terminal 5a (management object 4a) in the indoor area α by managing the terminal identification data Aa and the position data Xa with the position data management system 9.

Further, as illustrated in FIG. 1, among the communication terminals, the communication terminals 5g, 5h, in particular, can particularly calculate the position on earth by receiving wireless signals (including, for example, time data, orbit data) in the outdoor area γ from a GPS satellite 999. Then, the communication terminals 5g, 5h can use a mobile communication system (e.g., 3G ($3^{rd}$ Generation) system, 4G ($4^{th}$ Generation) system) to transmit terminal identification data Ag, Ah and position data Xg, Xh to the position data management system 9 via a base station 8a, a mobile communication network 8b, a gateway 8c, the Internet 8D, and the LAN 8e, respectively.

It is to be noted that the communication network 8 according to an embodiment of the present invention is constituted by the base station 8a, the mobile communication network 8b, the gateway 8c, the Internet 8d, the LAN 8e, and the gateway 7. Further, positioning (position measurement) of latitude and longitude on earth requires at least 3 GPS satellites (4 GPS satellites if altitude is also included), FIG. 1 illustrates one GPS satellite 999 for the sake of convenience.

Figure 2:
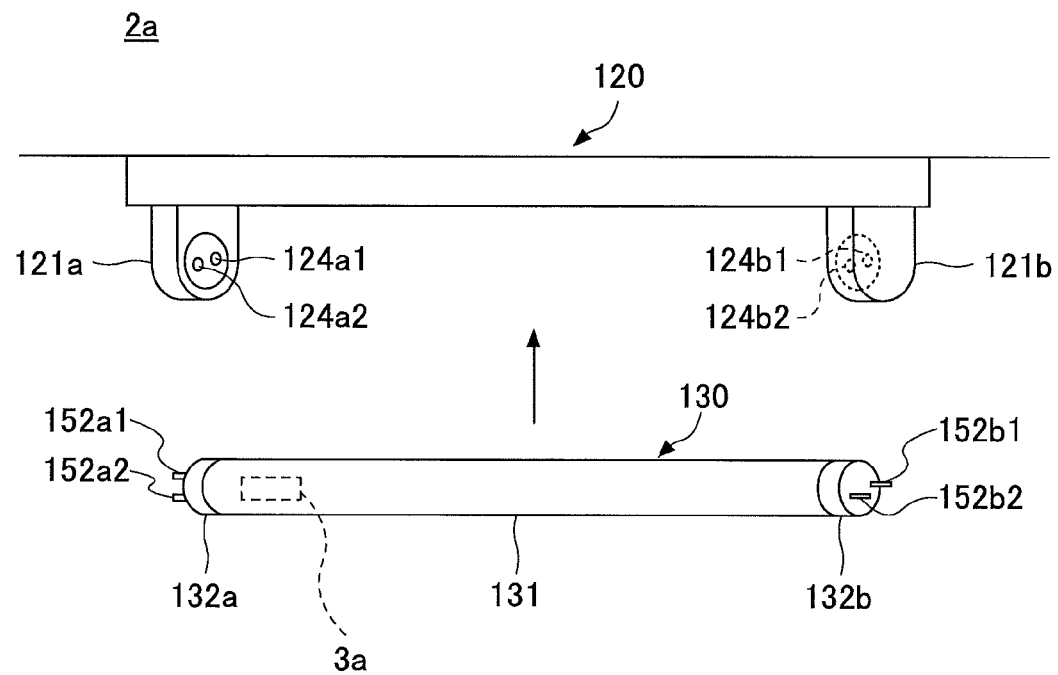
FIG. 2 is a schematic diagram illustrating an external configuration of an electric device in a case where the electric device is an LED type fluorescent lighting apparatus according to an embodiment of the present invention.

Next, an external configuration of the LED type fluorescent lighting apparatus 2a is described with reference to FIG. 2. The LED type fluorescent lighting apparatus 2a is one example of the electric device 2. FIG. 2 is a schematic diagram illustrating an external configuration of the electric device 2 in a case where the electric device 2 is an LED type fluorescent lighting apparatus 2a.

As illustrated in FIG. 2, the LED type fluorescent lighting apparatus (electric device) 2a is a straight tube type lamp. The LED type fluorescent lighting apparatus 2a includes a main body 120 that is attached to the ceiling β of the indoor area α of FIG. 1 and an LED lamp 130 that is attached to the main body 120.

Sockets 121a and 121b are provided on each end part of the main body 120. The socket 121a includes power feeding terminals 124a1, 124a2 for feeding power to the LED lamp 130. Further, the socket 121b includes power feeding terminals 124b1, 124b2 also for feeding power to the LED lamp 130. Thereby, the main body 120 can supply electric power from the below-described power source 1000 to the LED lamp 130.

The LED lamp 130 includes a translucent cover 131, caps 132a, 132b provided on each end part of the translucent cover 131, and the distribution apparatus 3a inside the translucent cover 131. The translucent cover 131 is formed of, for example, a resin material (e.g., acrylic resin). The translucent cover 131 is provided in a manner covering a light source inside the LED lamp 130.

Further, the cap 132a includes terminal pins 152a1, 152a2 that are connected to corresponding power feeding terminals 124a1, 124a2 of the socket 121a. The cap 132b includes terminal pins 152b1, 152b2 that are connected to corresponding power feeding terminals 124b1, 124b2 of the socket 121b. By mounting the LED lamp 130 to the main body 120, electric power can be supplied from the main body 120 to each of the terminal pins 152a1, 152a2, 152b1, 152b2 via corresponding power feeding terminals 124a1, 124a2, 124b1, 124b2. Thereby, the LED lamp 130 can radiate light to the outside by way of the translucent cover 131. The distribution apparatus 3a is operated by the electric power supplied from the main body 120.

Figure 3:
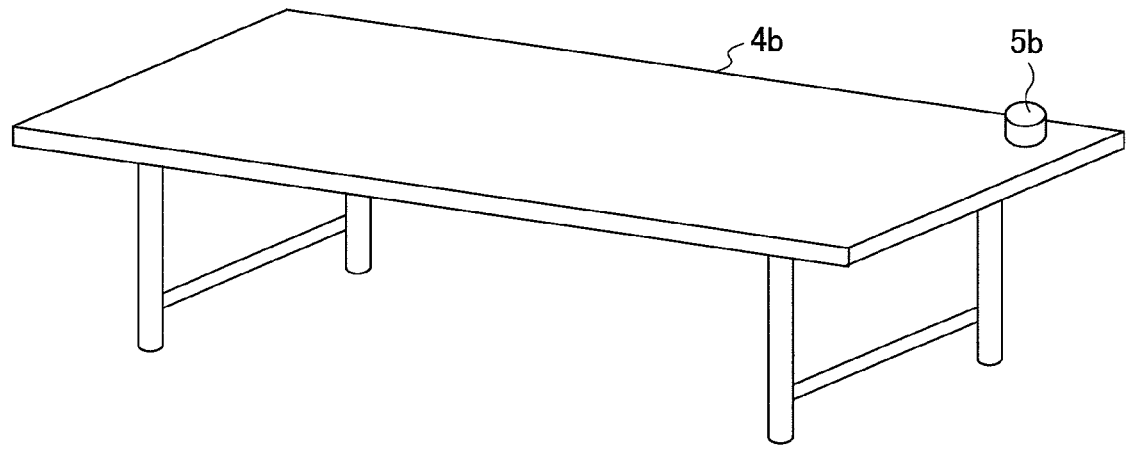
FIG. 3 is a schematic diagram illustrating a state where a communication device is placed on a management object according to an embodiment of the present invention.

Next, a status of the communication terminal 5 being placed on an upper surface of the management object 4 is described with reference to FIG. 3. In this embodiment, the management object 4 is a table 4b. FIG. 3 is a schematic diagram illustrating a state where the communication device 5 is placed on the management object 4 according to an embodiment of the present invention.

As illustrated in FIG. 3, the communication device 5b is mounted to the upper surface of the management object 4b. The communication device 5b may be mounted to the management object 4b by using, for example, a double-sided tape. Alternatively, the communication device 5b may simply be placed on the management object 4c.

Figure 4:
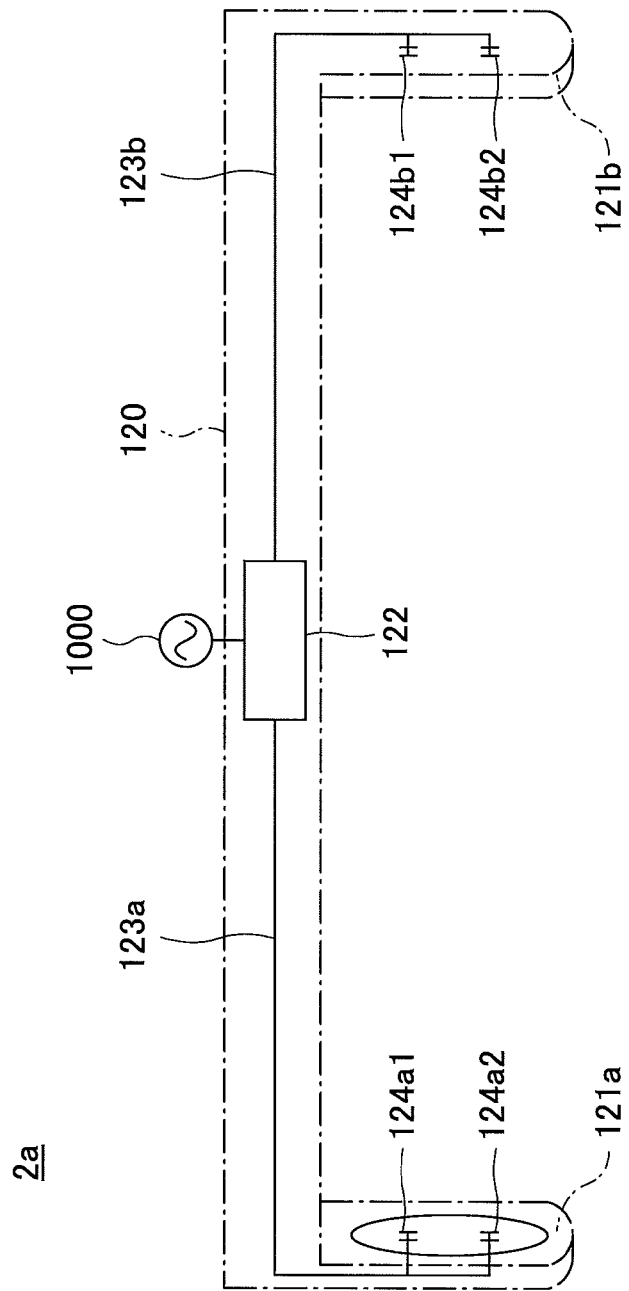
FIG. 4 is a schematic diagram illustrating a hardware configuration of a main body of an electric device in a case where the electric device is an LED type fluorescent lighting apparatus according to an embodiment of the present invention.
Figure 5:
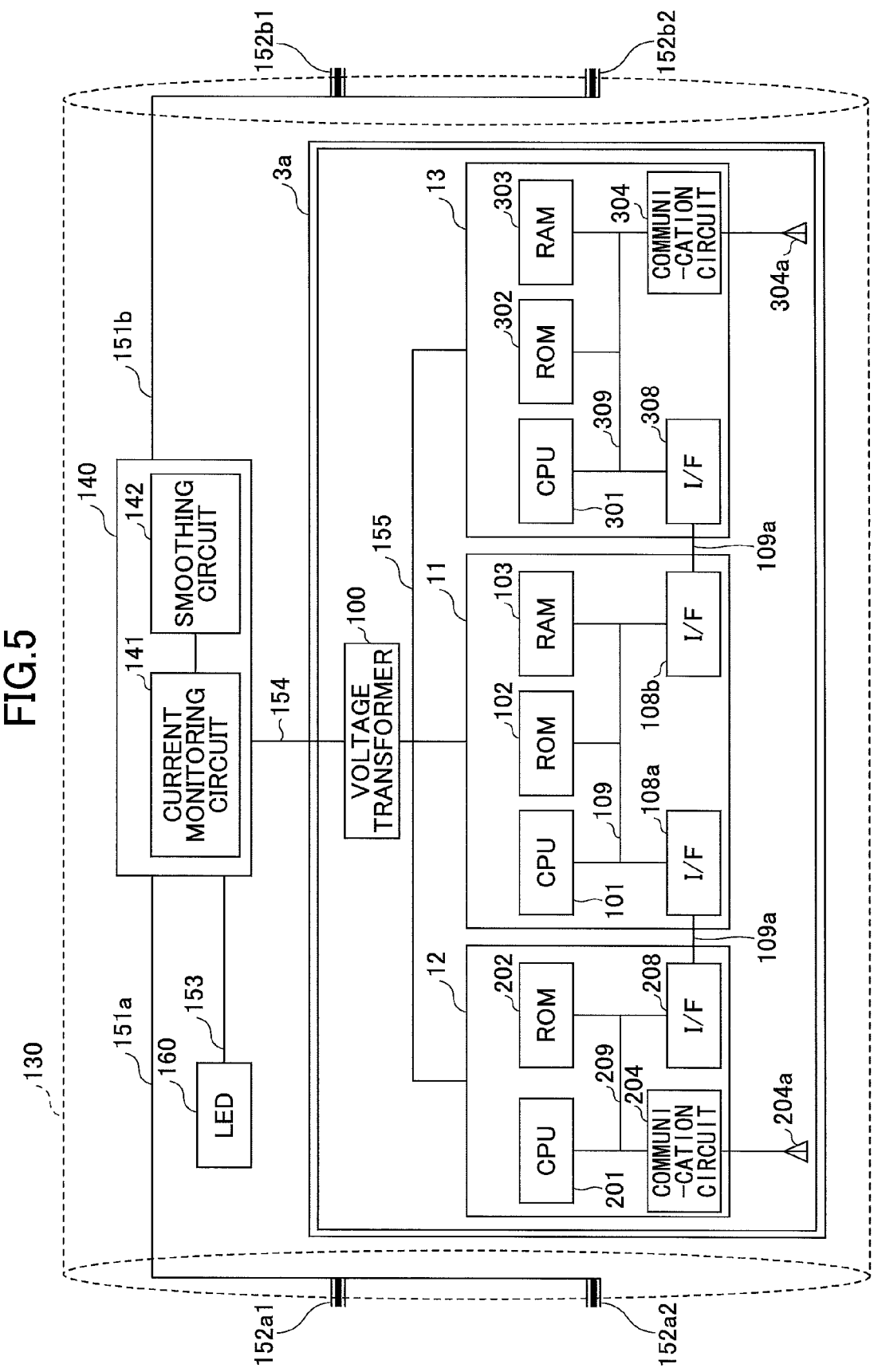
FIG. 5 is a hardware configuration of an LED lamp in a case where an electric device is an LED type fluorescent lighting apparatus according to an embodiment of the present invention.

Next, with reference to FIGS. 4 and 5, a hardware configuration of the electric device 2 is described in a case where the electric device 2 is the LED type fluorescent lighting apparatus 2a. FIG. 4 is a schematic diagram illustrating a hardware configuration of a main body of the electric device 2 in a case where the electric device 2 is the LED type fluorescent lighting apparatus 2a. FIG. 5 is a hardware configuration of the LED lamp 130 in a case where the electric device 2 is the LED type fluorescent lighting apparatus 2a.

As illustrated in FIG. 4, the main body 120 mainly includes a ballast 122, lead wires 123a, 123b, and power feeding terminals 124a1, 124a2, 124b1, 124b2.

The ballast 122 controls the electric current supplied from an external power source 1000. The ballast 122 and the power feeding terminals 124a, 124a2, 124b1, 124b2 are electrically connected by the lead wires 123a, 123b. Thereby, electric power can be stably supplied from the ballast 122 to each of the power feeding terminals 124a, 124a2, 124b1, 124b2 via the lead wires 123a, 123b.

As illustrated in FIG. 5, the LED lamp 130 mainly includes a power control unit 140, lead wires 151a, 151b, terminal pins 152a1, 1522, 152b1, 152b2, lead wires 153, 154, 155, and the distribution apparatus 3a. The power control unit 140 controls the electric current supplied from the power source 1000. The power control unit 140 mainly includes a current monitoring circuit 141 and a smoothing circuit 142. The current monitoring circuit 141 rectifies the electric current input from the power source 1000. The smoothing circuit 142 smoothens the electric current rectified by the current monitoring circuit 141 and supplies power to each of the terminal pins 152a1, 1522, 152b1, 152b2 via the lead wires 151a, 151b.

The power control unit 140 and the terminal pins 152a1, 1522, 152b1, 152b2 are electrically connected by the lead wires 151a, 151b. The power control unit 140 and the distribution apparatus 3a are electrically connected by the lead wire 154. Although multiple LEDs 160 may be actually attached to the power control unit 140, FIG. 5 illustrates a single LED 160 attached to the power control unit for the sake of convenience. The configuration of LED lamp 130 is substantially the same as a common LED lamp except that the LED lamp 130 includes the distribution apparatus 3a.

Next, the distribution apparatus 3a according to an embodiment of the present invention is described. The distribution apparatus 3a includes a voltage transformer 100, a lead wire 155, a control unit 11, a position data distribution unit 12, and a wireless communication unit 13. The voltage transformer 100 is electrically connected to the control unit 11, the position data distribution unit 12, and the wireless communication unit 13 via the lead wire 155.

The voltage transformer 100 transforms the voltage supplied from the power control unit 140 to a driving voltage of the distribution apparatus 3a and supplies the transformed voltage to the control unit 11, the position data distribution unit 12, and the wireless communication unit 13.

The control unit 11 includes a CPU (Central Processing Unit) 101 for controlling overall operations of the control unit 11, a ROM (Read Only Memory) 102 for storing basic input/output programs therein, a RAM (Random Access Memory) 103 used as a work area of the CPU 101, an interface (I/F) 108a for transmitting/receiving signals with respect to the position data distribution unit 12, an interface 108b for transmitting/receiving signals with respect to the wireless communication unit 13, and a bus line (e.g., address bus, data bus) 109 for electrically connecting the units and elements included in the control unit 11.

The position data distribution unit 12 includes a CPU 201 for controlling overall operations of the position data distribution unit 12, a ROM 202 for storing basic input/output programs and the position data Xa therein, a communication circuit 204 and an antenna for distributing the position data Xa, the I/F 208 for transmitting/receiving signals with respect to the control unit 11, and a bus line (e.g., address bus, data bus) 209 for electrically connecting the units and elements included in the position data distribution unit 12.

The communication circuit 204 distributes the position data Xa by way of the antenna 204a by using IMES technology. As described above, IMES, which is also referred to as indoor GPS, is a technology used for indoor positioning. The range in which the position data X can reach (distribution range of position data X) is virtually illustrated with broken lines in FIG. 1. In a case where the height of the ceiling β of the indoor area α is approximately 3 meters, a transmission output is set to the IMES in the embodiment of FIG. 1, so that the radius of a virtual circle (illustrated with broken lines on the floor of the indoor area α) of the distribution range of the position data X is approximately 5 meters. However, by changing the settings of the transmission output of the IMES, the radius of the distribution range of the position data X can be set to be less than or greater than 5 meters.

The position data Xa indicates a position in which the LED type fluorescent lighting apparatus (electric device) 2a is placed. As illustrated in FIG. 6, the position data Xa includes items such as floor number, latitude, longitude, and building number. FIG. 6 is a schematic diagram illustrating the position data Xa distributed by the distribution apparatus 3a.

The item "floor number" indicates the floor of the building in which the electric device 2a is placed. The item "latitude" indicates the latitude of the position in which the electric device 2a is placed. The item "longitude" indicates the longitude of the position in which the electric device 2a is placed. The item "building number" indicates the number of the building in which the electric device 2a is placed. In the example illustrated in FIG. 6, the electric device 2a indicates that the electric device is placed at a position having a north latitude of 35.459555 degrees and a east longitude of 139.387110 degrees on the 16$^{th}$ floor of building C. Alternatively, latitude may be indicated by south latitude and longitude may be indicated by west longitude.

Returning to FIG. 5, the wireless communication unit 13 includes a CPU 301 for controlling overall operations of the wireless communication unit 13, a ROM 302 for storing basic input/output programs and the apparatus identification data Ba therein, a RAM 303 used as a work area of the CPU 301, a communication circuit 304 and an antenna 304a for receiving the position data Xa and the terminal identification data Aa and transmitting the received data to the gateway 17, an interface (I/F) 308 for transmitting/receiving signals with respect to the control unit 11, and a bus line (e.g., address bus, data bus) 309 for electrically connecting the units and elements included in the wireless communication unit 13.

The wireless communication unit 13 transmits/receives data by using a 920 MHz band. Because the 920 MHz band has high radio wave reachability, data can be transmitted from the distribution apparatus 3a to the gateway 7 even in a case where there is a column or wall of a building between the distribution apparatus 3a and the gateway 7.

The communication circuit 304 transmits/receives data by using at least the physical layer of an architecture model described in the IEEE802.15 standard. The communication circuit 304 performs the transmission/reception of data by using the antenna 304a. In this case where the physical layer of an architecture model described in the IEEE802.15 standard is used, a MAC address of the distribution apparatus 3 (wireless communication unit 13) may be used as the apparatus identification data B for identifying the distribution apparatus 3 (wireless communication unit 13).

Alternatively, the communication circuit 304 may transmit/receive data by using the physical layer of an architecture model described in the IEEE802.15 standard and a MAC layer of ZigBee (registered trademark). In this case where the physical layer of an architecture model described in the IEEE802.15 standard and a MAC layer of ZigBee (registered trademark) are used, the distribution apparatus 3 transmits/receives data by using the 800 MHz band, the 900 MHz band, or the 2.4 GHz band in accordance to the region in which the band is used (e.g., Japan, U.S.A., Europe) with respect to the gateway 7 via another adjacent or neighboring distribution apparatus 3 (multi-hop communication). By using the multi-hop communication in which data is transmitted by way of other distribution apparatuses 3, it may take some time for the wireless communication unit 13 of each distribution apparatus 3 to perform a routing process. However, by using the multi-hop communication, the wireless communication unit 13 of each distribution apparatus 3 can perform communication with electric power that is enough to reach the nearest distribution data. Therefore, the multi-hop communication has an advantage of operating with a small amount of power.

The position data Xa may be stored in the below-described storage unit 29 of the distribution apparatus 3a before the distribution apparatus 3a is shipped from a factory of the manufacturer of the distribution apparatus 3a. Alternatively, the position data Xa may be stored in the storage unit 29 after the distribution apparatus 3a is shipped from the factory. For example, in a case of mounting the electric device 2a to the ceiling β, the position data Xa may be stored in the storage unit 29 by the person mounting the electric device 2a to the ceiling β. Alternatively, the position data Xa transmitted from an external device (e.g., position data management system 9) by wireless communication via the gateway 7 and receives by the communication circuit 304 of the wireless communication unit 13. Thereby, the position data Xa can be stored in the ROM 202 of the position data distribution unit 12 by the control unit 11.

Figure 7:
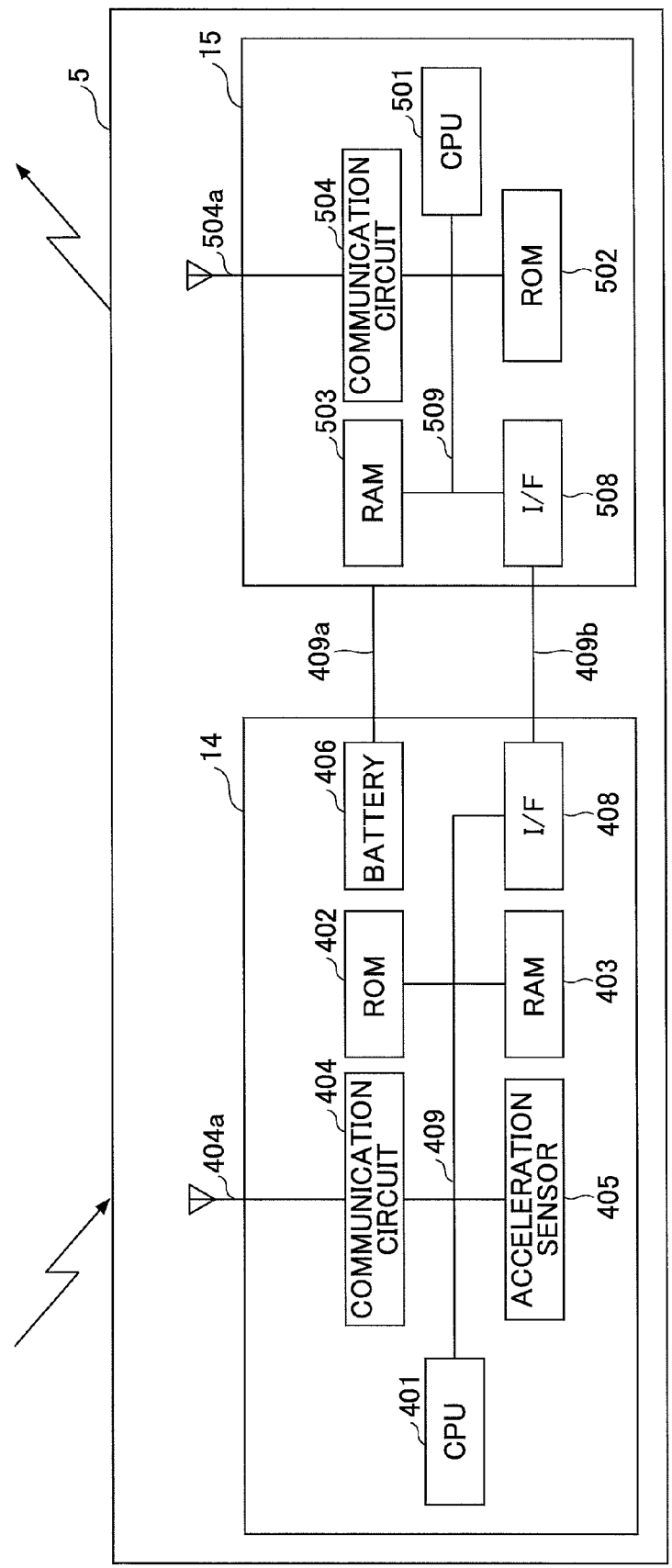
FIG. 7 is a schematic diagram illustrating a hardware configuration of a communication terminal according to an embodiment of the present invention.

Next, a hardware configuration of the communication terminal 5 is described with reference to FIG. 7. FIG. 7 is a schematic diagram illustrating the hardware configuration of the communication terminal 5 according to an embodiment of the present invention.

As illustrated in FIG. 7, the communication terminal 5 includes a control unit 14 and a wireless communication unit 15.

The control unit 14 includes a CPU 401 for controlling overall operations of the control unit 14, a ROM 402 for storing basic input/output programs therein, a RAM 403 used as a work area of the CPU 401, a communication circuit 404 and an antenna 404a for receiving the position data Xa, an acceleration sensor 405 for detecting acceleration of the communication terminal 5, an interface (I/F) 408 for transmitting/receiving signals with respect to the wireless communication unit 15, and a bus line (e.g., address bus, data bus) 409 for electrically connecting the units and elements included in the control unit 14. The control unit 14 also includes a button battery 406 for driving the communication terminal 5. Not only can the communication terminal 5 be driven by the button battery, but may be driven by a common battery (e.g., double A battery, triple A battery) or a battery dedicated to the communication terminal 5.

The communication circuit 404 receives the position data X being distributed by using IMES. The communication circuit 404 receives the distributed position data X with the antenna 404a. The control unit 14 supplies the electric power of the button battery 406 to the wireless communication unit 15 via a connector 409a. The control unit 14 transmits/receives data (signals) with respect to the wireless communication unit 15 by way of the I/F 408 and the connector 409b.

The acceleration sensor 405 detects changes of the acceleration of the communication terminal 5. Changes of the acceleration of the communication terminal 5 may be detected, for example, when the communication terminal 5 starts moving, when the moving of the communication terminal 5 stops, or when the communication terminal 5 is tilted (inclined). In a case where change of acceleration is detected when the CPU 401 is not operating (stopped), the acceleration sensor 405 transmits a signal to the CPU 401 for causing the CPU 401 to start operation. Thereby, the CPU 401 begins to operate and also transmits a signal to the communication circuit 404 for causing the communication circuit 404 to start operation. Thereby, in a case where the position data X is being distributed by the distribution apparatus 3, the communication circuit 404 of the communication terminal 5 can start receiving the position data X via the antenna 404a.

On the other hand, the wireless communication unit 15 basically has the same configuration as the above-described configuration of the wireless communication unit 13. Thus, the wireless communication unit 15 can transmit/receive data with respect to the wireless communication unit 13 of the distribution apparatus 3 by using the same band used by the wireless communication unit 13. As illustrated in FIG. 7, the wireless communication unit 15 includes a CPU 501 for controlling overall operations of the wireless communication unit 15, a ROM 502 for storing basic input/output programs and the terminal identification data A therein, a RAM 503 used as a work area of the CPU 501, a communication circuit 504 and an antenna 504a for transmitting the position data X or the terminal identification data A, an interface (I/F) 508 for transmitting/receiving signals with respect to the control unit 14, and a bus line (e.g., address bus, data bus) 509 for electrically connecting the units and elements included in the wireless communication unit 15. Alternatively, the wireless communication unit 15 may also use ZigBee (registered trademark).

The communication circuit 504 obtains the position data X stored in the RAM 403 of the control unit 14 by way of the connector 409b according to an instruction(s) from the CPU 501. Further, the communication circuit 504 reads out the terminal identification data A stored in the ROM 502 and transmits the terminal identification data A together with the obtained position data X to the distribution apparatus 3 via the antenna 504a.

The configuration of the position data X transmitted by the communication circuit 504 may have a format as illustrated in FIG. 8. FIG. 8 is a schematic diagram illustrating an example of a format of the position data X according to an embodiment of the present invention. In the example illustrated in FIG. 8, the fields "floor number", "latitude", "longitude", and "building number" are represented with 9 bits, 21 bits, 21 bits, and 8 bits, respectively. The format of each of the fields complies with the IMES standard. The actual format of the position data X is also added with a header defined according to the communication system, and checksum data. As illustrated in FIG. 9, the data structure of the data to be transmitted by the communication circuit 504 may include "transmission destination", "transmission source", and "data content (e.g., position data X). FIG. 9 is a schematic diagram illustrating a data structure of data including position data X according to an embodiment of the present invention.

Next, a hardware configuration of the management object 4h is described with reference to FIG. 10. In this embodiment, the management object 4h (communication terminal 5h) is a mobile phone.

Figure 10:
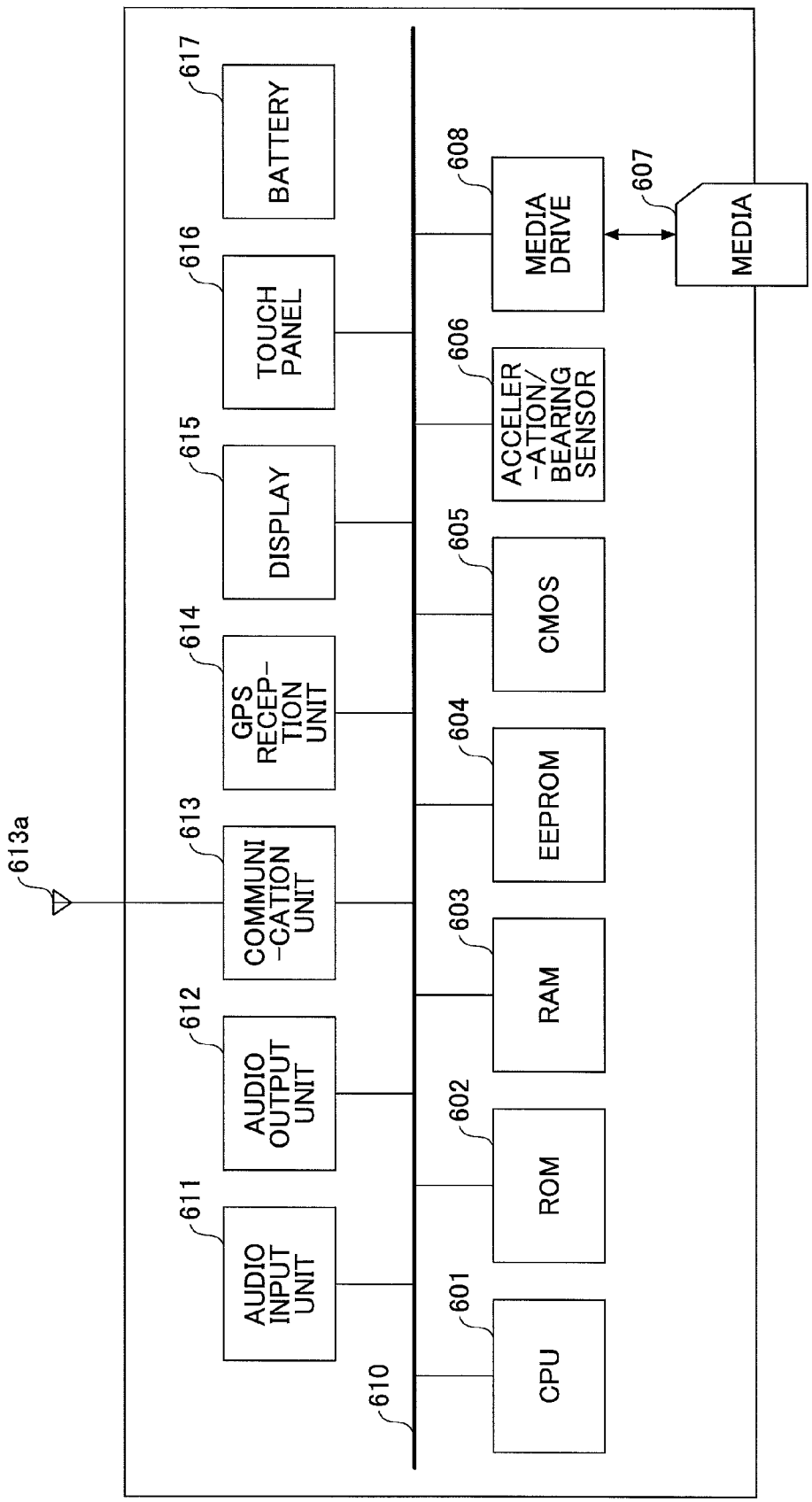
FIG. 10 is a schematic diagram illustrating a hardware configuration of a management object in a case where the management object is a mobile phone according to an embodiment of the present invention.

As illustrated in FIG. 10, the management object 4h (communication terminal 5h) includes a CPU 601 for controlling overall operations of the communication terminal 5h, a ROM 602 for storing basic input/output programs therein, a RAM 603 used as a work area of the CPU 601, a EEEPROM (Electrically Erasable and Programmable ROM) 604 for reading/writing data according to the controls of the CPU 601, a CMOS (Complementary Metal Oxide Semiconductor) sensor 605 for imaging (capturing) an object and obtaining image data of the object according to the controls of the CPU 601, one or a variety of acceleration/bearing sensors (e.g., electromagnetic compass for detecting earth magnetism, a gyrocompass, an acceleration sensor) 606, and a media drive 608 for controlling reading/writing (recording) of data with respect to a recording medium or media (e.g., flash memory) 607. The recording medium 607 is configured to detach/attach with the management object 4h (communication terminal 5h) for having recorded data read therefrom or new data recorded (written) thereto in accordance with the controls of the media drive 608.

An operating system (OS), various programs, and various data that are executed by the CPU 601 are stored in the EEPROM 604. The CMOS sensor 605 is a charged coupled device (CCD) that captures light of an image of an object and converts the image into electron charges. As long as an image can be captured, the CMOS sensor 605 may be a sensor other than the CCD sensor.

The management object 4h (communication terminal 5h) may also include an audio input unit 11 for converting audio into audio signals, an audio output unit 612 for converting audio signals into audio, an antenna 613a, a communication unit 613 for performing communications (transmission/reception) with a nearest base station 8a by using wireless communication signals via the antenna 613a, a GPS reception unit 614 for receiving GPS signals from the GPS satellite 999, a display (e.g., liquid crystal display, organic electroluminescence (EL) display) 615 for displaying, for example, an image of an object or various icons, a touch panel 616 including a pressure-sensitive type or an electrostatic type display panel for detecting a position in the display panel touched with a finger or a stylus, and a bus line (e.g., address bus, data bus) 610 for electrically connecting the units and elements included in the management object 4h (communication terminal 5h). Further, a battery dedicated for the management object 4h (communication terminal 5h) is provided in the management object 4h (communication terminal 5h) for driving the management object 4h (communication terminal 5h). The audio input unit 611 includes a microphone for inputting audio. The audio output unit 612 includes a speaker for outputting audio.

The GPS reception unit 614 of the management object 4h (communication terminal 5h) has substantially the same configuration as a GPS reception unit of a typical mobile phone. However, the firmware of the program stored in the ROM 602 may be slightly adjusted (modified) for achieving seamless data reception from the distribution apparatus 3 of the indoor area α and the GPS satellite 999 of the outdoor area γ. The acceleration/bearing sensor 606 serves to provide the processes of the acceleration sensor 605 of FIG. 7.

Because the hardware configuration of the management object 4g (communication terminal 5g), which is a personal computer, has substantially the same configuration as the hardware configuration of the position data management system 9 of FIG. 9, further explanation of the hardware configuration of the management object 4g (communication terminal 5g) is omitted. However, in a case where the management object 4g (communication terminal 5g) is a personal computer, an external device I/F (e.g., USB (Universal Serial Bus) (similar to the external device I/F) is connected to a GPS antenna. However, in a case of a personal computer equipped with a GPS antenna, there is no need for connecting the external device I/F to the GPS antenna.

Figure 11:
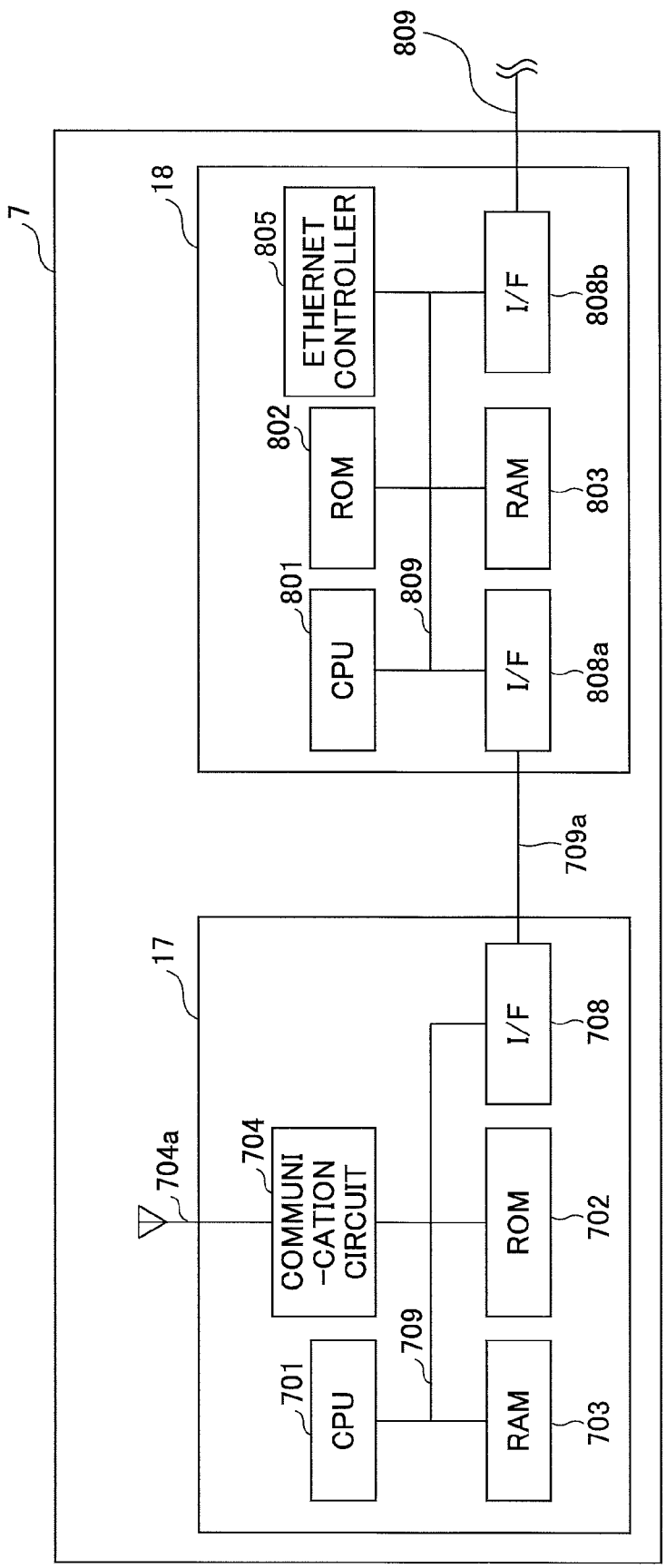
FIG. 11 is a schematic diagram illustrating a hardware configuration of a gateway according to an embodiment of the present invention.

Next, a hardware configuration of the gateway 7 according to an embodiment of the present invention is described with reference to FIG. 11. FIG. 11 is a schematic diagram illustrating the hardware configuration of the gateway 7 according to an embodiment of the present invention.

As illustrated in FIG. 11, the gateway 7 includes a wireless communication unit 17 and a wired communication unit 18. As described below, regardless of whether position data X distributed from the same distribution apparatus 3 is received numerous times within a predetermined period, the received position data is handled as a single position data X.

The wireless communication unit 17 basically has the same configuration as the above-described configuration of the wireless communication unit 13. Thus, the wireless communication unit 17 can transmit/receive data with respect to the wireless communication unit 13 of the distribution apparatus 3 by using the same band used by the wireless communication unit 13. As illustrated in FIG. 11, the wireless communication unit 17 includes a CPU 701 for controlling overall operations of the wireless communication unit 17, a ROM 702 for storing basic input/output programs and the apparatus identification data C therein, a RAM 703 used as a work area of the CPU 701, a communication circuit 704 and an antenna 704a for transmitting data such as the position data X, an interface (I/F) 708 for transmitting/receiving signals with respect to the wired communication unit 18, and a bus line (e.g., address bus, data bus) 709 for electrically connecting the units and elements included in the wireless communication unit 17.

Alternatively, the wireless communication unit 17 may also use ZigBee (registered trademark). The apparatus identification data C is data that is unique to the gateway 7 (communication unit 17) for identifying the gateway 7 (communication unit 17). The apparatus identification data C may be, for example, a MAC address.

On the other hand, as illustrated in FIG. 11, the wired communication unit 18 includes a CPU 801 for controlling overall operations of the wired communication unit 18, a ROM 802 for storing basic input/output programs and the apparatus identification data D therein, a RAM 803 used as a work area of the CPU 801, an Ethernet controller 805, an interface (I/F) 808a for transmitting/receiving signals with respect to the wireless communication unit 17, an interface (I/F) for transmitting/receiving signals with respect to the LAN 8e via a cable 809, and a bus line (e.g., address bus, data bus) 809 for electrically connecting the units and elements included in the wired communication unit 18.

The CPU 801 and the Ethernet controller 805 perform controls for converting a communication method (communication protocol) conforming to IEEE802.15.4 to a communication method (communication protocol) conforming to IEEE802.3 and performing Ethernet packet communications to transmit/receive various data distributed from the distribution apparatus 3.

The apparatus identification data D is data that is unique to the gateway 7 (communication unit 18) for identifying the gateway 7 (communication unit 18). The apparatus identification data D may be, for example, an IP (Internet Protocol) address. Although a MAC address is stored in the ROM 802, description of the MAC address is omitted for simplifying the description of the communication with respect to the position data management system 9.

Figure 12:
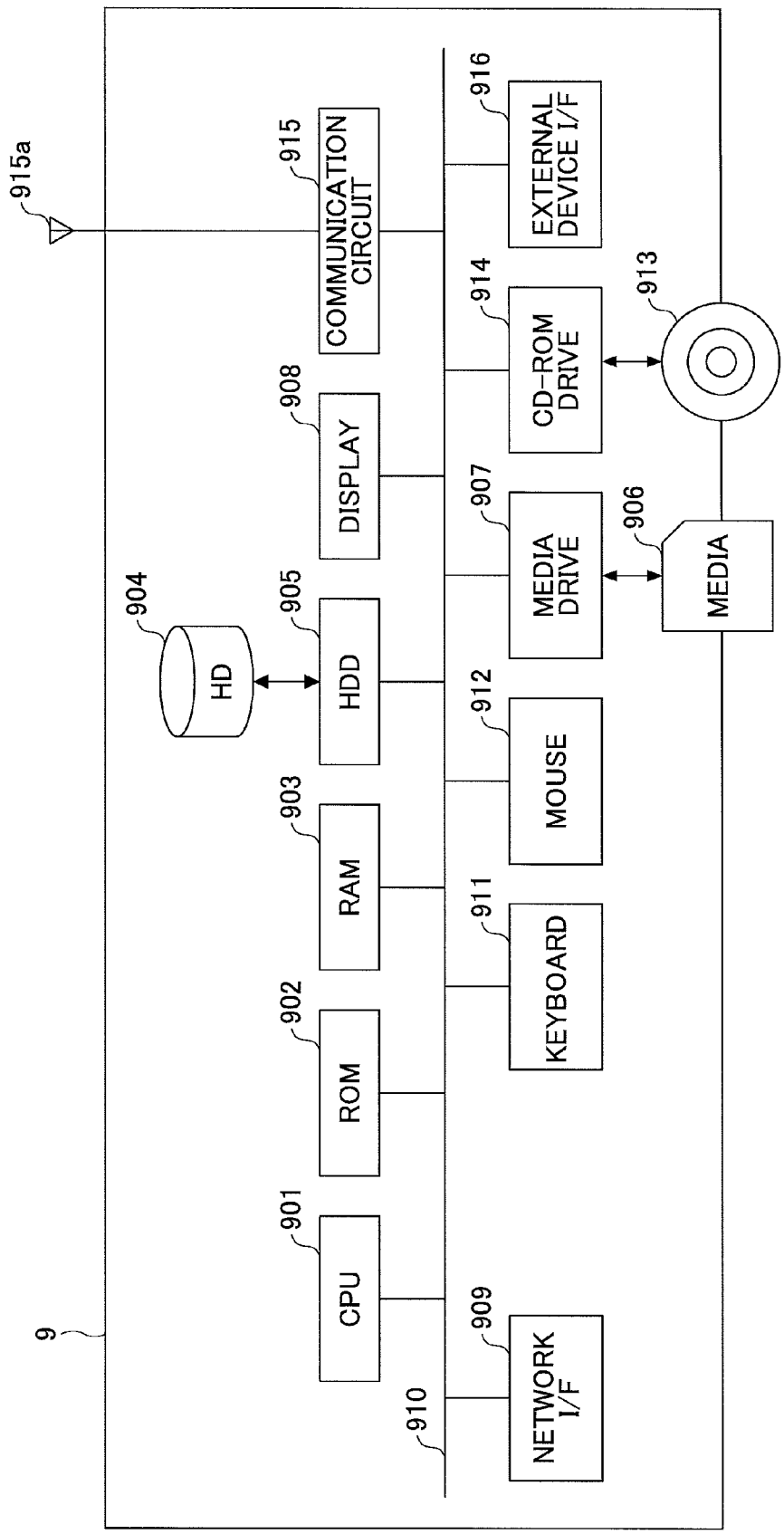
FIG. 12 is a schematic diagram illustrating a hardware configuration of a position data management system according to an embodiment of the present invention.

Next, a hardware configuration of the position data management system 9 according to an embodiment of the present invention is described with reference to FIG. 12. FIG. 12 is a schematic diagram illustrating the hardware configuration of the position data management system 9 according to an embodiment of the present invention.

The position data management system 9 is constituted by a computer. For example, the position data management system 9 includes a CPU 901 for controlling overall operations of the position data management system 9, a ROM 902 for storing a program (e.g., IPL (Initial Program Loader)) used for driving the CPU 901 therein, a RAM 903 used as a work area of the CPU 901, a HD (Hard Disk) 904 for storing various data such as programs for the position data management system 9 or system identification data E therein, a HDD (Hard Disk Drive) for controlling reading/writing (recording) data with respect to the HD 904 according to the controls of the CPU 901, a media drive 907 for controlling reading/writing (recording) of data with respect to a recording medium or media (e.g., flash memory) 906, a display 908 for displaying various data (e.g., cursors, menus, windows, characters, images), a network interface (I/F) 909 for performing data communications (transmission/reception) by way of a communication network 8, a keyboard 911 including multiple keys for inputting various data such as characters, numerals, and instructions, a mouse 912 for performing, for example, selection and execution of various instructions, selection of a process object, and moving of a cursor, a CD-ROM (Compact Disc Read Only Memory) driver 914 for controlling reading/writing (recording) of data with respect to a detachable recording medium (e.g., CD-ROM), a communication circuit 915 and an antenna 915a for performing wireless communication, an external device I/F 916 for connecting to an external device, and a bus line (e.g., address bus, data bus) 910 for electrically connecting the units and elements included in the position data management system 9.

The system identification data E is data that is unique to the position data management system 9 for identifying the position data management system 9. The system identification data E may be, for example, an IP address. Although a MAC address is stored in the ROM 902, description of the MAC address is omitted for simplifying the description of the communication with respect to the gateway 7.

Figure 25:
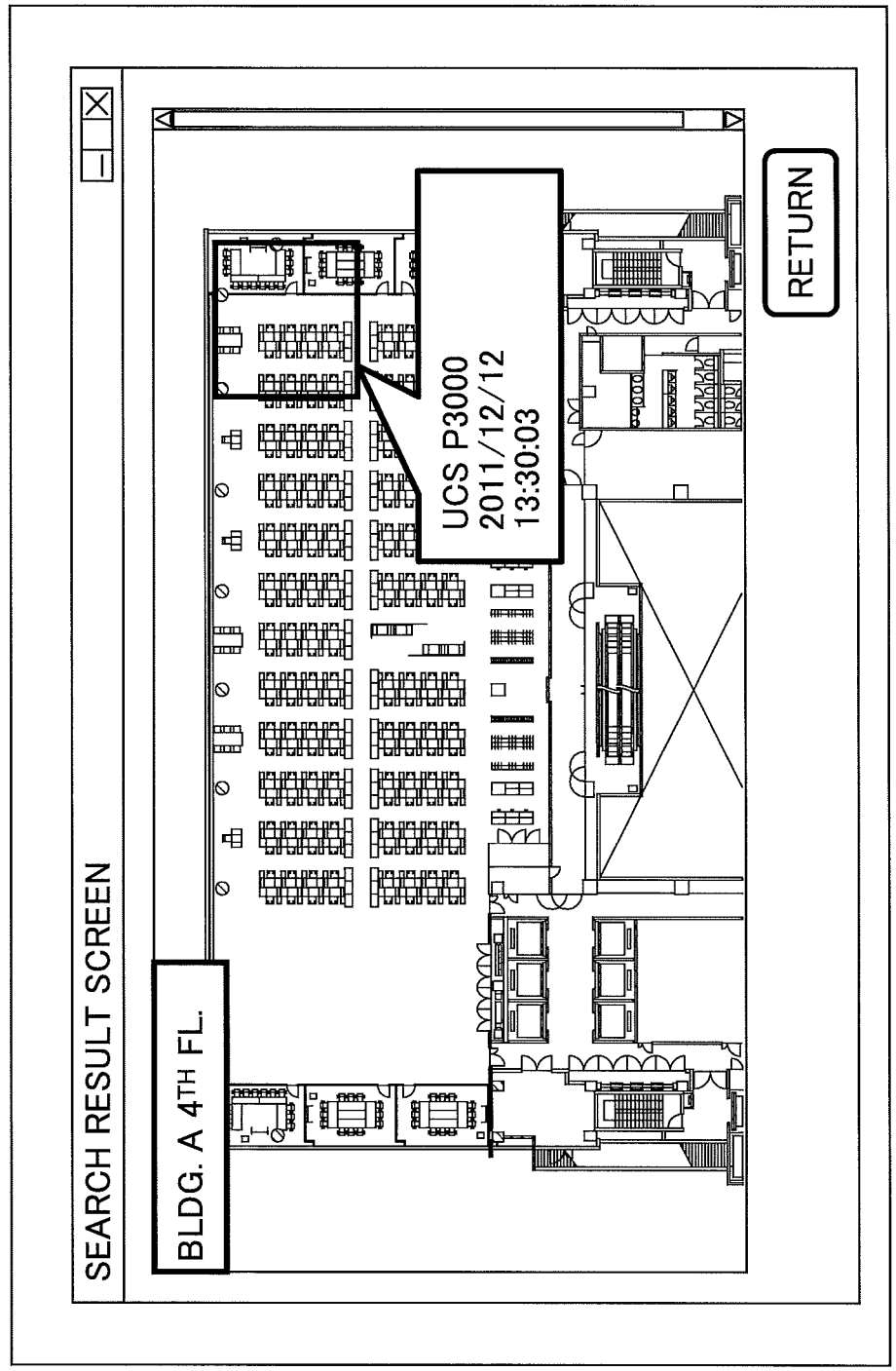
FIG. 25 is a schematic diagram illustrating another example of a screen of a position data management system according to an embodiment of the present invention.

Management data F (see FIG. 13) and layout data G are stored in the HD 904. FIG. 13 is a schematic diagram illustrating an example of the management data F managed by the position data management system 9 according to an embodiment of the present invention. As described below, the layout data includes data pertaining to, for example, a particular floor as illustrated in FIG. 25.

As illustrated in FIG. 13, the management data F has terminal identification data A, device name data, owner name data (administrator name data), position data X, and reception time/date data that are associated to each other.

As described above, the terminal identification data A is for identifying the communication terminal 5. The device name data is data indicating the name of the management object 4 or the name of the communication terminal 5. The owner name data (administrator name data) is data indicating the name of the owner or the administrator of the communication terminal 5. The position data X is the above-described data illustrated in FIG. 6. The reception time/date data is data indicating the time and date in which data such as position data X from the gateway 7 is received by the position data management system 9.

The terminal identification data A, the device name data, and the owner name data (administrator name data) are associated to each other beforehand and managed by the position data management system 9. In a case where the position data management system 9 receives the position data X and the terminal identification data A from the gateway 7, the position data management system 9 adds the received position data X and the terminal identification data A to a record portion of the management data F that includes the same terminal identification data A as the received terminal identification data A.

Further, in a case of newly receiving position data X and the terminal identification data A from the gateway 7 in a state where a corresponding position data X and its reception time/date data are already being managed by the position data management system 9, the position data management system 9 overwrites the managed position data and the reception time/date data with the newly received position data and its new reception time/date data.

Alternatively, in a case of newly receiving position data X and the terminal identification data A from the gateway 7 in a state where a corresponding position data X and its reception time/date data are already being managed by the position data management system 9, the position data management system 9 may generate a new record and record (write) the newly received position data and its new reception time/date data instead of overwriting the managed position data and reception time/date data.

Next, a functional configuration of the position management system 1 according to an embodiment of the present invention is described with reference to FIGS. 14-16. Along with describing the functional configuration with reference to FIGS. 14-16, a relationship between the functional configuration and the hardware configurations illustrated in FIGS. 10-12 are described.

Figure 14:
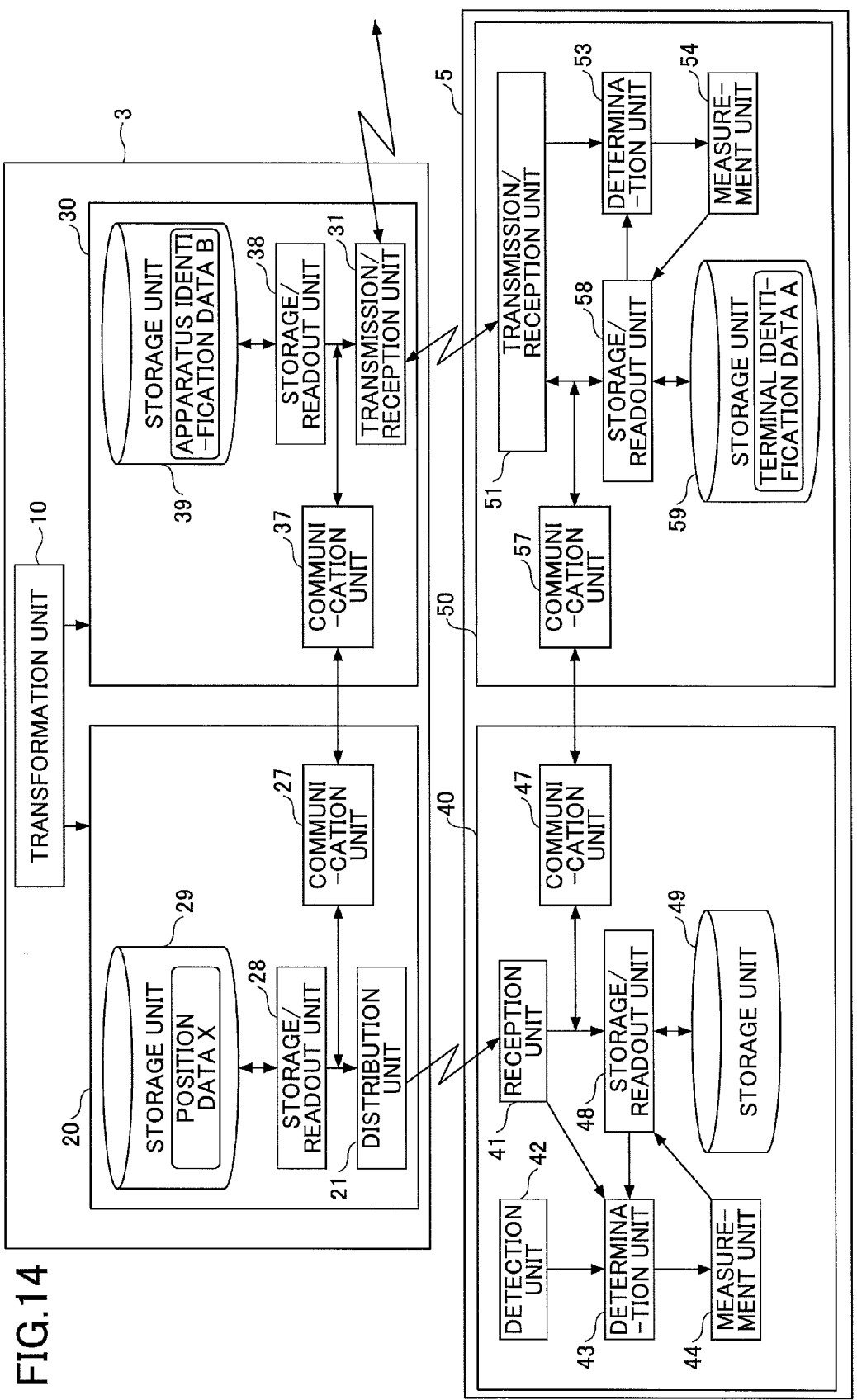
FIG. 14 is a block diagram illustrating functions (function components) of a distribution apparatus and a communication terminal according to an embodiment of the present invention.

FIG. 14 is a block diagram illustrating functions (function components) of the distribution apparatus 3 and the communication terminal 5 according to an embodiment of the present invention. As illustrated in FIG. 14, the distribution apparatus 3 includes functions or function components such as a transformation unit 10, a distribution control unit 20, and a wireless communication control unit 30. The transformation unit 10 is a function component (function) that is implemented by operating the voltage transformer 100 illustrated in FIG. 5.

The distribution control unit 20 is a function component (function) that is implemented by operating the control unit 11 and the position data distribution unit 12 illustrated in FIG. 5. The wireless communication control unit 30 is a function component (function) that is implemented by operating the control unit 11 and the wireless communication unit 13 illustrated in FIG. 5.

The distribution control unit 20 includes a storage unit 29 constituted by the ROM 202 illustrated in FIG. 5. The storage unit 29 stores the position data X therein. The distribution control unit 20 includes a distribution unit 21, a communication unit 27, and a storage/readout unit 28.

The distribution unit 21 distributes the position data X within a distributable range. The distribution unit 21 is a function component (function) that is implemented mainly by the processes of the CPU 201 and the communication circuit 204 illustrated in FIG. 5.

The communication unit 27 performs data (signal) communication (i.e. transmits/receives data (signals)) with respect to the wireless communication control unit 30. The communication unit 27 is a function component (function) that is implemented mainly by the processes of the CPUs 101, 201, the interfaces 108a, 208, and the buses 109, 209.

The storage/readout unit 28 stores various data (e.g., position data X) and reads out the stored data. The storage/readout unit 28 is a function component (function) that is implemented mainly by the processes of the CPUs (101, 201).

The wireless communication control unit 30 includes a storage unit 39 that is constituted by the RAM 303 illustrated in FIG. 5. The storage unit 39 stores the apparatus identification data B therein.

A transmission/reception unit 31 transmits/receives various data with respect to the communication unit 5 or the gateway 7 by way of wireless communication. The transmission/reception unit 31 is a function component (function)

that is implemented mainly by the processes of the CPU 301 and the communication circuit 304 illustrated in FIG. 5.

A communication unit 37 performs data (signal) communication with respect to the distribution control unit 20. The communication unit 37 is a function component (function) that is implemented mainly by the processes of the CPUs 101, 301, the interfaces 108B, 308, and the buses 109, 309.

A storage/readout unit 38 stores various data in the storage unit 29 and reads out the stored data.

Next, a functional configuration of the communication terminal 5 according to an embodiment of the present invention is described.

The communication terminal 5 includes functions or function components such as a reception control unit 40 and a wireless communication control unit 30.

The reception control unit 40 includes a storage unit 49 which is constituted by the RAM 403 illustrated in FIG. 7. The storage unit 49 can store the position data X distributed from the distribution apparatus 3 therein. The reception control unit 40 includes a reception unit 41, a detection unit 42, a determination unit 43, a measurement unit 44, a communication unit 47, and a storage/readout unit 48.

The reception unit 41 receives the position data X distributed from the distribution apparatus 3. Further, the reception unit 41 switches between a state capable of receiving the position data X and a state unable to receive the position data X. The reception unit 41 is a function component (function) that is implemented mainly by the processes of the CPU 401 and the communication circuit 404 illustrated in FIG. 7.

The detection unit 42 detects the movement (including tilt) of the communication terminal 5 and causes the reception unit 41 to start operation (e.g., data reception). The detection unit 42 is a function component (function) that is implemented mainly by the processes of the CPU 401 and the acceleration sensor 405. Instead of the acceleration sensor 405, the function of the detection unit 42 may be implemented with a motion sensor using, for example, inertial force or magnetic force.

The determination unit 43 determines whether at least a single position data X has been received by the reception unit 41. Further, the determination unit 43 determines whether the position data X corresponding to each one of multiple distribution apparatuses 3 has been received by the reception unit 41. The determination unit 43 is a function component (function) that is implemented mainly by the processes of the CPU 401 illustrated in FIG. 7. In a case where the position data X is received from the same distribution apparatus 3 for a multiple number of times within the below-described predetermined time, the multiply received distribution data X are handled as a single distribution data.

In a case where the determination unit 43 determines that position data X corresponding to each of the multiple distribution apparatuses 3 have been received, the measurement unit 44 measures the signal strength of each of the position data X received from the multiple distribution apparatuses 3. The measurement unit 44 is a function component (function) that is implemented mainly by the CPU 401 illustrated in FIG. 7.

The communication unit 47 performs data (signal) communication with respect to the wireless communication unit 50. The communication unit 47 is a function component (function) that is implemented mainly by the processes of the CPU 401, the I/F 408, and the bus 409 illustrated in FIG. 7.

The storage/readout unit 48 stores various data (e.g., position data X) in the storage unit 49 and reads out the stored data from the storage unit 49. The storage/readout unit 48 is a functional component (function) that is implemented by the CPU 401.

The wireless communication unit 50 includes a storage unit 59, which is constituted by the RAM 503 illustrated in FIG. 5. The storage unit 59 stores the position data A therein. The wireless communication unit 50 also includes a transmission/reception unit 51, a determination unit 53, a measurement unit 54, a communication unit 57, and a storage/readout unit 58.

The transmission/reception unit 51 transmits/receives various data with respect to the distribution apparatus 3 by way of wireless communication. The transmission/reception unit 51 is a function component (function) implemented mainly by the CPU 501 and the communication circuit 504 illustrated in FIG. 7.

The determination unit 53 determines whether at least a single apparatus identification data B has been received by the reception unit 51. Further, the determination unit 53 determines whether the apparatus identification data B corresponding to each one of multiple distribution apparatuses 3 has been received by the reception unit 51. The determination unit is a function component (function) that is implemented mainly by the processes of the CPU 501 illustrated in FIG. 7. In a case where the apparatus identification data B is received from the same distribution apparatus 3 for a multiple number of times within the below-described predetermined time, the multiply received apparatus identification data B are handled as a single apparatus identification data.

In a case where the determination unit 53 determines that apparatus identification data B corresponding to each of the multiple distribution apparatuses 3 have been received, the measurement unit 54 measures the signal strength of each of the apparatus identification data B received from the multiple distribution apparatuses 3. The measurement unit 54 is a function component (function) that is implemented mainly by the CPU 501 illustrated in FIG. 7.

The communication unit 57 performs data (signal) communication with respect to the reception control unit 40. The communication unit 57 is a function component (function) that is implemented mainly by the processes of the CPU 501, the I/F 508, and the bus 509 illustrated in FIG. 7.

The storage/readout unit 58 stores various data (e.g., apparatus identification data A, B) in the storage unit 59 and reads out the stored data from the storage unit 59. The storage/readout unit 58 is a function component (function) that is implemented by the CPU 501.

Next, a functional configuration of a management object (4g, 4h) is described with reference to FIG. 15. FIG. 15 is a block diagram illustrating functions (function components) of the management object 4 in a case where the management object is a personal computer 4g or a mobile phone 4h.

Figure 15:
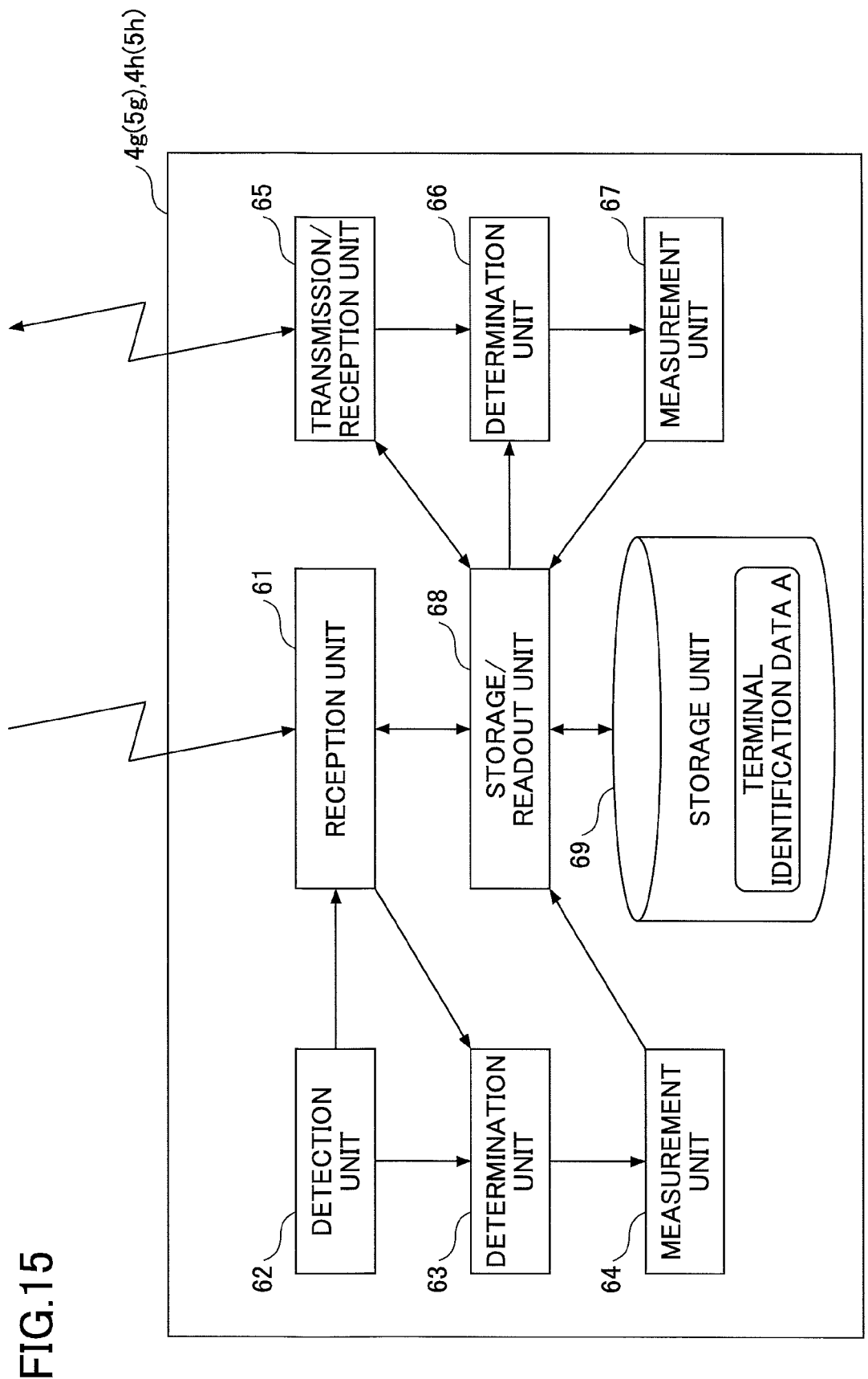
FIG. 15 is a block diagram illustrating functions (function components) of a management object in a case where the management object is a personal computer or a mobile phone according to an embodiment of the present invention.

As illustrated in FIG. 15, the management object (4g, 4h) includes a storage unit 69 that is constituted by the EEEPROM 604 illustrated in FIG. 10 or the RAM 903 and the HD 904 illustrated in FIG. 12. The management object (4g, 4h) also includes a reception unit 61, a detection unit 62, a determination unit 63, a measurement unit 64, a determination unit 66, a measurement unit 67, and a storage/readout unit 68.

The reception unit 61 has the same function as the reception unit 41. The reception unit 61 is a function component (function) that is implemented mainly by the processes of the CPU 601 and the GPS unit 614 illustrated in FIG. 10 or the processes of the CPU 901 and the GPS antenna connected to the external device I/F unit 916 illustrated in FIG. 12.

The detection unit 62 has the same function as the detection unit 42. The detection unit 62 is a function component (function) that is implemented mainly by the processes of the CPU 601 and the acceleration/bearing sensor 606 illustrated in FIG. 10 or the processes of the CPU 901 and the acceleration sensor connected to the external device I/F 916 illustrated in FIG. 12.

The determination unit 63 has the same function as the determination unit 43. The determination unit 63 is a function component (function) that is implemented mainly by the processes of the CPU 601 illustrated in FIG. 10 or the processes of the CPU 901 illustrated in FIG. 12.

The measurement unit 64 has the same function as the measurement unit 44. The measurement unit 64 is a function component (function) that is implemented mainly by the CPU 601 illustrated in FIG. 10 or the processes of the CPU 901 illustrated in FIG. 12.

The transmission/reception unit 65 has the same function as the transmission/reception unit 51. The transmission/reception unit 65 is a function component (function) that is implemented mainly by the processes of the CPU 601 and the communication unit 613 illustrated in FIG. 10 or the processes of the CPU 901 and the communication unit 915 illustrated in FIG. 12.

The determination unit 66 has the same function as the determination unit 53. The determination unit 66 is a function component (function) that is implemented mainly by the processes of the CPU 601 illustrated in FIG. 10 or the processes of the CPU 901 illustrated in FIG. 12.

The measurement unit 67 has the same function as the measurement unit 54. The measurement unit 67 is a function component (function) that is implemented mainly by the CPU 601 illustrated in FIG. 10 or the processes of the CPU 901 illustrated in FIG. 12.

The storage/readout unit 68 has the same function as the storage/readout unit 48 or the storage/readout unit 58. The storage/readout unit 68 is a function component (function) that is implemented mainly by the CPU 601 illustrated in FIG. 10 or the processes of the CPU 901 illustrated in FIG. 12.

Next, a functional configuration of the gateway 7 according to an embodiment of the present invention is described with reference to FIG. 16. FIG. 16 is a block diagram illustrating functions (function components) of the gateway 7 and the position data management system 9 according to an embodiment of the present invention.

The gateway 7 includes functions or function components such as a wireless communication control unit 70 and a wired communication control unit 80.

The wireless communication control unit 70 basically has the same function as the wireless communication control unit 30 of the distribution apparatus 3. The wireless communication control unit 70 is a function component (function) that is implemented by the processes of the wireless communication unit 17 illustrated in FIG. 11.

The wireless communication control unit 70 includes a storage unit 79 that is constituted by the RAM 703 illustrated in FIG. 11. The storage unit 79 has the apparatus identification data C stored therein. The wireless communication control unit 70 also includes a transmission/reception unit 71, a communication unit 77, and a storage/readout unit 78.

The transmission/reception unit 71 transmits/receives various data with respect to the distribution apparatus 3 by way of wireless communication. The transmission/reception unit 71 is a function component (function) that is implemented mainly by the processes of the CPU 701 and the communication circuit 704 illustrated in FIG. 11.

The communication unit 77 performs data (signal) communication with respect to the wired communication control unit 80. The communication unit 77 is a function component (function) that is implemented mainly by the CPU 701, the I/F 708, and the bus 709.

The storage/readout unit 78 stores various data in the storage unit 79 and reads out the stored data from the storage unit 79. The storage/readout unit 78 is a function component (function) that is implemented mainly by the CPU 801.

The wired communication control unit 80 includes a storage unit 89 constituted by the RAM 803 illustrated in FIG. 11. The storage unit 89 has the apparatus identification data D stored therein. The wired communication control unit 80 also includes a transmission/reception unit 81, a conversion unit 82, a communication unit 87, and a storage/readout unit 88. The wired communication control unit 80 is a function component (function) implemented by the wired communication unit 18 illustrated in FIG. 11.

The transmission/reception unit 81 transmits/receives data with respect to the position data management system 9 by way of wired communication. The transmission/reception unit 81 is a functional component (function) that is implemented mainly by the processes of the CPU 801 and the I/F 808b illustrated in FIG. 11.

The conversion unit 82 performs controls for converting communication methods, so that Ethernet packet communication can be performed with the various data transmitted from the distribution apparatus 3. The conversion unit 82 is a function component (function) that is implemented mainly by the CPU 801 and the Ethernet controller 805 illustrated in FIG. 11.

The communication unit 87 performs data (signal) communication with respect to the wireless communication control unit 70. The communication unit 87 is a function component (function) implemented mainly by the processes of the CPU 801, the I/F 808a, and the bus 809.

The storage/readout unit 98 stores various data in the storage unit 89 and reads out the stored data from the storage unit 89. The storage/readout unit 98 is a function component (function) that is implemented mainly by the processes of the CPU 801.

Next, a functional configuration of the position data management system 9 according to an embodiment of the present invention is described with reference to FIG. 16.

The position data management system 9 includes a storage unit 99 that is constituted by the RAM 903 and the HD 904 illustrated in FIG. 12. The storage unit 99 has the system identification data E, the management data F, and the layout data G stored therein. The position data management system 9 also includes a transmission/reception unit 91, an operation input reception unit 92, a search unit 93, a display control unit 94, and a storage/readout unit 98.

The transmission/reception unit 91 transmits/receives various data with respect to the gateway 7 by way of wired communication or wireless communication. Further, the transmission/reception unit 91 transmits/receives various data with respect to the communication terminal 5h in the outdoor area γ via the communication network 8. The transmission/reception unit 91 is a function component (function) that is implemented mainly by the processes of the CPU 901 and the network I/F or the communication circuit 915 illustrated in FIG. 12.

The operation input reception unit 92 receives various inputs or selections from the administrator of the position data management system 9. The operation input reception unit 92 is a function component (function) that is implemented mainly by the processes of the CPU 901 and the keyboard 911, and the mouse 912.

The search unit 93 searches the management data F of the storage unit 99 by way of the storage/readout unit 98 based on search conditions input to the operation input reception unit 92. The search unit 93 is a function component (function) that is implemented mainly by the processes of the CPU 901.

The display control unit 94 performs controls for displaying various data (e.g., images, characters) on the display 908. The display control unit 94 is a function component (function) that is implemented mainly by the processes of the CPU 901.

The storage/readout unit 98 stores various data in the storage unit 99 and reads out stored data from the storage unit 99. The storage/readout unit 98 is a function component (function) that is implemented mainly by the processes of the CPU 901.

Figure 17:
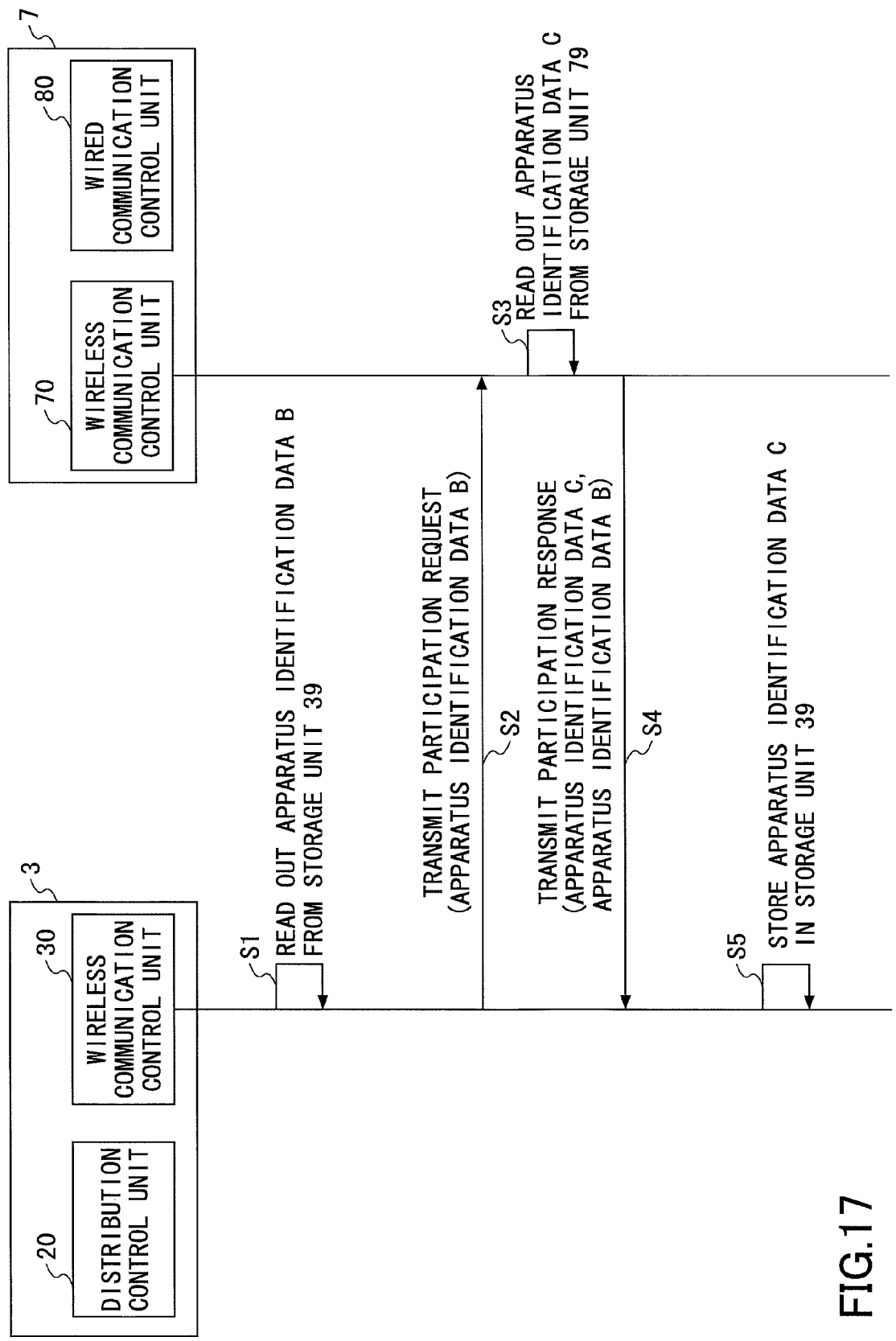
FIG. 17 is a sequence diagram illustrating an operation of establishing a communication network in a ceiling according to an embodiment of the present invention.

Next, operations according to an embodiment of the present invention are described with reference to FIGS. 17 and 25.

First, an operation of establishing (building) a communication network in the ceiling β of the indoor area α is described with reference to FIG. 17. FIG. 17 is a sequence diagram illustrating an operation of establishing a communication network in a ceiling.

First, when a user switches on the power of each electric device 2 in the indoor area α, the storage/readout unit 38 (see FIG. 14) of the wireless communication control unit 30 in each distribution apparatus 3 reads out apparatus identification data B from the storage unit 39 (Step S1). Then, the transmission/reception unit 31 transmits a participation request including the apparatus identification data B of the distribution apparatus 3 itself to the gateway 7 (Step S2). Thereby, the transmission/reception unit 71 of the wireless communication control unit 70 of the gateway 7 receives the participation request.

Then, the storage/readout unit 78 of the wireless communication control unit 70 reads out the apparatus identification data C from the storage unit (Step S3). Then, the transmission/reception unit 71 transmits a participation response including the apparatus identification data B, C (Step S4) to the distribution apparatus 3. Thereby, the transmission/reception unit 31 of the wireless communication control unit 30 of the distribution apparatus 3 receives the participation response. Because the participation response includes the apparatus identification data B transmitted in Step S2, the wireless communication unit 30 performs the process of receiving the participation response of Step S4 in association with the process of transmitting the participation request of Step S2. Then, the storage/readout unit 38 stores the apparatus identification data C in the storage unit (Step S5). Accordingly, by storing the apparatus identification data C of the gateway 7 at the side of the distribution apparatus 3, a communication network between the distribution apparatus 3 and the gateway 7 can be established.

Figure 18:
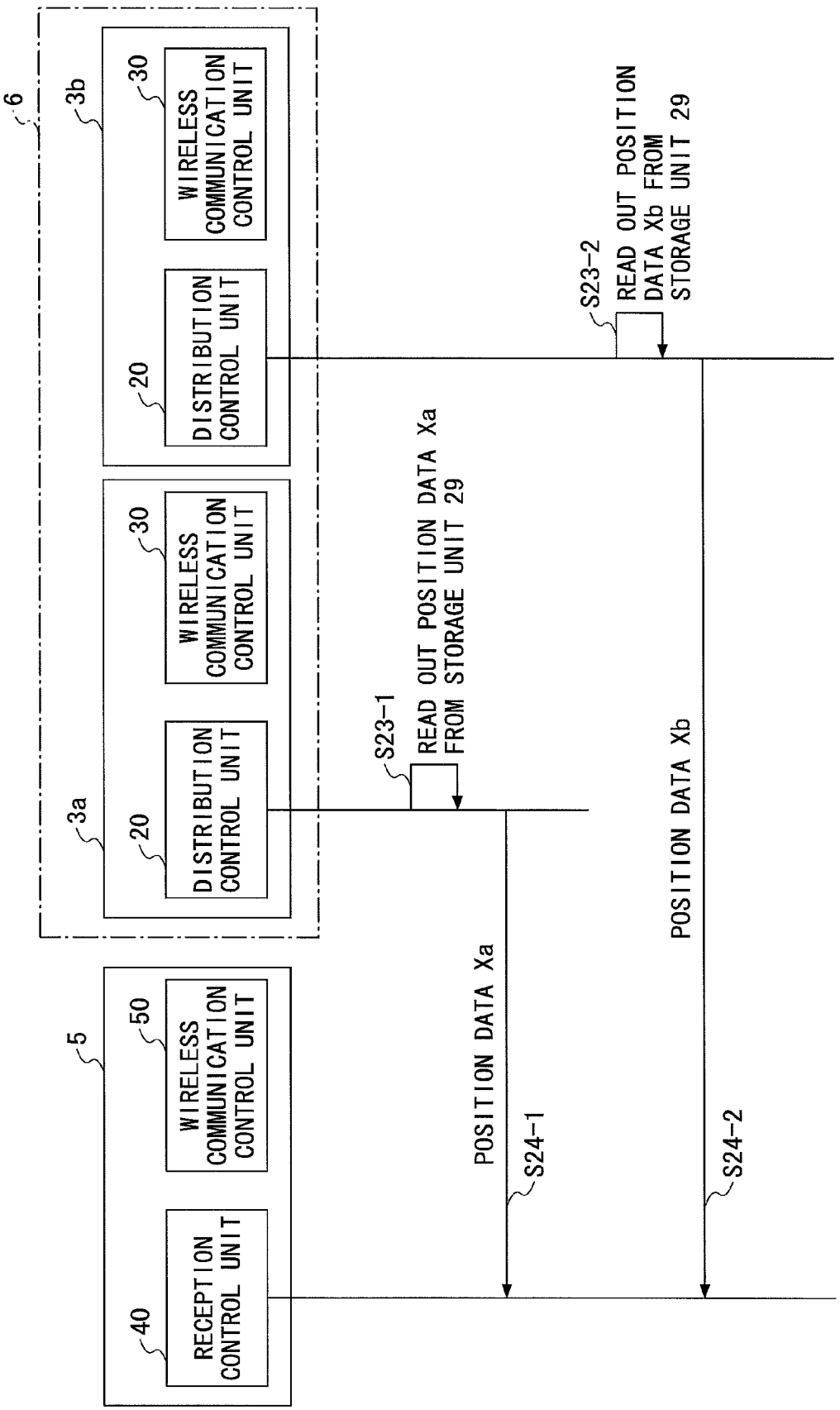
FIG. 18 is a sequence diagram illustrating an operation of distributing position data according to an embodiment of the present invention.

Next, an operation of distributing position data X from the ceiling β in the direction of the floor of the indoor area α (as illustrated in FIG. 1) is described with reference to FIG. 18. FIG. 18 is a sequence diagram illustrating an operation of distributing position data X according to an embodiment of the present invention. For the sake of convenience, FIG. 18 illustrates an example where a distribution system 6 is constituted by two distribution apparatuses 3*a*, 3*b*. In the example of FIG. 18, the distribution apparatus 3*a* distributes position data Xa and the distribution apparatus 3*b* distributes position data Xb. In the example of FIG. 18, the communication terminal 5 is positioned within a range (distributable range) in which position data Xa, Xb are distributable from the distribution apparatuses 3*a*, 3*b*, respectively.

First, the storage/readout unit 28 of the distribution control unit 20 of the distribution apparatus 3*a* reads out position data Xa of the distribution apparatus 3*a* itself from the storage unit 29 (Step S23-1). Then, the distribution unit 21 of the distribution control unit 20 of the distribution apparatus 3*a* distributes the position data Xa within the distributable range (Step S24-1). Likewise, the storage/readout unit 28 of the distribution control unit 20 of the distribution apparatus 3*b* reads out position data Xb of the distribution apparatus 3*b* itself from the storage unit 29 (Step S23-2). Then, the distribution unit 21 of the distribution control unit 20 of the distribution apparatus 3*b* distributes the position data Xb within the distributable range (Step S24-2). It is, however, to be noted that the communication terminal 5 is unable to receive the position data Xa, Xb if operation of the reception part 41 of the communication terminal 5 is not started.

Figure 19:
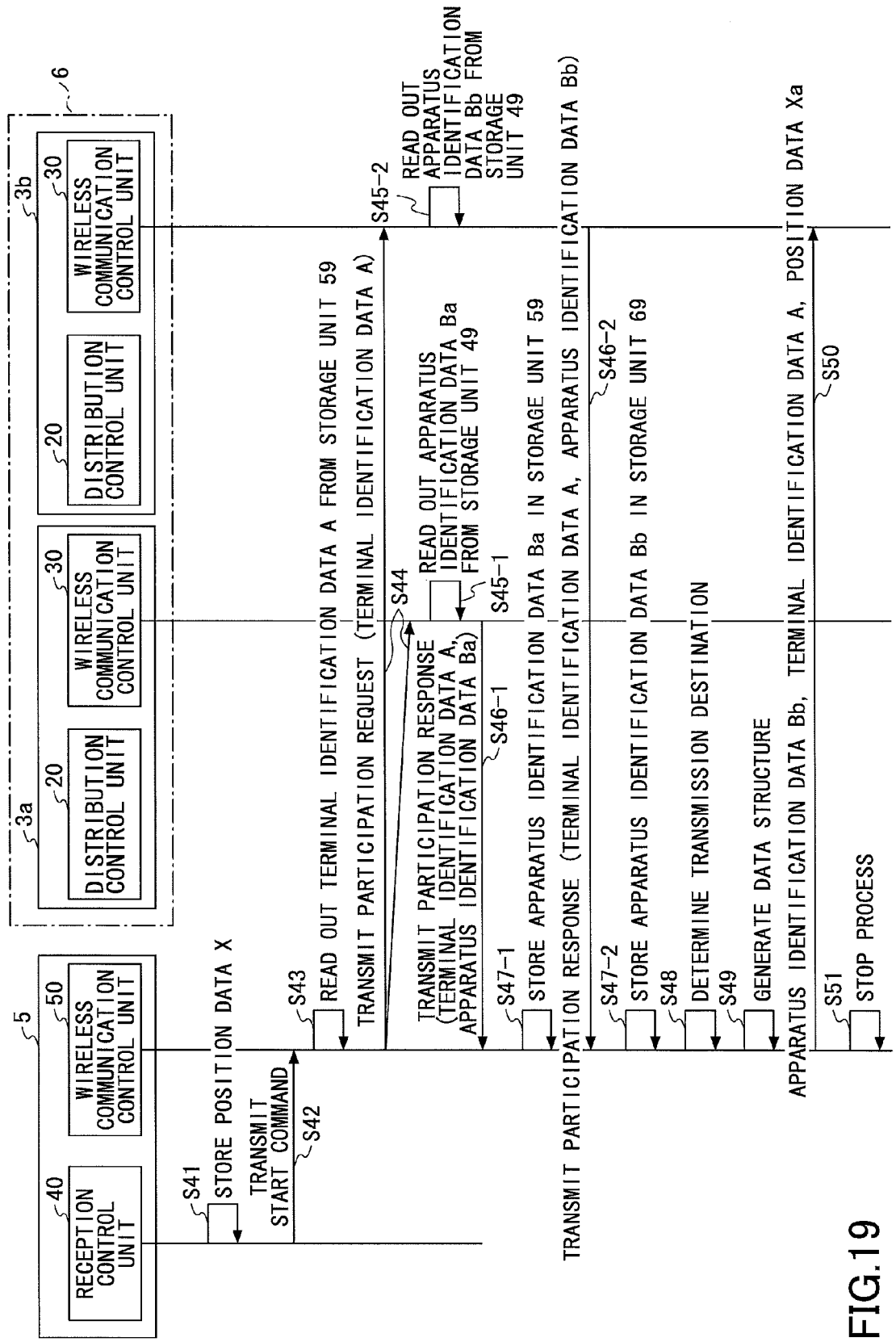
FIG. 19 is a sequence diagram illustrating an operation of determining position data to be used by a communication terminal and determining a transmission destination of the position data according to an embodiment of the present invention.

Next, an operation of determining the position data X to be used by the communication terminal 5 and determining the transmission destination of the position data X is described with reference to FIG. 19. FIG. 19 is a sequence diagram illustrating an operation of determining the position data X to be used by the communication terminal 5 and determining the transmission destination of the position data X. FIG. 19 illustrates an example of receiving the position data X transmitted from the distribution apparatus Xa with the communication terminal but transmitting the position data Xa to the distribution apparatus Xb rather than the transmission source of the position data Xa (i.e. rather than the distribution apparatus Xa).

First, as illustrated in FIG. 19, the storage/readout unit 48 of the reception control unit 40 of the communication terminal 5 stores one of the position data Xa, Xb distributed by the distribution apparatus 3*a*, 3*b* in the storage unit 49 (Step S41). Among the position data Xa, Xb distributed by the distribution apparatus 3*a*, 3*b*, the position data that is to be stored in the storage unit 49 is the position data having the highest signal strength among the position data Xa, Xb when received by the communication terminal 5. Accordingly, the position indicated by the position data X stored in the storage unit 49 (i.e. one of the position data Xa or Xa in the example of FIG. 19) is to be managed as the position of the communication terminal 5 in a subsequent process by the position data management system 9.

Figure 20:
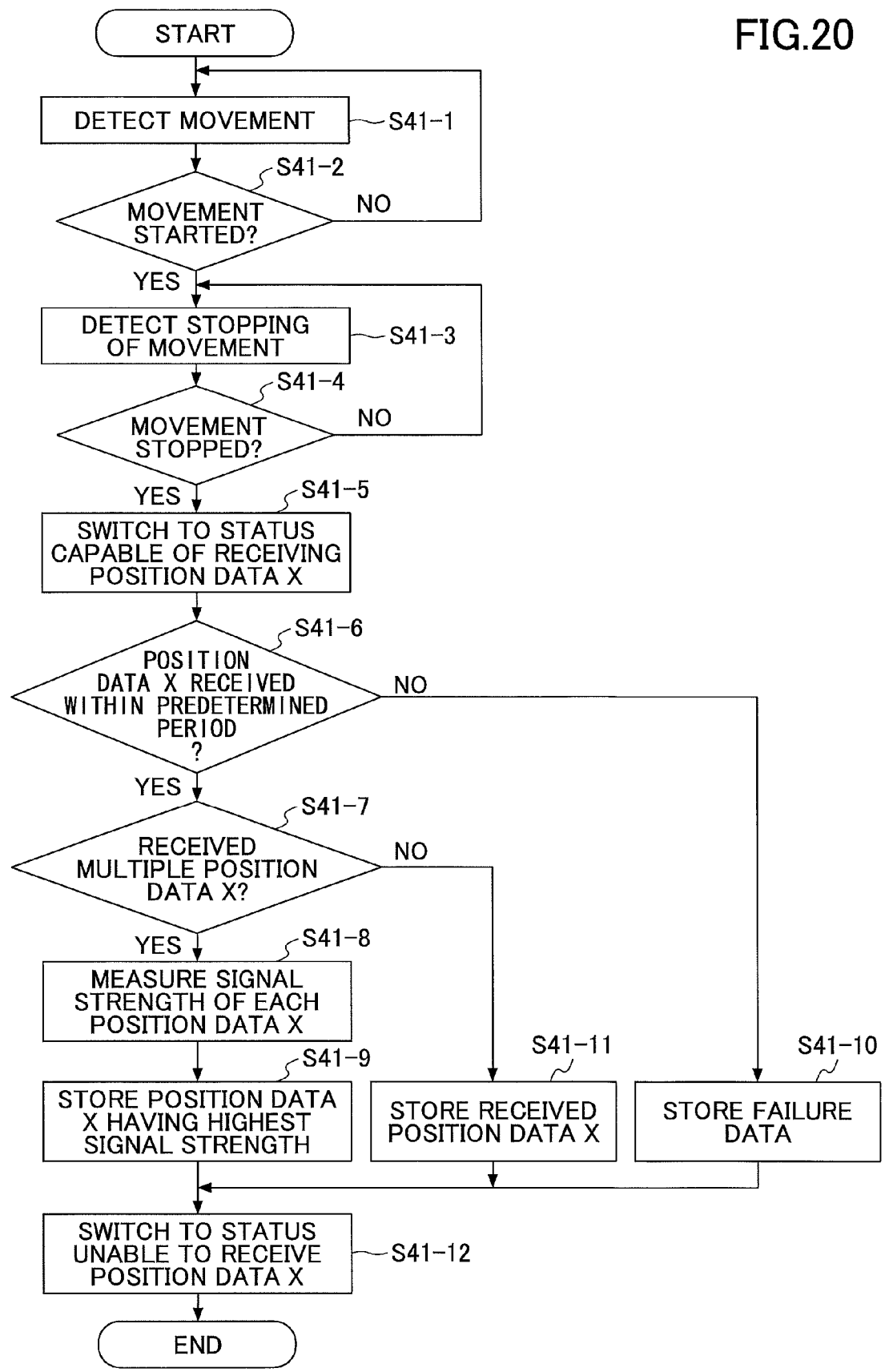
FIG. 20 is a flowchart illustrating an operation that begins when position data is received by a communication terminal and ends when the position data is stored by the communication terminal according to an embodiment of the present invention.

The process performed in Step S41 is described in further detail with reference to FIG. 20. FIG. 20 is a flowchart illustrating an operation that begins when position data X is received by the communication terminal 5 and ends when the position data X is stored by the communication terminal 5 according to an embodiment of the present invention.

First, the detection unit 42 of the reception control unit 40 of the communication terminal 5 starts and continues to detect the starting of movement of the communication terminal 5 (Step S41-1, No in Step S41-2). Then, in a case where the detection unit 42 detects the starting of movement of the communication terminal 5 (Yes in Step S41-2), the detection unit 42 starts and continues to detect the stopping of movement of the communication terminal 5 (Step S41-3, S41-4). More specifically, in a case where operation (processing) of the CPU 401 of FIG. 7 is in a stopped state, the acceleration sensor 405, upon detecting change of acceleration, transmits a signal indicating the starting of movement of the communication terminal (i.e. signal instructing the CPU 401 to start operating) to the CPU 401. Thereby, the CPU 401 starts to operate (processing). Then, the CPU 401 maintains a state of operating until receiving a signal from the acceleration sensor 405 indicating that the movement of the communication terminal 5 has stopped. It is to be noted that movement of the communication terminal 5 includes tilting of the communication terminal 5.

Then, in a case where the detection unit 42 detects the stopping of movement of the communication terminal 5 (Yes in Step S41-4), the reception unit 41 switches to a state capable of receiving position data distributed from the distribution apparatus 3 (Step S41-5). More specifically, in a case where the CPU 407 of FIG. 7 receives a signal indicating the stopping of movement of the communication terminal 5 from the acceleration sensor 505, the CPU 407 transmits a signal to the communication circuit 404 instructing the communication circuit 404 to start operating. Thereby, the communication circuit 404 starts to operate. In a case where position data Xa, Xb are received from the distribution apparatus 3a and 3b, the communication circuit 404 of the control unit 14 of the communication terminal 5 starts reception of position data Xa, Xb by way of the antenna 404a.

Then, after the reception unit 41 is switched to the state capable of receiving the position data X, the determination unit 43 determines whether at least a single position data X has been received within a predetermined time (e.g., within 5 seconds) (Step S41-6). In the description of the example of FIG. 20, it is assumed that position data Xa and Xb have been received within the predetermined time.

In a case where the determination unit 43 determines that at least a single position data X has been received within the predetermined time (Yes in Step S41-6), the determination unit 43 determines whether multiple position data X have been received (Step S41-7).

In a case where the determination unit 43 determines that multiple position data X have been received (Yes in Step S41-7), the measurement unit 44 measures the signal strength of each of the multiple position data X upon receipt by the reception unit 41 (Step S41-8). In the example of FIG. 20, it is assumed that the signal strength of the position data Xa is stronger than the signal strength of the position data Xb as a result of the measurement by the measurement unit 44.

Then, the storage/readout unit 48 stores the position data X having the highest signal strength in the storage unit 49 according to the measurement of Step S41-8 (Step S41-9). In this example, the position data Xa is stored in the storage unit 49.

In a case where the determination unit 43 determines that not a single position data X has been received within the predetermined time (No in Step S41-6), the storage/readout unit 43 stores failure data indicating failure of receiving position data X in the storage unit 49 (Step S41-10).

Further, in a case where the determination unit 43 determines that multiple position data have not been received within the predetermined time (No in Step S41-7), the storage/readout unit 48 stores the single position data X in the storage unit 49 (Step S41-11).

Then, after the processes in Steps S41-9, S41-10, or S41-11, the reception unit 41 switches to a state of being unable to receive the position data X (Step S41-12). More specifically, the CPU 407 of FIG. 7 transmits a signal to the communication circuit 404 instructing the communication circuit 404 to stop operating. Accordingly, because the reception of the position data X is performed only after the moving of the communication terminal is stopped, the frequency of performing battery change can be reduced even where a small capacity battery such as the button battery 406 is used. This contributes to power saving (energy saving).

As described above, the reception unit 41 is switched to a state capable of receiving the position data X after the starting of movement of the communication terminal 5 (Yes in Step S41-2) and the stopping of movement of the communication terminal (Yes in Step S41-4). In other words, the trigger for switching the reception unit 41 to a state capable of receiving position data is the execution (detection) of both the starting of movement of the communication terminal 5 and the stopping of movement of the communication terminal 5. Alternatively, the reception unit 41 may be switched to a state capable of receiving the position data X after the starting of movement of the communication terminal 5 (Yes in Step S41-2). In other words, the processes of Step S41-3 and S41-4 may be omitted, so that the trigger for switching the reception unit 41 to a state capable of receiving position data is the execution (detection) of the starting of movement of the communication terminal 5. Alternatively, the processes of Step S41-1 and S41-2 may be omitted, so that the trigger for switching the reception unit 41 to a state capable of receiving position data is the execution (detection) of the stopping of movement of the communication terminal 5.

Then, returning to FIG. 19, the communication unit 47 of the reception control unit 40 transmits a command (start command) to the wireless communication control unit 50 instructing to start operating (Step S42). Thereby, when the communication unit 57 of the wireless communication unit 50 receives the start command, the performing of the following processes is started.

First, the storage/readout unit 58 of the wireless communication control unit 50 of the communication terminal 5 reads out the terminal identification data A of the communication terminal 5 itself from the storage unit 59 (Step S43). Then, the transmission/reception unit 51 transmits a participation request including the terminal identification data A to the distribution apparatuses 3a, 3b. Each of the distribution apparatuses 3a, 3b receives the participation request from the communication terminal 5.

Then, the storage/readout unit 38 of the wireless communication unit 30 of the distribution apparatus 3a reads out the apparatus identification data Ba of the distribution apparatus 3a itself from the storage unit 39 (Step S45-1). Then, the transmission/reception unit 31 of the distribution apparatus 3a transmits a participation response including the terminal identification data A and the apparatus identification data Ba to the communication terminal 5 (Step S46-1). Thereby, the transmission/reception unit 51 of the wireless communication control unit 50 of the communication terminal 5 receives the participation response. Because the terminal identification data A transmitted in Step S44 is included in the participation response, the communication terminal 5 performs the process of receiving the participation response of Step S46-1 in association with the process of transmitting the participation request of Step S44. Then, the storage/readout unit 58 of the wireless communication control unit 50 of the communication terminal 5 stores the apparatus identification data Ba in the storage unit 59 (Step S47-1).

Similarly, at the side of the distribution apparatus 3b, the storage/readout unit 38 of the wireless communication control unit 30 of the distribution apparatus 3b reads out the apparatus identification data Bb of the distribution apparatus 3b itself from the storage unit 39 (Step S45-2). Then, the transmission/reception unit 31 of the distribution apparatus 3b transmits a participation response including the terminal identification data A and the apparatus identification data Bb to the communication terminal 5 (Step S46-2). Thereby, the transmission/reception unit 51 of the wireless communication control unit 50 of the communication terminal 5 receives the participation response. Then, the storage/readout unit 58 of the wireless communication control unit 50 of the communication terminal 5 stores the apparatus identification data Bb in the storage unit 59 (Step S47-2).

Figure 21:
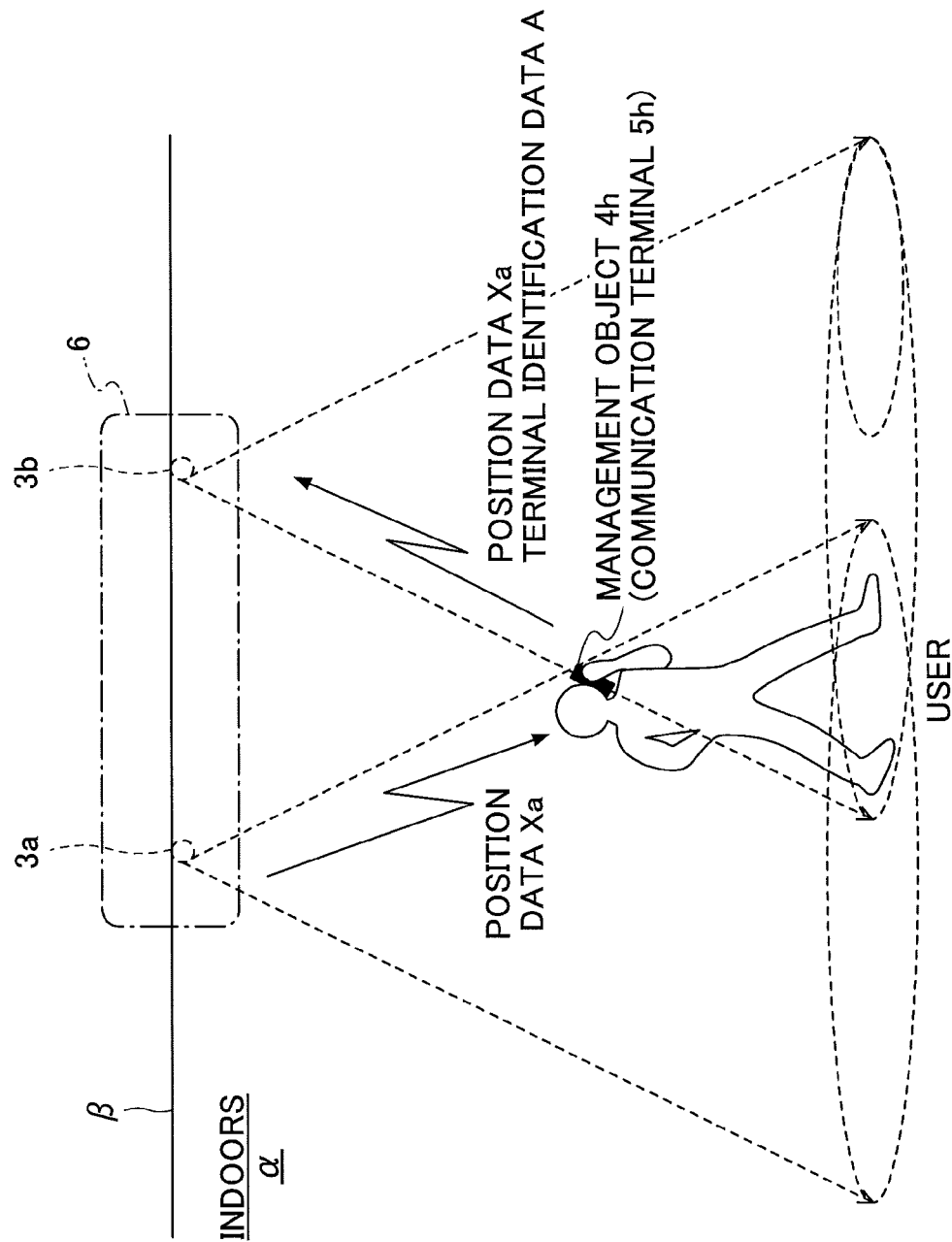
FIG. 21 is a schematic diagram illustrating a state of communication between a distribution apparatus and a communication terminal according to an embodiment of the present invention.

Then, the wireless communication control unit 50 determines the position data X received from the distribution apparatus 3 and the distribution apparatus 3 (transmission destination) to which the terminal identification data A of the communication terminal 5 itself is to be transmitted (Step S48). Next, the process of Step S48 is described in detail with reference to FIG. 22. Before describing the process of Step S48, the background of the process of Step S48 is described with reference to FIGS. 5, 14, and 21. FIG. 21 is a schematic diagram illustrating a state of communication between the distribution apparatus 3 and the communication terminal 5.

As illustrated in FIG. 14, the communication between the distribution control unit 20 of the distribution apparatus 3 and the reception control unit 40 of the communication terminal 5 is separate from the communication between the wireless communication control unit 30 of the distribution apparatus 3 and the wireless communication control unit 50 of the communication terminal 5. Further, the reception control unit 40 receives the position data X from the distribution apparatus 3 that is the distribution source whereas the wireless communication control unit 50 transmits (returns) the position data X together with the terminal identification data A of the communication terminal 5 itself to the distribution apparatus 3.

However, if the distribution control unit 20 and the wireless communication control unit 30 are to be provided in all of the distribution apparatuses, the cost for installing the distribution apparatuses would be significantly high in a case where the distribution apparatuses 3 are provided in the indoor area α covering a large area (large floor space) (Pattern 1).

Further, there may be a case where the distribution apparatus 3a can distribute the position data Xa but cannot receive the terminal identification data A and the position data Xa from the communication terminal 5 due to, for example, malfunction of the wireless communication control unit 30 of the distribution apparatus 3 (Pattern 2).

Further, in a case where multiple distribution apparatuses 3 (3a, 3b) are installed to the ceiling β, there may be a case where the signal strength of the data of the participation response received from the wireless communication control unit 30 of the distribution apparatus 3b is higher than the signal strength of the data of the participation response received from the wireless communication control unit 30 of the distribution apparatus 3a (see Step S46-1, 46-2) depending on the position of the communication terminal 5 in the indoor area α even if the signal strength of the position data X received from the distribution control unit 20 of the distribution apparatus 3a is higher than the signal strength of the position data X received from the distribution control unit 20 of the distribution apparatus 3b (see Step S24-1, 24-2) (Pattern 3).

In the above-described Patterns 1-3, although the communication terminal 5 receives position data Xa from the distribution apparatus 3a (distribution source), the communication terminal 5 transmits the terminal identification data A of the communication terminal 5 itself and the position data Xa to a distribution apparatus 3 other than the distribution apparatus 3a (in this case, distribution apparatus 3b) as illustrated in FIG. 21. In the following, the above-described case where the distribution apparatus 3 of the distribution source is different from distribution apparatus 3 of the transmission destination is described with reference to FIGS. 14 and 20.

The determination unit 53 of the wireless communication control unit 50 of the communication terminal 5 illustrated in FIG. 14 determines whether at least a single participation response is received within a predetermined time (e.g., 5 seconds) with respect to the transmission of the participation request from the transmission/reception unit 51 to each of the distribution apparatuses 3a, 3b (Step S48-1). That is, the determination unit 53 determines whether at least a single apparatus identification data B is received within a predetermined time with respect to the starting of the transmission of the terminal identification data A.

Then, in a case where the determination unit 53 determines that at least a single participation response is received (Yes in Step S48-1), the determination unit 53 further determines whether multiple participation responses have been received (Step S48-2). That is, the determination unit 53 determines whether multiple apparatus identification data B have been received within the predetermined time with respect to the starting of the transmission of the terminal identification data A.

In a case where the determination unit 53 determines that multiple participation responses have been received (Yes in Step S48-2), the measurement unit 54 measures the signal strength of each of the participation responses upon receipt by the transmission/reception unit 51 (Step S48-3). In this example, the process of Step S48-3 is executed because the wireless communication control unit 50 of the communication terminal 5 receives participation responses from the distribution apparatus 3a, 3b in Step S46-1, S46-2.

Figure 22:
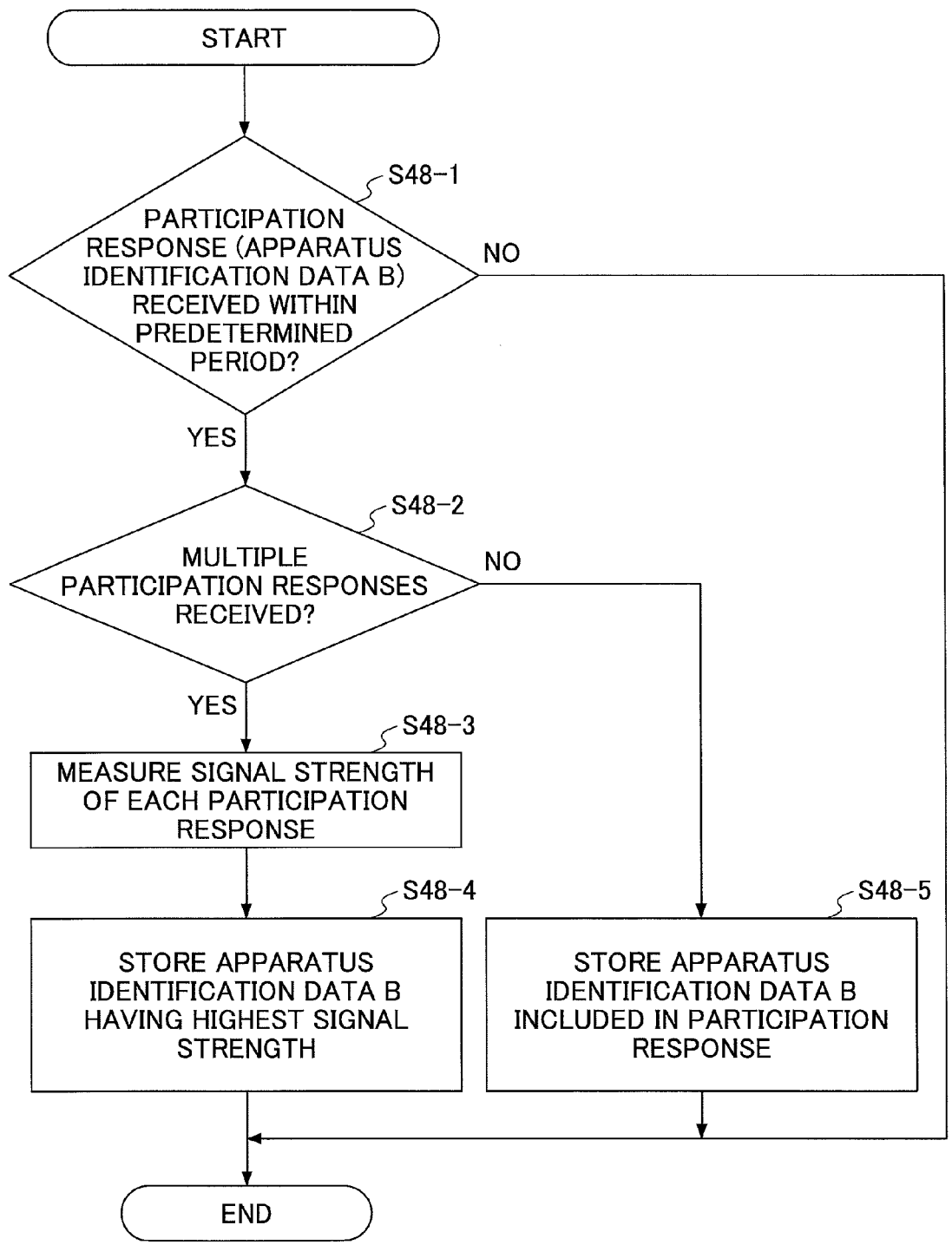
FIG. 22 is a flowchart illustrating an operation of determining a transmission destination according to an embodiment of the present invention.

Next, a case where the determination unit 53 determines that signal strength of the participation response from the distribution apparatus 3b is higher than the signal strength of the participation response (according to the measurement results of Step S48-3) is described. As illustrated in FIG. 22, the storage/readout unit 58 stores the apparatus identification data B (in this example, apparatus identification data Bb) included in the participation response having the highest signal strength in the storage unit 59 according to the measurement of Step S48-3 (Step S48-4).

In a case where the determination unit 53 determines that not a single participation response has been received within the predetermined time (No in Step S48-1), the process of determining the transmission destination is terminated. Further, in a case where the determination unit 53 determines that multiple participation responses have not been received within the predetermined time (No in Step S48-2), the storage/readout unit 58 stores the apparatus identification data B included in the single participation response in the storage unit 59 (Step S48-5).

Thereby, the distribution apparatus 3 indicated with the apparatus identification data B in the storage unit 59 (stored by the storage/readout unit 58) is determined as the destination (transmission destination) to which data is to be transmitted from the communication terminal 5.

Then, after the processes of Step S48-4 or Step S48-5, the transmission/reception unit 51 generates a data structure (as illustrated in FIG. 9) of the data to be transmitted to the transmission destination determined according to Step S48 (Step S49). In this example, the data structure generated by the transmission/reception unit 51 includes the apparatus identification data Bb of the distribution apparatus 3b (transmission destination), the terminal identification data Ah of the communication terminal 5h (transmission source), and the data content (e.g., position data Xa of the distribution apparatus 3a (distribution source)) that are sequentially arranged.

Then, in the communication terminal 5h, the operation of the transmission/reception unit 51, the determination unit 53, the measurement unit 54, the communication unit 57, and the storage/readout unit 58 of the wireless communication control unit 50 stop operating (Step S51). Accordingly, by stopping operation (processing) of the function components (functions) constituting the communication control unit 50 after the transmission/reception unit 51 completes transmitting the data including the position data X to the distribution apparatus 3, power can be saved. The function components (functions) constituting the communication control unit 50 can restart operation (processing) when a new start command is received from the reception control unit 40 in Step S42.

Figure 23:
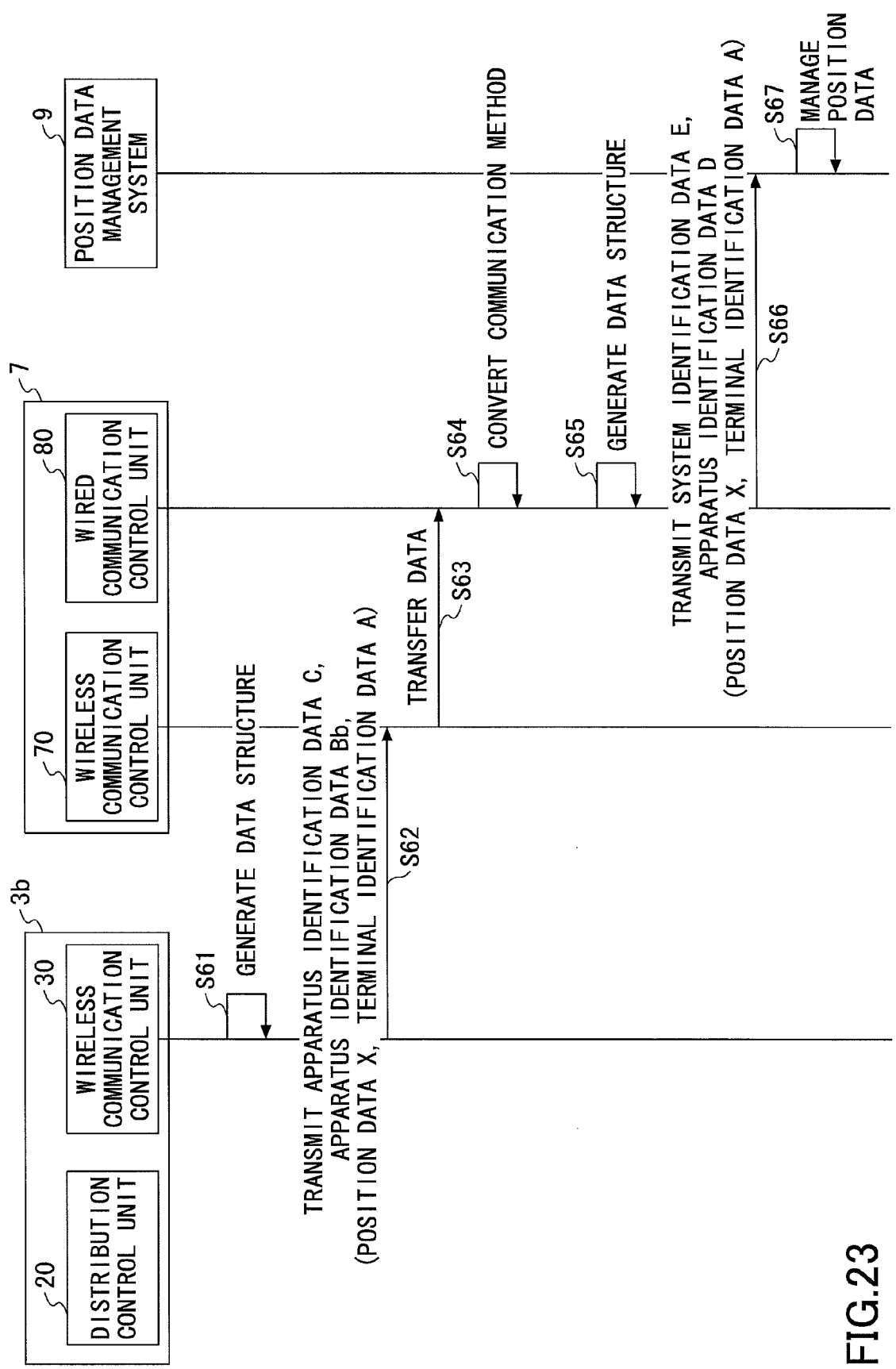
FIG. 23 is a sequence diagram illustrating mainly a process of managing position data according to an embodiment of the present invention.

Next, an operation that starts by the distribution apparatus 3 receiving the data including the position data X and ends by the position data management system 9 managing the management data F is described with reference to FIG. 23. FIG. 23 is a sequence diagram illustrating mainly a process of managing position data X.

As illustrated in FIG. 23, first, the wireless communication control unit 30 of the distribution apparatus 3 generates data to be transmitted to the gateway 7. The wireless communication control unit 30 generates a data structure in a similar manner as the Step S49 (Step S61). In this example, the data structure generated by the wireless communication control unit 30 includes the apparatus identification data C of the gateway 7 (transmission destination), the apparatus identification data Bb of the distribution apparatus 3b (transmission source), and the data content (e.g., position data Xa of the distribution apparatus 3a (distribution source), terminal identification data A of the communication terminal (transmission source of the position data Xa)) that are sequentially arranged.

Then, the transmission/reception unit 31 of the wireless communication unit 30 of the distribution apparatus 3b transmits data having a data structure generated in Step S61 to the gateway 7 (Step S62). Thereby, the transmission/reception unit 71 of the wireless communication control unit 70 of the gateway 7 receives the data transmitted from the distribution apparatus 3b.

Then, the communication unit 77 of the wireless communication control unit 70 transfers the data received in Step S62 to the communication unit 87 of the gateway 7 (Step S63). Thereby, the wired communication control unit 80 receives the data transferred from the wired communication control unit 70.

Then, the conversion unit 82 of the wired communication control unit 80 performs controls for converting a communication method complying with the IEEE802.15.4 standard to a communication method complying with the IEEE802.3 standard, so that Ethernet packet communication can be performed with the data transmitted from the distribution apparatus 3b. Then, the transmission/reception unit 81 of the wired communication control unit 80 generates data to be transmitted to the position data management system (Step S65). The transmission/reception unit 81 generates a data structure in a similar manner as the Step S61. In this example, the data structure of the data generated by the transmission/reception unit 81 includes the system identification data E of the position data management system 9 (transmission destination), the apparatus identification data D of the gateway 7 (transmission source), and the data content (e.g., position data Xa of the distribution apparatus 3a (distribution source), terminal identification data A of the communication terminal 5 (transmission source of the position data Xa)) that are sequentially arranged.

Then, the transmission/reception unit 81 of the wired communication control unit 80 of the gateway 7 transmits the data generated in Step S65 to the position data management system 9 (Step S66). Thereby, the transmission/reception unit 91 of the position data management system 9 receives the data transmitted from the gateway 7.

Then, the storage/readout unit 98 of the position data management system 9 performs a process of managing position data by associating data indicating the time/date of receiving data (e.g., time/date of receiving position data X) and the position data X with respect to the terminal identification data A already stored in the storage unit 99 and storing the associated data as the management data F (see FIG. 13) in the HD 904 (Step S67).

By managing the management data F with the position data management system 9, the administrator of the position data management system 9 can perform a search as illustrated in FIGS. 24 and 25. FIGS. 24 and 25 are schematic diagrams illustrating examples of the screens displayed with the position data management system 9 according to an embodiment of the present invention.

For example, by having the administrator operate, for example, the keyboard 911 or the mouse 912 illustrated in FIG. 12, the operation input reception unit 92 receives an operation input, and the display control unit 94 reads out the management data F by way of the storage/readout unit 98 and displays a search screen (as illustrated in FIG. 24) on the display 908. For example, the search screen displays a search list indicating device names corresponding to each owner name (or administrator name). Further, a checkbox is displayed on the right side of the device name. Further, a button "execute search" is displayed on the lower right side of the search list for executing a search. The example of FIG. 24 illustrates a case of searching the position of the device "UCS P3000" owned by the owner belonging to "sales department 1".

In a case where the administrator operates, for example, the keyboard 911 or the mouse 912 and checks (marks) the checkbox corresponding to the device name of the device (management object 4) whose position is desired to be searched, the operation input reception unit 92 receives the input of checking the checkbox. Then, after the administrator checks all of the checkbox(es) corresponding to the devices whose positions are desired to be searched, the operation input reception unit 92 receives input of search execution when the administrator presses the button "execute search". Then, the search unit 93 searches the management data F stored in the storage unit 99 based on the device name corresponding to the checked check box. Thereby, the search unit 93 extracts a part of the management data F including a corresponding position data X and layout data G indicating, for example, the floor of the position indicated by the position data X.

Then, as illustrated in FIG. 25, the display control unit 94 displays a search result screen on the display 908 based on the management data F and the layout data G. For example, a layout diagram indicating the floor "Building A, $4^{th}$ floor" of the device "ICS P3000" and data items of the management data F (e.g., position data X, reception date/time) are displayed in the search result screen of FIG. 25. Thereby, the administrator of the position data management system 9 can visually recognize the position of the management object 4 (communication terminal 5).

In the above-described embodiment of the present invention, the distribution apparatus 3 not only includes the distribution unit 21 but also the transmission/reception unit 31. Thus, as long as the communication terminal 5 is positioned within a range in which position data X can be distributed from the distribution apparatus 3 (distributable range of the distribution apparatus 3), the communication terminal 5 need only to transmit the position data X and the terminal identification data A within the distributable range of the distribution apparatus 3. Therefore, the communication terminal 5 can transmit data with a minimal amount of power (minimal power consumption). Accordingly, the distribution apparatus 3 contributes to power saving of the communication terminal 5.

Further, because the process of receiving position data is started only in a case where movement of the communication terminal 5 is stopped (after the movement of the communication terminal 5), the power consumption of the battery can be reduced to a small capacity. Thereby, power can be saved. Further, because operations of the components constituting the wireless communication control unit 50 is stopped once the transmission/reception unit 51 completes transmitting data such as the position data X to the distribution apparatus 3, power can be saved. Accordingly, owing to the saving of power, the frequency of performing battery change can be reduced even where a small capacity battery such as the button battery 406 is used, to thereby reduce the workload of the user.

Further, as illustrated in FIG. 21, installation cost of the distribution apparatus 3 can be reduced because the distribution apparatus 3b can be used to receive the position data Xa and the terminal identification data A from the communication terminal 5 instead of the distribution apparatus 3a (corresponding to the above-described Pattern 1). Further, even in a case where the wireless communication control unit 30 malfunctions, position data Xa and the terminal identification data A can be obtained from the communication terminal 5 in the distribution system 6 (corresponding to the above-described Pattern 2). Further, because position data X and terminal identification data A can be transmitted to the distribution apparatus 3 capable of communicating with highest signal strength, the position data X and the terminal identification data A can be more reliably obtained from the communication terminal 5 in the distribution system 6 (corresponding to the above-described Pattern 3).

The position data management system 9 can be configured by a single computer. Alternatively, position data management system 9 may be configured by dividing the position data management system 9 into multiple elements (functions, function components or storage units) and assign one or more computers to the elements.

Further, a recording medium (e.g., CD-ROM) on which programs of the above-described embodiment are recorded or a hard disk in which the programs are stored may be domestically or internationally provided as a program product.

The determination unit 63 serving as a first determination unit may include the determination unit 53 serving as a second determination unit. That is, the first and second determination units are not only provided separately but also may constitute a single unit. Likewise, the measurement unit 64 serving as a first measurement unit may include the measurement unit 67 serving as a second measurement unit. That is, the first and second measurement units are not only provided separately but also may constitute a single unit.

According to the above-described embodiment of the present invention, the communication terminal 5 can receive position data X transmitted from the distribution apparatus 3. For example, the position data X is used for enabling the position data management system 9 to manage the location of the communication terminal 5. In a case where the communication terminal 5 is a mobile phone, the position data X may be used for a route guidance application (navigation application). The navigation application is an application that can, for example, display a current position of the communication terminal 5 on a map or display a route from the current position to a destination on a map. However, in a case where the communication terminal 5 is located indoors, the communication terminal 5 cannot recognize its current position by using GPS. In this case, the communication terminal 5 can recognize its current position by using a relative position measuring method to estimate the current position of the communication terminal 5. The relative position measuring method is a method of obtaining a current position by estimating the current position by using data obtained from, for example, an acceleration sensor or a magnetometric sensor installed in the communication terminal 5. However, the position data obtained by the relative position measuring method may contain significant errors. Thus, it becomes necessary to correct the current position by using absolute position data X distributed by IMES. However, because position measurement signals of the IMES are transmitted throughout a predetermined range, the position data obtained by IMES may also contain significant errors depending on the positions of the communication terminals receiving the position measurement signals.

In view of the above, the communication terminal 5 according to the below-described embodiments of the present invention calculates a current position data by using a relative position measuring method and assumes that position data obtained by IMES is a current position data when the position data obtained by IMES is determined to have "sufficient accuracy". For example, the position data obtained by IMES is determined to have "sufficient accuracy" in a case where a signal strength (radio field intensity) of an IMES position measurement signal is greater than or equal to a predetermined threshold.

Next, first-third examples of the communication terminal 5 are described.

(1) In the first example, threshold data is stored beforehand in the communication terminal 5. By using the threshold data, the communication terminal 5 determines whether to use the position data obtained by IMES.

(2) In the second example, threshold data is stored in the position data management system 9. Accordingly, the communication terminal 5 obtains the threshold data from the position data management system 9 and uses the obtained position data.

(3) In the third example, threshold data is distributed together with the position data X from the distribution apparatus 3. Accordingly, the communication terminal 5 obtains the distributed threshold data and uses the obtained threshold data.

The communication terminal 5 of the first-third examples is described as having the hardware configuration of the communication terminal 5 illustrated in FIG. 7. However, a component(s) may be added to or omitted from the hardware configuration of the communication terminal 5.

First Example

Next, the first example is described with reference to FIGS. 26-30. In the first example, threshold data is stored beforehand in the communication terminal 5. By using the threshold, the communication terminal 5 determines whether position data obtained by IMES is to be used.

FIG. 26 illustrates an example of expressing signal strength thresholds that can be commonly used by the below-described first-third examples. First, the term "signal strength" is the strength of a radio signal transmitted by using IMES and is indicated with a unit of "dBHz". The unit "dbHz" is generally used for indicating signal strength (positioning sensitivity) (Carrier to Noise ratio (C/N ratio)) with a GPS receiver or the like. Generally, positioning (position measurement) is possible in a case where the value of the signal strength is 30-50 dBHz. The term "signal strength threshold" is a threshold serving as a criterion for determining whether position data contained in a position measurement signal obtained by IMES can be used to determine a current position. For example, in a case where the signal strength of the position measurement signal obtained by IMES is 30 dBHz, the position data contained in the position measurement signal obtained by IMES is not used if the signal strength threshold is 40 dBHz (even in a state where position measurement (positioning) is possible). This owes to the aspect that the distribution apparatus 3 transmits position measurement signals throughout a predetermined range. More specifically, the position data included in the position measurement signal may not necessarily indicate the current position accurately in a case where the signal strength of the position measurement signal is less than a predetermined value (i.e. separated a predetermined distance). The value to be set as the signal strength threshold is determined beforehand by, for example, an administrator based on the following conditions (1)-(3).

(1) Transmission characteristics of position measurement signal of distribution apparatus 3 (e.g., antenna characteristics, transmission output)
(2) Environment in which distribution apparatus 3 is installed (e.g., height of ceiling)
(3) Type of application of communication terminal 5 (e.g., desired degree of accuracy)

In other words, the signal strength threshold can be determined (set) with respect to each distribution apparatus 3.

In the following examples, the communication terminal 5 measures the signal strength of the position measurement signal received from the distribution apparatus 3 and compares the signal strength of the received position measurement signal with a signal threshold value determined beforehand. Then, in a case where the signal strength of the received position measurement signal is equal to or greater than the signal strength threshold, the communication terminal 5 determines that the position data included in the received position measurement signal can be used to indicate the current position.

FIG. 26 defines 4 patterns (types) of signal strength thresholds. A two bit value is assigned to each of the signal threshold values, so that the two bit values can be used during data storage or communication. It is, however, to be noted that the patterns of the signal threshold values of FIG. 26 are merely examples. More bit numbers may be used and arbitrarily assigned to signal threshold values. Further, a signal threshold value itself may be expressed as a binary number with a variable bit length.

FIG. 27 is a schematic diagram illustrating signal threshold value data that is obtained from, for example, an external server by the communication terminal 5 and stored in the communication terminal 5. In this example, the signal strength threshold is set with respect to position data (latitude, longitude, floor number, building number) distributed by the distribution apparatus 3. In the example of FIG. 27, latitude and longitude are defined by ranges, so that each range corresponds to a given signal strength threshold. Alternatively, the signal strength thresholds may be set with respect to each latitude and longitude. In the example of FIG. 27, assuming that the communication terminal 5 receives the following position data X from the distribution apparatus 3, the position data X would correspond to the uppermost entry in the table of FIG. 27.

<Position Data X>
Longitude: 35.459555
Latitude: 139.387110
Floor No.: 16
Building No.: C Accordingly, the communication terminal 5 determines to use the position data X as the current position of the communication terminal 5 if the signal strength of the position measurement signal containing the position data X is equal to or greater than 40 dBHz.

Figure 28:
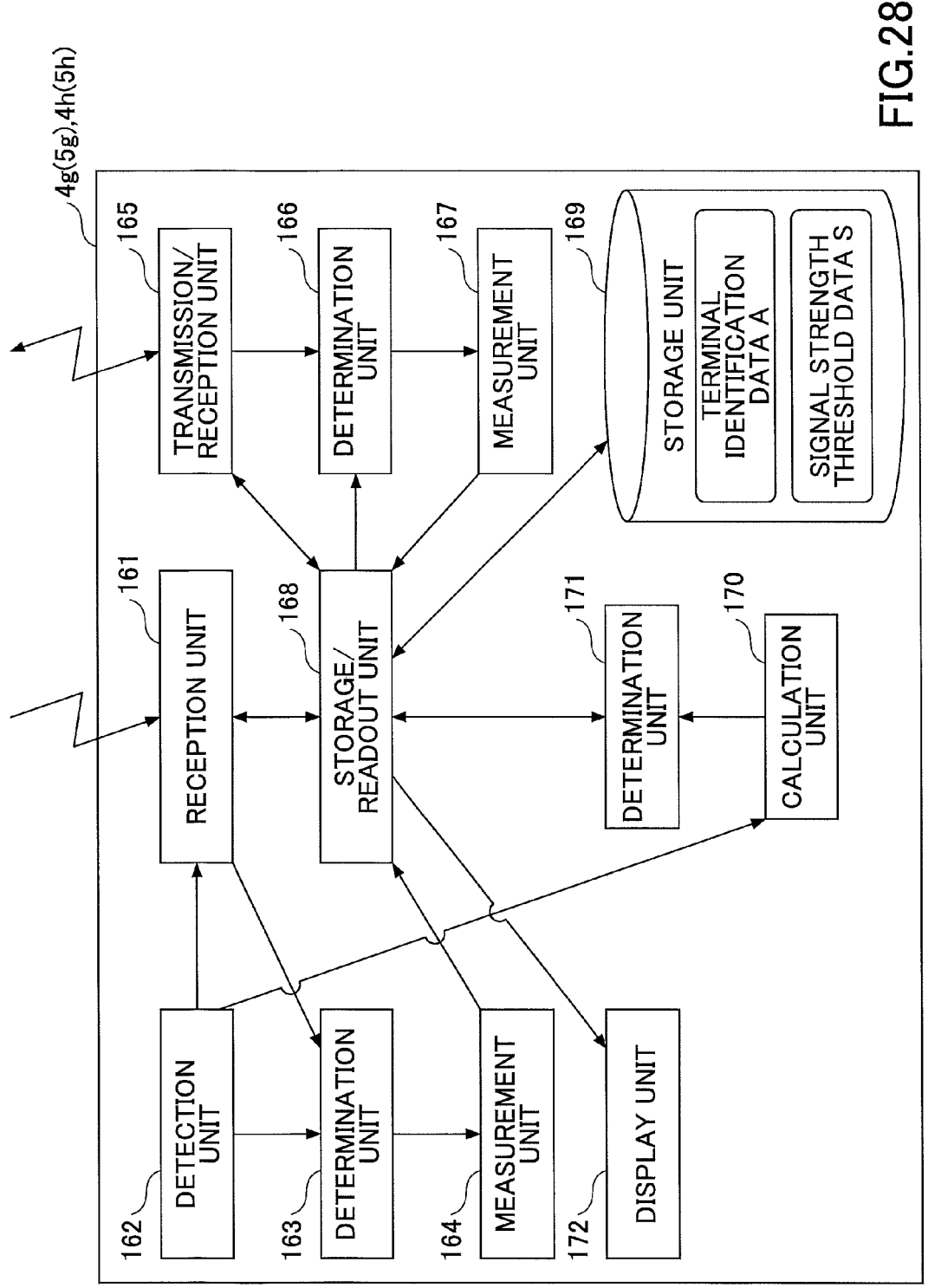
FIG. 28 is a block diagram illustrating functions (function components) of a communication terminal according to the first example of the present invention.

FIG. 28 is a block diagram illustrating functions (function components) of the communication terminal (management object) 5 according to the first example.

Among the elements (function units) illustrated in FIG. 28, a reception unit 161, a detection unit 162, a determination unit 163, a measurement unit 164, a transmission/reception unit 165, a reception unit 166, a measurement unit 167, a storage/readout unit 168, and a storage unit 169 correspond to the reception unit 61, the detection unit 62, the determination unit 63, the measurement unit 64, the transmission/reception unit 65, the determination unit 66, the measurement unit 67, the storage/readout unit 68, and the storage unit 69 of FIG. 15, respectively. The communication terminal 5 of FIG. 28 further includes a calculation unit 170, a determination unit 171, and a display unit 172. Further, signal strength threshold data S is stored beforehand in the storage unit 169.

In addition to the functions included in the detection unit 62 of FIG. 15, the detection unit 162 also includes the functions of detecting data pertaining to, for example, acceleration, angular rate, and direction (inclination (tilt)) and sending the detected data to the calculation unit 170.

Unlike the measurement unit 64 of FIG. 15, the measurement unit 164 measures the signal strengths of every received position measurement signal without depending on the determination of the determination unit 163 (i.e. not depending on the number of position data X received by the reception unit 161) and stores the values of the measured signal strengths in the storage unit 169.

The calculation unit 170, which is implemented mainly by the processes of the CPU 601 illustrated in FIG. 10 or the processes of the CPU 901 illustrated in FIG. 12, calculates the current position of the communication terminal 5 based on data sent from the detection unit 162. The current position may be calculated based on, for example, i) a recent (latest) position data of the communication, ii) time difference between the current time and the time the recent position data was obtained, iii) traveling speed (acceleration) of the communication terminal 5 based on the time difference, and iv) traveling direction. A given existing PDR (Pedestrian Dead Reckoning) method may be used for calculating the current position. Accordingly, relative position data R calculated according to relative positioning (relative position measurement) is sent to the determination unit 171.

The determination unit 171 is implemented mainly by the processes of the CPU 601 illustrated in FIG. 10 or the processes of the CPU 901 illustrated in FIG. 12. The determination unit 171 determines whether the position data X obtained from the reception unit 161 or the relative position data R obtained from the calculation unit 170 is the position data that indicates the current position of the communication terminal 5. That is, the determination unit 171 selects the position data indicating the current position of the communication terminal 5 from the position data X obtained from the reception unit 161 and the relative position data R obtained from the calculation unit 170. In determining the position data indicating the current position of the communication terminal 5, the determination unit 171 compares the value of the signal strength of the position measurement signal containing the position data X measured by the measurement unit 164 and the value of the signal strength threshold included in the signal strength threshold value S stored in the storage unit 169. In a case where the measured signal strength of the position measurement signal containing the position data X is equal to or greater than the stored signal strength threshold value, the determination unit 171 determines that the position data X is current position data P indicating the current position of the communication terminal 5. On the other hand, in a case where the measured signal strength of the position measurement signal containing the position data X is less than the stored signal strength threshold value, the determination unit 171 determines that the relative position data R (obtained by relative positioning) is position data P indicating the current position of the communication terminal 5. Accordingly, the position data P determined by the determination unit 171 is stored in the storage unit 169.

The display unit 172 is implemented mainly by the processes of the CPU 601 illustrated in FIG. 10 and the processes of the display 615 illustrated in FIG. 10. The display unit 172 displays the position data P stored in the storage unit 169 together with a map including a position indicated by the position data P.

Next, an operation(s) of the communication terminal 5 according to the first example is described with reference to FIG. 29.

The calculation unit 170 of the communication terminal 5 calculates the relative position data R of the communication terminal 5 based on the movement of the communication terminal 5 detected by the detection unit 162 (Step S101). A given existing PDR method may be used for calculating the relative position data R. Then, in a case where the reception unit 161 receives a position measurement signal containing position data X distributed from the distribution apparatus 3 (Step S102), the measurement unit 164 measures the signal strength of the position measurement signal containing the position data X (Step S103). Then, the determination unit 171 refers to the signal strength threshold data S (e.g., signal strength threshold data having a configuration illustrated in FIG. 27) stored in the storage unit 169 and reads out a signal strength threshold value corresponding to the position data X (Step S104).

Then, the determination unit 171 compares the signal strength measured in Step S103 and the signal strength threshold value read out in Step S104 (Step S105). In a case where the measured signal strength is equal to or greater than the read out signal strength threshold value (Yes in Step S105), the determination unit 171 determines that the position data X contained in the position measurement signal received in Step S102 is the current position data P of the communication terminal 5 and stores the position data X as the current position data P of the communication terminal 5 (Step S106). In a case where the measured signal strength is less than the read out signal strength threshold value (No in Step S105), the determination unit 171 determines that the relative position data R calculated in Step S101 is the current position data P of the communication terminal 5 and stores the relative position data R as the current position data P of the communication terminal 5 (Step S107).

Then, the display unit 172 displays a map that indicates the position data P as the current position of the communication terminal 5. By successively performing the above-described steps, position data obtained by relative positioning can be appropriately corrected by using position data that is highly reliable among the position data obtained by IMES. For example, if a highly reliable (credible) position data obtained by IMES is acquired in a case of using an application performing navigation of a pedestrian traveling indoors, the current position can be appropriately corrected by using the position data.

Although the first example is described with a case of receiving a single position measurement signal containing position data X, the first example can be applied to a case of receiving multiple position measurement signals that contain position data X. In a case of receiving multiple position measurement signals that contain position data X, the position measurement signal having the strongest signal strength among the multiple position measurement signals may be used.

Figure 29:
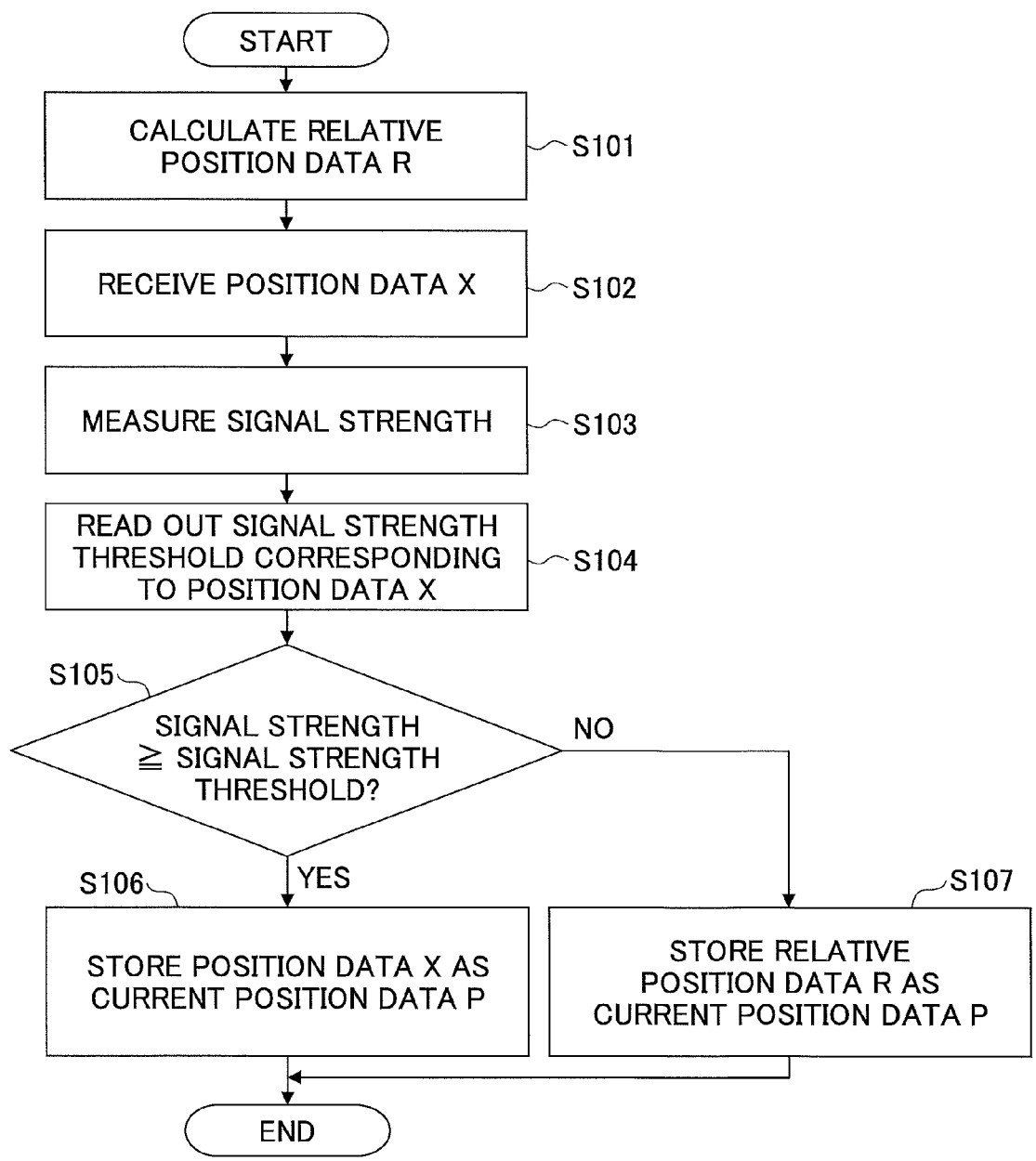
FIG. 29 is a flowchart an operation for determining a current position data by a communication terminal according to the first example of the present invention.
Figure 30:
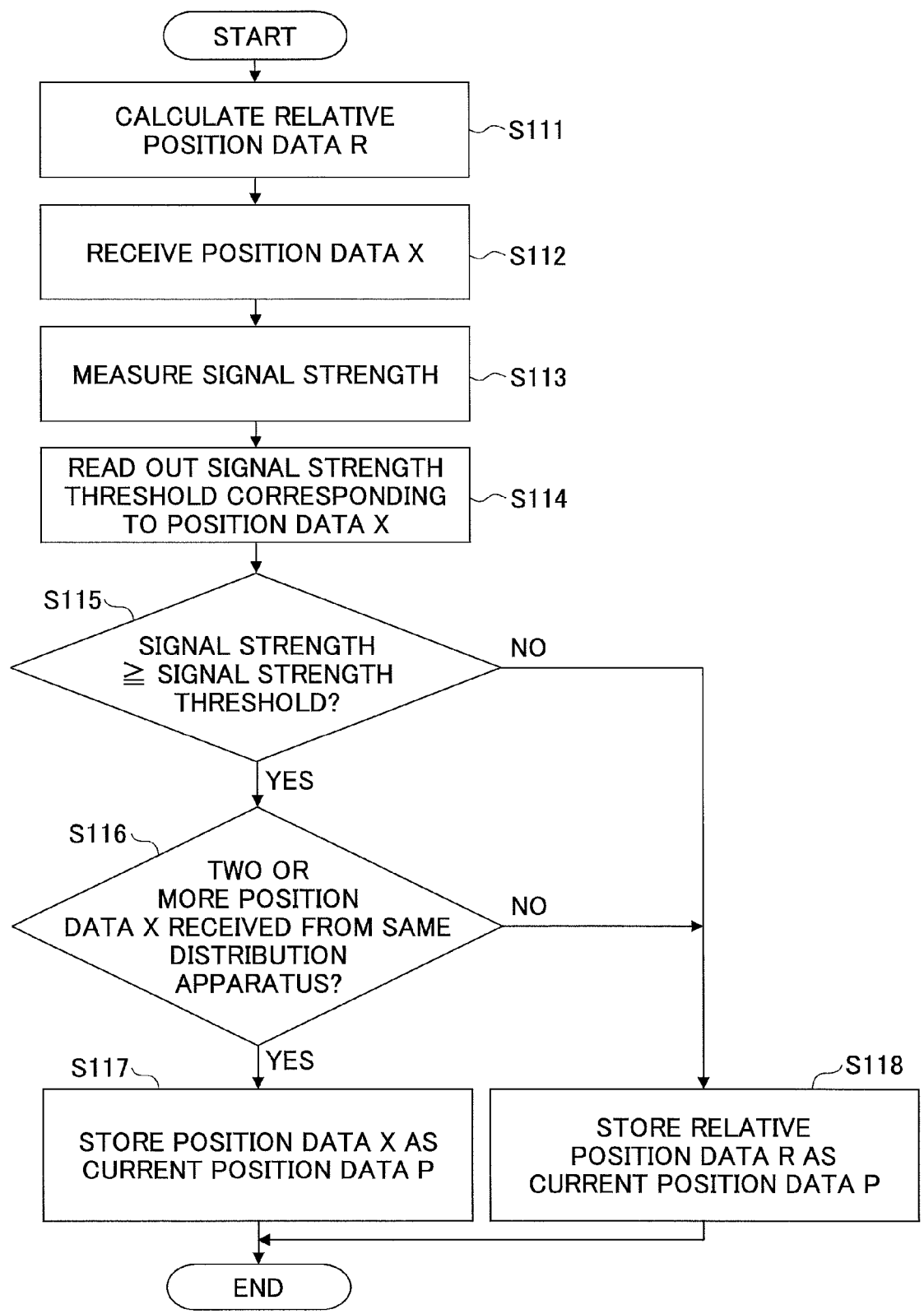
FIG. 30 is a flowchart another operation for determining a current position data by a communication terminal according to the first example of the present invention.

Similar to FIG. 29, FIG. 30 also illustrates an operation(s) of the communication terminal 5. The operation of FIG. 30, however, includes an additional step. Steps S111-S115, S117, and S118 of FIG. 30 correspond to Step S101-S105, S106, and S107, respectively. In the operation of FIG. 30, the determination unit 171 stores the position data X as the current position data P only when the reception unit 161 consecutively (continuously) receives two or more position measurement signals containing the position data X (i.e. two or more times of receiving position measurement signals containing position data X) from the same distribution apparatus 3 (Yes in Step S116, S117). That is, in a case where a position measurement signal containing position data X is received merely once from the distribution apparatus 3, the position data X is not determined (selected) as the current position data P even if, for example, the signal strength of the received position measurement signal is equal to or greater than the signal strength threshold. Therefore, the position data X contained in the position measurement signal can be used as the current position data P only in a state where position measurement signals can be steadily (consistently) received. Accordingly, the accuracy of positioning can be increased. It is to be noted that the number of times of consecutively receiving the position measurement signals containing position data X can be arbitrarily set. Instead of setting the number of times of consecutively receiving the position measurement signals containing position data X, a period or an interval of consecutively receiving the position measurement signals containing position data X may be set as the condition for determining whether the position data X can be used as the current position data P.

Second Example

Next, the second example is described with reference to FIGS. 31-35. In the second example, signal strength threshold data is stored in the position data management system 9. Accordingly, the communication terminal 5 obtains the signal strength threshold data from the position data management system 9 and uses the obtained signal strength threshold data to determine whether position data obtained by IMES is to be used. The communication terminal 5 of the second example is described as having the hardware configuration of the communication terminal 5 illustrated in FIG. 10. The position data management system 9 of the second example is described as having the hardware configuration of the position data management system 9 illustrated in FIG. 12. However, a component(s) may be added to or omitted from the hardware configurations illustrated in FIGS. 10 and 12.

FIG. 31 is a schematic diagram illustrating distribution apparatus data I stored in the position data management system 9. The distribution apparatus data I includes signal strength threshold values. In the second example, the signal strength threshold values described in the first example are stored as a portion of the distribution apparatus data I. As illustrated in FIG. 31, the distribution apparatus data I includes data items "apparatus identification data B", "position data X (latitude, longitude, floor number, building number)", "transmission output", and "signal strength threshold value" that are stored in association with each other. The data items "apparatus identification data B" and "position data X" are substantially the same as those described in the first example.

The term "transmission output" is the transmission output (power) of a position measurement signal using IMES. The position measurement signal using IMES is output from the distribution apparatus 3 which can be identified by the apparatus identification data B. The transmission output of the position measurement signal using IMES is commonly indicated with a unit of "dBm". The unit "dBm", which expresses 1 mW as 0 dB, is widely used to define the transmission power of a radio signal. The value that is set as transmission output is transmitted to each distribution apparatus 3 by way of the gateway 7. Thereby, the transmitted value is used when determining the transmission power of the position measurement signal to be transmitted from the position data distribution unit 12 via the position data communication circuit 204 and the antenna 204*a*.

As described above, the term "signal strength threshold" is a threshold serving as a criterion for determining whether position data contained in a position measurement signal obtained by IMES can be used to determine a current position. However, the second example is different from the first example in that "signal strength threshold" included in the distribution apparatus data I is directly associated with a corresponding distribution apparatus 3 and stored in the position data management system 9.

Figure 32:
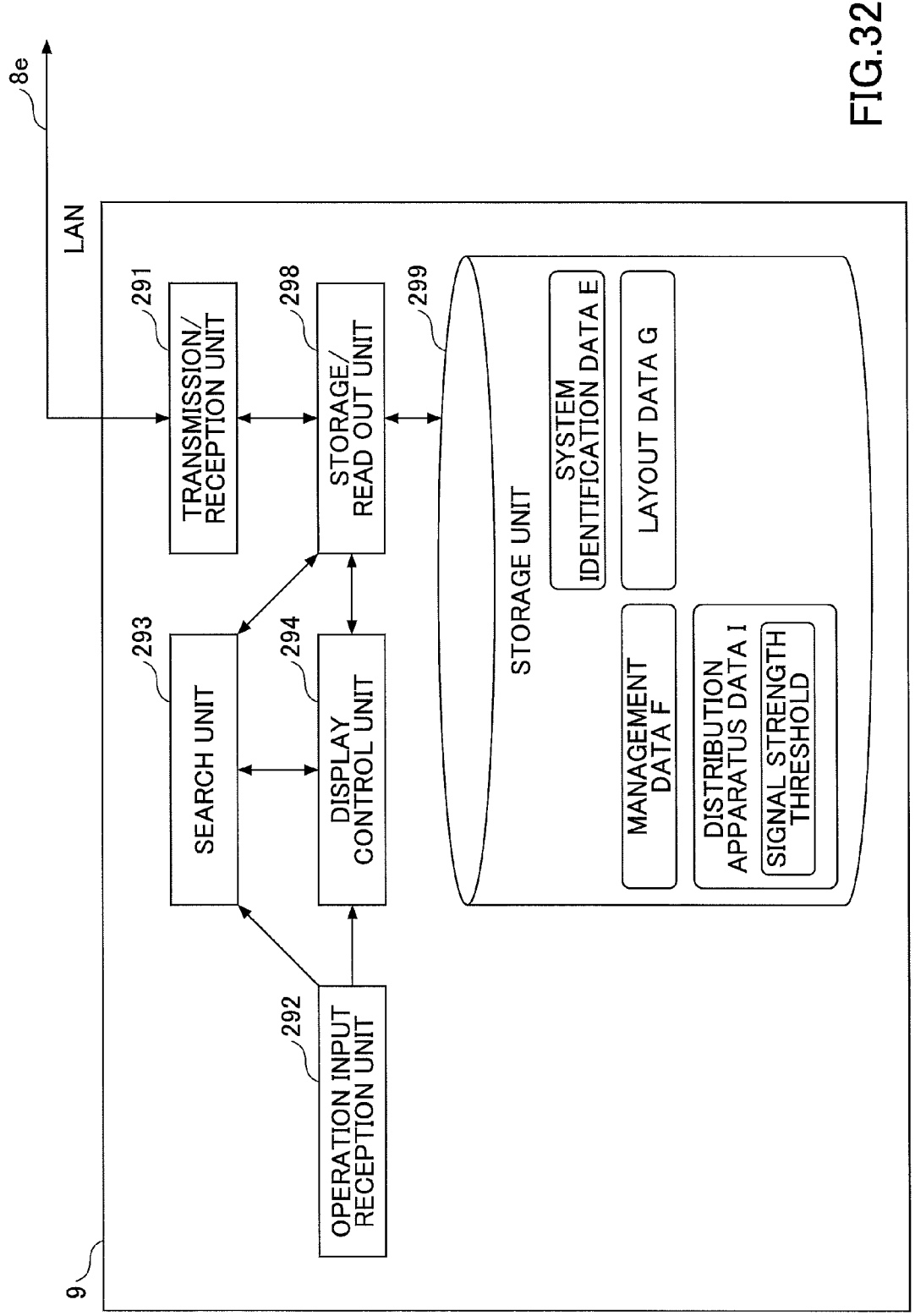
FIG. 32 is a block diagram illustrating functions (function components) of a position data management system according to the second example of the present invention.
Figure 33:
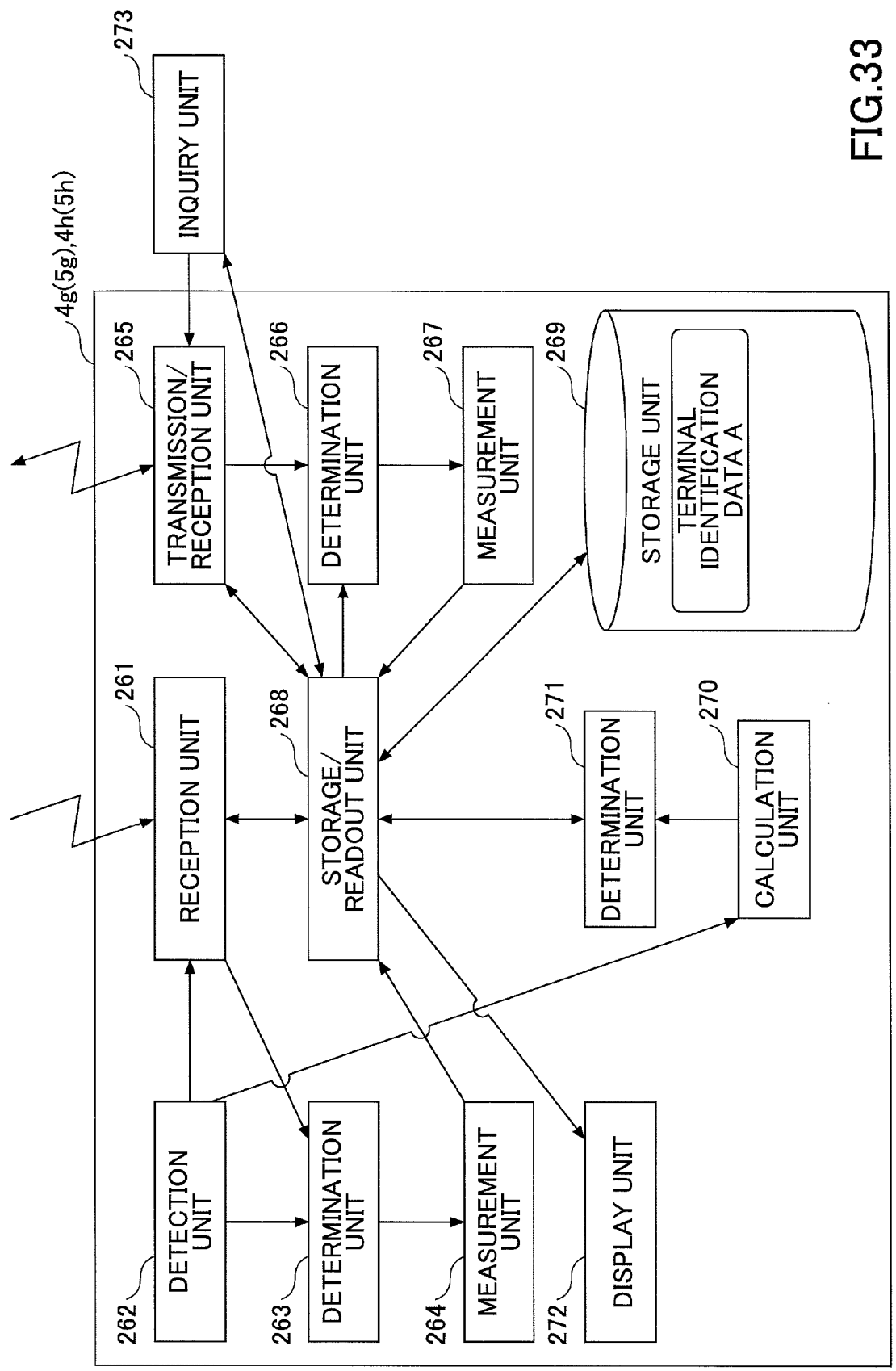
FIG. 33 is a block diagram illustrating functions (function components) of a communication terminal according to the second example of the present invention.

Next, a functional configuration of the position data management system 9 according to the second example is described with reference to FIG. 32. Among the elements (function units) illustrated in FIG. 32, a transmission/reception unit 291, an operation input reception unit 292, a search unit 293, a display control unit 294, a storage/readout unit 298, and a storage unit 299 correspond to the transmission/reception unit 91, the operation input reception unit 92, the search unit 93, the display control unit 94, the storage/readout unit 98, and the storage unit 99 of FIG. 16, respectively. In addition to the data stored in the storage unit 99, the distribution apparatus data I is also stored in the storage unit 99.

Figure 16:
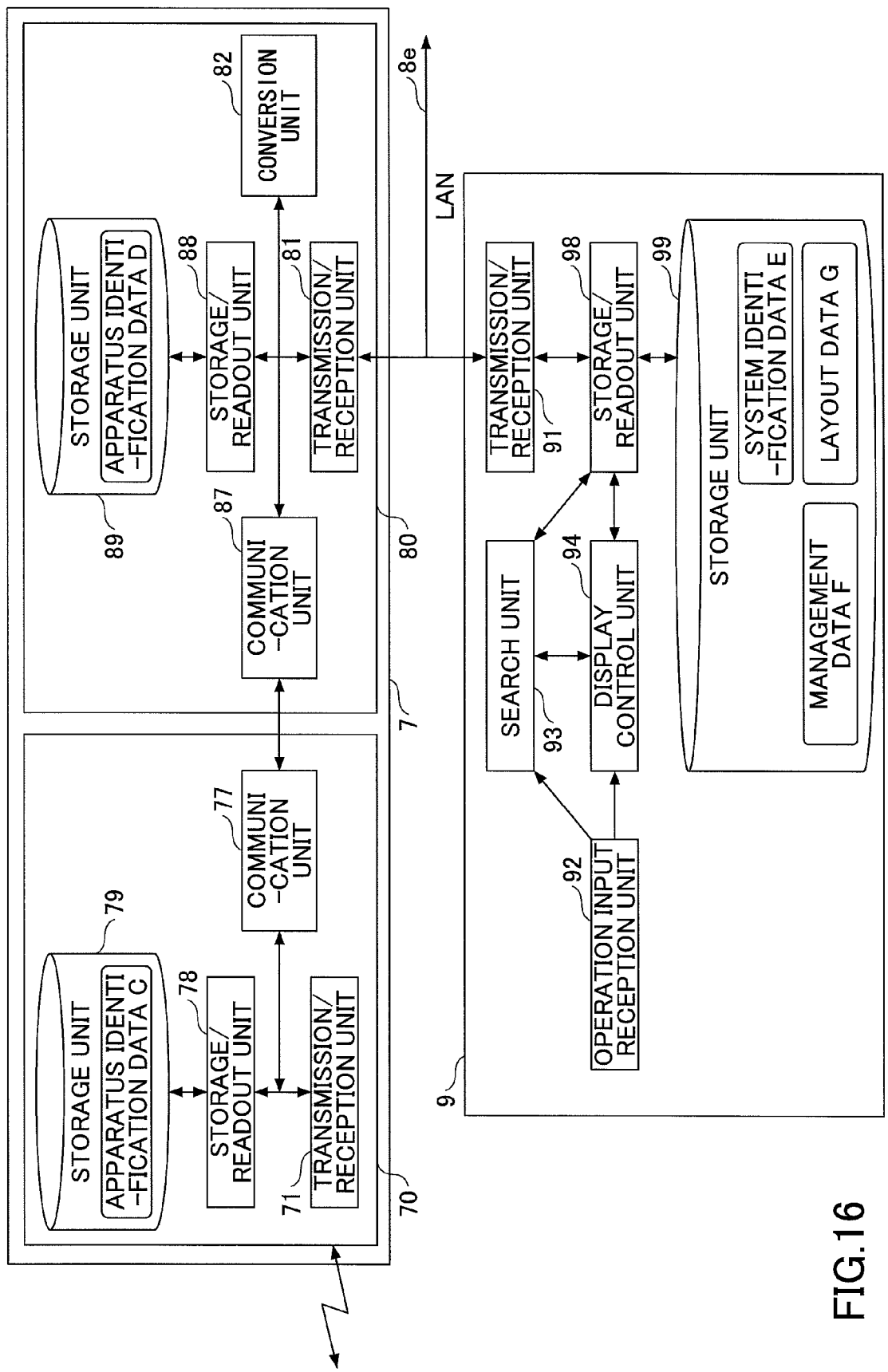
FIG. 16 is a block diagram illustrating functions (function components) of a gateway and a position data management system according to an embodiment of the present invention.

In addition to the functions included in the transmission/reception unit 91 of FIG. 16, the transmission/reception unit 291 also includes a function of receiving inquiry data pertaining to a signal strength threshold value from the communication terminal 5 by way of a wireless network. The inquiry data includes position data X contained in a position measurement signal received by the communication terminal 5. In addition to the functions included in the search unit 93 of FIG. 16, the search unit 293 also includes a function of searching through distribution apparatus data I upon receiving an inquiry data from the transmission/reception unit 291 for obtaining a signal strength threshold value corresponding to the position data X included in the inquiry data. Further, the transmission/reception unit 291 also includes a function of transmitting the signal strength threshold value searched and obtained by the search unit 293 to the communication terminal 5. For example, in a case where the transmission/reception unit 291 receives inquiry data including the following position data X received from the communication terminal 5, a signal strength threshold value "40" (which is set to the distribution apparatus 3 identified by the data identification data B of "21.17.10.10") is transmitted to the communication terminal 5.

<Position Data X>
Longitude: 35.459555
Latitude: 139.387110
Floor No.: 16
Building No.: C Next, a functional configuration of the communication terminal 5 according to the second example is described with reference to FIG. 33. Among the elements illustrated in FIG. 33, a reception unit 261, a detection unit 262, a determination unit 263, a measurement unit 264, a transmission/reception unit 265, a determination unit 266, a measurement unit 267, a storage/readout unit 268, a storage unit 269, a calculation unit 270, a determination unit 271, and a display unit 272 correspond to the reception unit 161, the detection unit 162, the determination unit 163, the measurement unit 164, the transmission/reception unit 165, the determination unit 166, the measurement unit 167, the storage/readout unit 168, the storage unit 169, the calculation unit 170, the determination unit 171, and the display unit 172 of FIG. 28 (first example). It is, however, to be noted that the signal strength threshold value S illustrated in FIG. 27 of the first example is not stored in the storage unit 269 of the second example. Further, the communication terminal 5 of the second example also includes an inquiry unit 273.

Unlike the determination unit 171 of the first example (which uses the signal strength threshold value of the signal strength threshold data S stored in the storage unit 169), the determination unit 271 uses the signal strength threshold value obtained from the position data management system 9 by the inquiry unit 273 for determining the current position data P.

The inquiry unit 273 is implemented mainly by the processes of the CPU 601 illustrated in FIG. 10 or the processes of the CPU 901 illustrated in FIG. 12. When the reception unit 261 receives a position measurement signal containing the position data X, the inquiry unit 273 generates inquiry data to be transmitted to the position data management system 9 by way of a wireless network. The position data X is included in the inquiry data generated by the inquiry unit 273. The inquiry data is transmitted to the position data management system 9 for obtaining a signal strength threshold value set to the distribution apparatus 3 transmitting (distributing) the position measurement signal containing the position data X.

The transmission/reception unit 265 also includes a function of transmitting the inquiry data generated by the inquiry unit 273 to the position data management system 9 by way of a wireless network. Further, the transmission/reception unit 265 also includes a function of receiving a signal strength threshold value returned from the position data management system 9 in response to the inquiry data. The received signal strength threshold value may be stored in the storage unit 269.

Next, an operation(s) according to the second example is described with reference to FIGS. 34 and 35.

Figure 34:
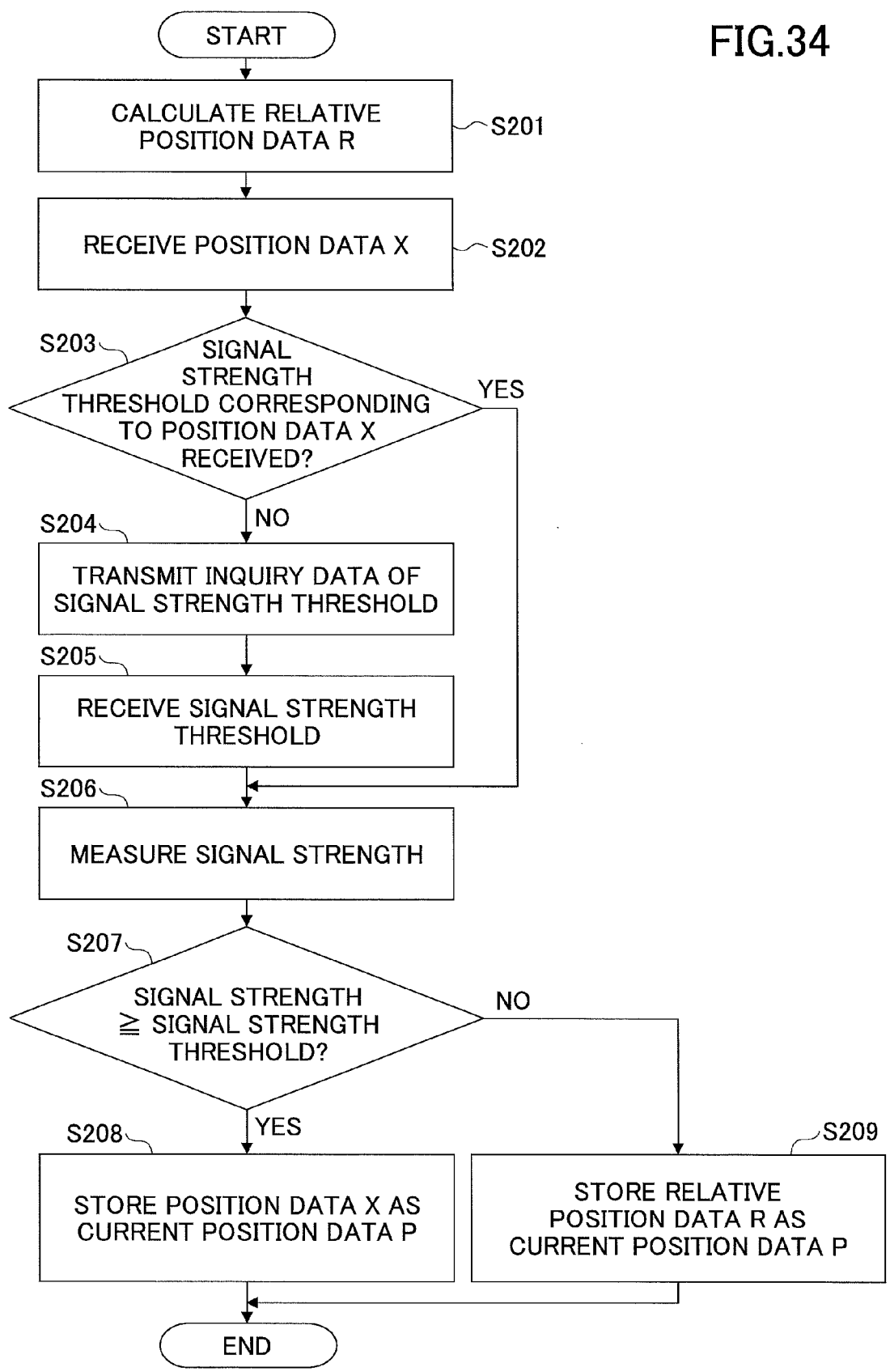
FIG. 34 is a flowchart illustrating an operation for determining a current position data by a communication terminal according to the second example of the present invention.

FIG. 34 is a flowchart illustrating an operation of the communication terminal 5 according to the second example.

The calculation unit 270 of the communication terminal 5 calculates the relative position data R of the communication terminal 5 based on movement of the communication terminal 5 detected by the detection unit 262 (Step S201). A given existing PDR method may be used for calculating the relative position data R. Then, in a case where the reception unit 261 receives a position measurement signal containing position data X distributed from the distribution apparatus 3 (Step S202), the inquiry unit 273 determines whether a signal strength value corresponding to the position data X is already received or stored (Step S203). In a case where no corresponding position data X is received or stored (No in Step S203), the inquiry unit 273 generates an inquiry data for obtaining the signal strength threshold value corresponding to the position data X. Then, the transmission/reception unit 265 transmits the inquiry data to the position data management system 9 via a wireless network (Step S204).

Then, the transmission/reception unit 265 receives the signal strength threshold value corresponding to the position data X from the position data management system 9 via the wireless network (Step S205). Then, the measurement unit 264 measures the signal strength of the position measurement signal containing the position data X (Step S206, Yes in Step S203). Then, the determination unit 271 compares the signal strength measured in Step S206 and corresponding signal strength threshold data received in Step S205 (or corresponding signal threshold data read out from the storage unit 269 in a case where corresponding signal strength threshold data is already received or stored) (Step S207). In a case where the measured signal strength is equal to or greater than the received (or read out) signal strength threshold value (Yes in Step S207), the determination unit 271 determines that the position data X contained in the position measurement signal received in Step S202 is the current position data P of the communication terminal 5 and stores the position data X as the current position data P of the communication terminal 5 (Step S208). In a case where the measured signal strength is less than the received (or read out) signal strength threshold value (No in Step S207), the determination unit 271 determines that the relative position data R calculated in Step S201 is the current position data P of the communication terminal 5 and stores the relative position data R as the current position data P of the communication terminal 5 (Step S209).

Then, the display unit 272 displays a map that indicates the position data P as the current position of the communication terminal 5. By successively performing the above-described steps, position data obtained by relative positioning can be appropriately corrected by using position data that is highly reliable among the position data obtained by IMES. For example, if a highly reliable (credible) position data obtained by IMES is acquired in a case of using an application performing navigation of a pedestrian traveling indoors, the current position can be appropriately corrected by using the position data.

It is to be noted that, in Step S204, the inquiry data transmitted to the position data management system 9 may include other position data besides the position data X. Accordingly, in Step S205, multiple signal threshold values corresponding to the other position data may be received together with the signal threshold value corresponding to the position data X. For example, in a case where the inquiry data includes position data Xa, a predetermined number of signal strength threshold values corresponding to other position data (e.g., position data Xb, Xc, . . . that are positioned a predetermined range from the position data Xa) may also be obtained. Therefore, by receiving and storing multiple signal threshold values beforehand, the number of times of performing the inquiries of Step S204 and S205 can be reduced. Thus, the process rate for obtaining the current position data P can be improved.

Figure 35:
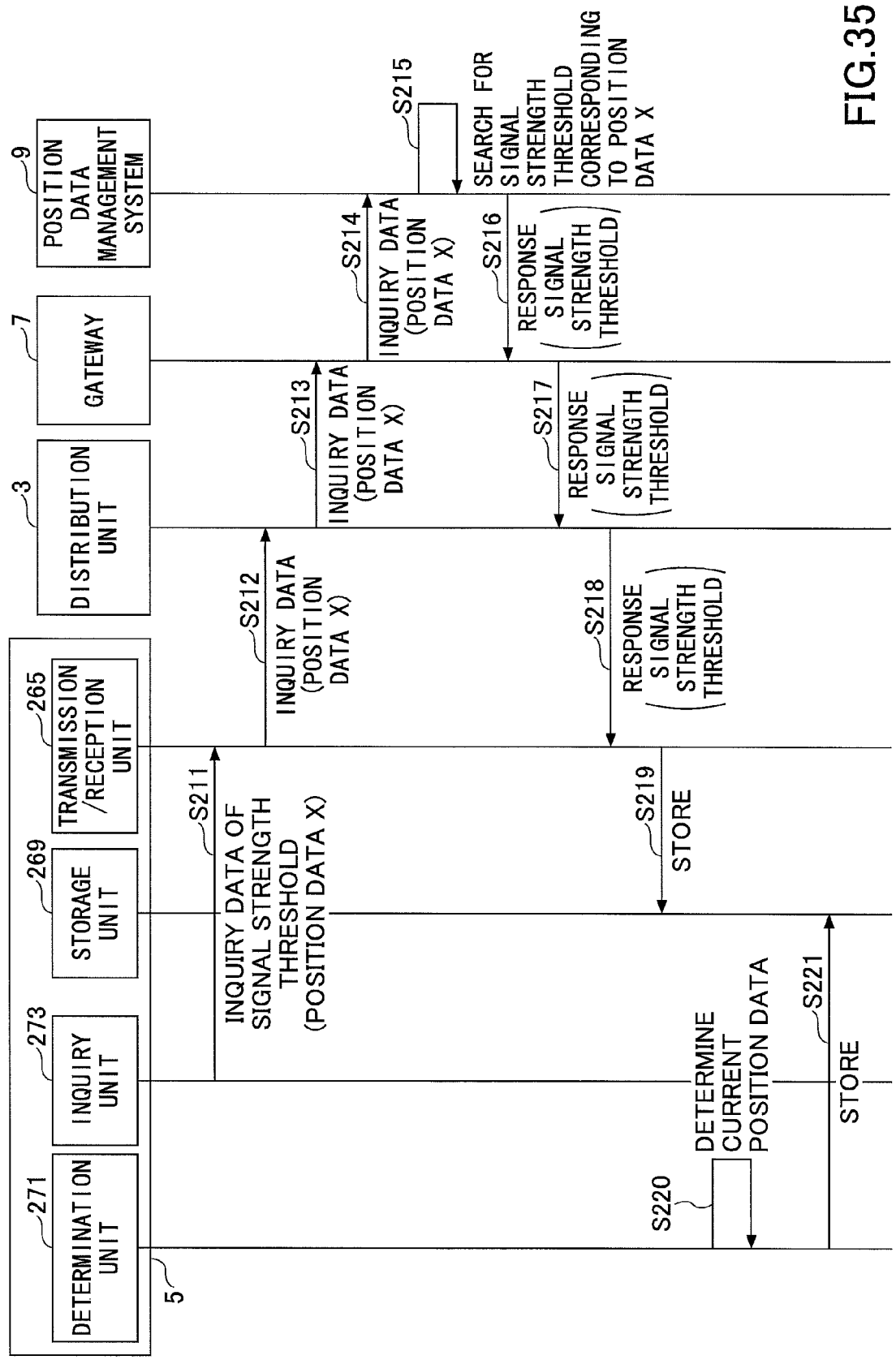
FIG. 35 is a sequence diagram illustrating a process for inquiring for signal strength threshold data according to the second example of the present invention.

FIG. 35 is a sequence diagram illustrating an operation of transmitting inquiry data requesting a signal strength threshold from the communication terminal 5 and receiving the signal strength threshold from the position data management system 9 according to the second example. Although the distribution apparatus 3 and the gateway 7 are illustrated in FIG. 35, the communication terminal 5 and the position data management system 9 may directly communicate by way of a network (e.g., 3G network, wireless LAN) without the intervention of the distribution apparatus 3 and the gateway 7. In performing processes such as communicating inquiry data and signal strength threshold values in FIG. 35, the process of generating a data structure pertaining to communications and the process of converting data by the gateway 7 are substantially the same as those performed in FIGS. 19 and 23 and are not further explained.

In a case where a signal strength threshold value corresponding to the position data X received by the reception unit 261 is not yet received, the inquiry unit 273 of the communication terminal 5 generates inquiry data for obtaining the signal strength threshold value corresponding to the position data X. Then, the inquiry unit 273 transfers the inquiry data to the transmission/reception unit 265 (Step S211). The transmission/reception unit 265 transmits the inquiry data to the distribution apparatus 3 (Step S212). Then, the distribution apparatus 3 transmits the inquiry data to the position data management system 9 by way of the gateway 7 (Steps S213 and S214).

When the transmission/reception unit 291 of the position data management system 9 receives the inquiry data, the search unit 293 searches through the distribution apparatus data I (see, for example, FIG. 31) for a signal strength threshold data corresponding to the position data X included in the inquiry data (Step S215). Then, the position data management system 9 transmits a corresponding signal strength threshold value to the gateway 7 in response to the inquiry data (Step S216). The transmission/reception unit 265 of the communication terminal 5 receives the corresponding signal strength threshold value by way of the distribution apparatus (Steps S217 and S218). Then, the received corresponding signal strength threshold value is stored in the storage unit 269 (Step S219). Then, the determination unit 271 determines the current position data P of the communication terminal 5 as illustrated in Steps S206-S209 of FIG. 34 (Step S220). Then, the determination unit 271 stores the determined current position data P of the communication terminal 5 in the storage unit 269 (Step S221).

Third Example

Next, the third example is described with reference to FIGS. 26-42. In the third example, a signal strength threshold value is distributed together with the position data X from the distribution apparatus 3.

Figure 36:
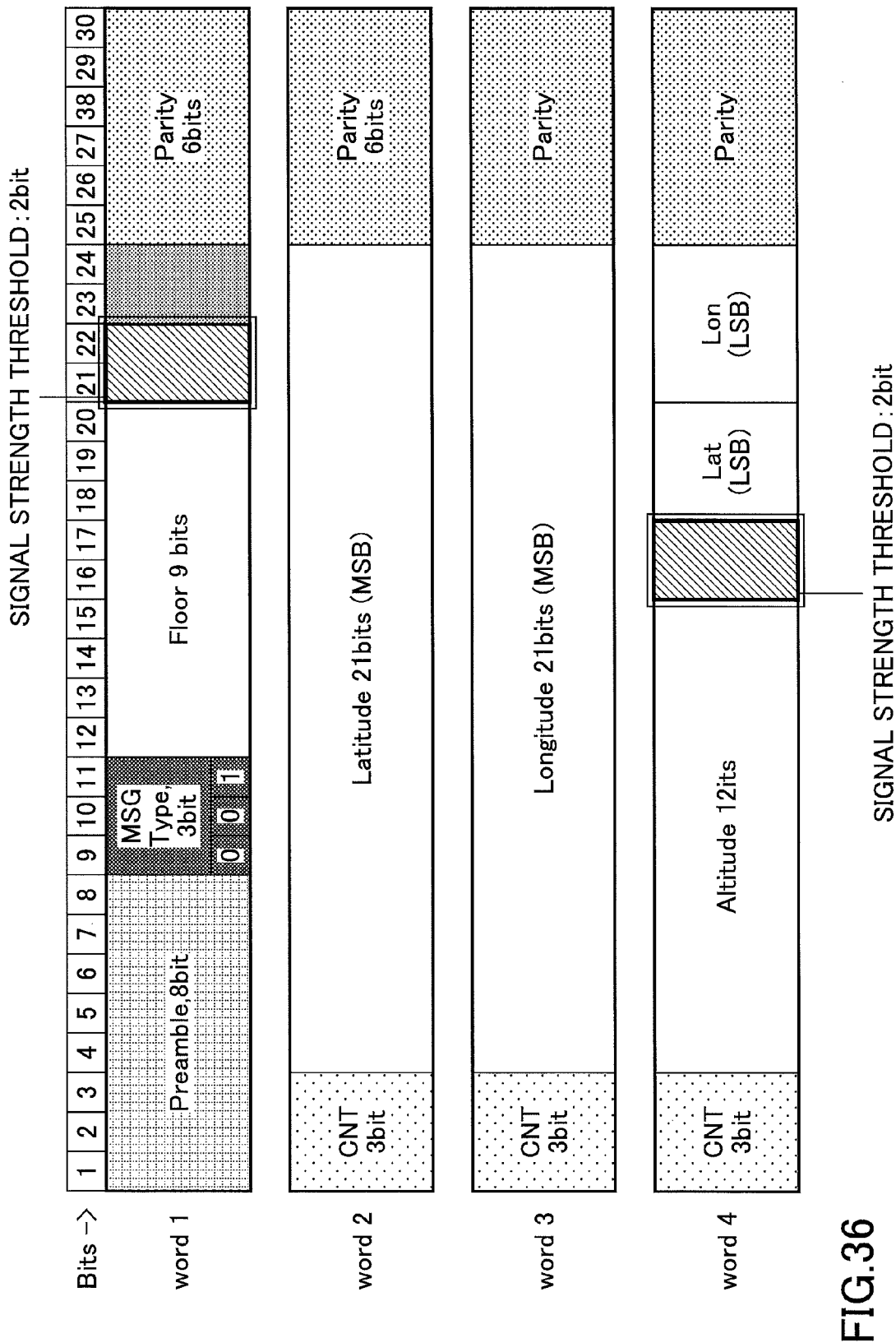
FIG. 36 is a schematic diagram illustrating an example of a frame format (frame structure) according to a third example of the present invention.
Figure 37:
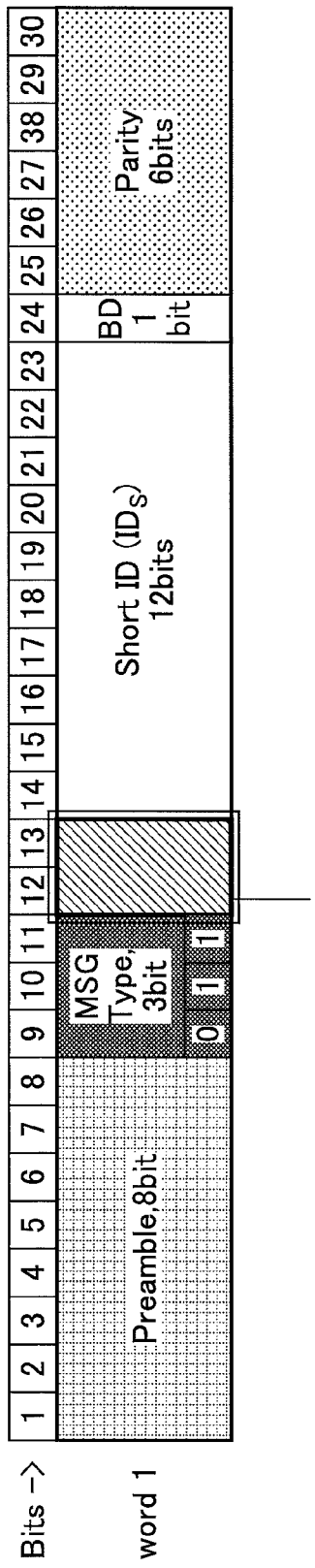
FIG. 37 is a schematic diagram illustrating another example of a frame format (frame structure) according to the third example of the present invention.
Figure 38:
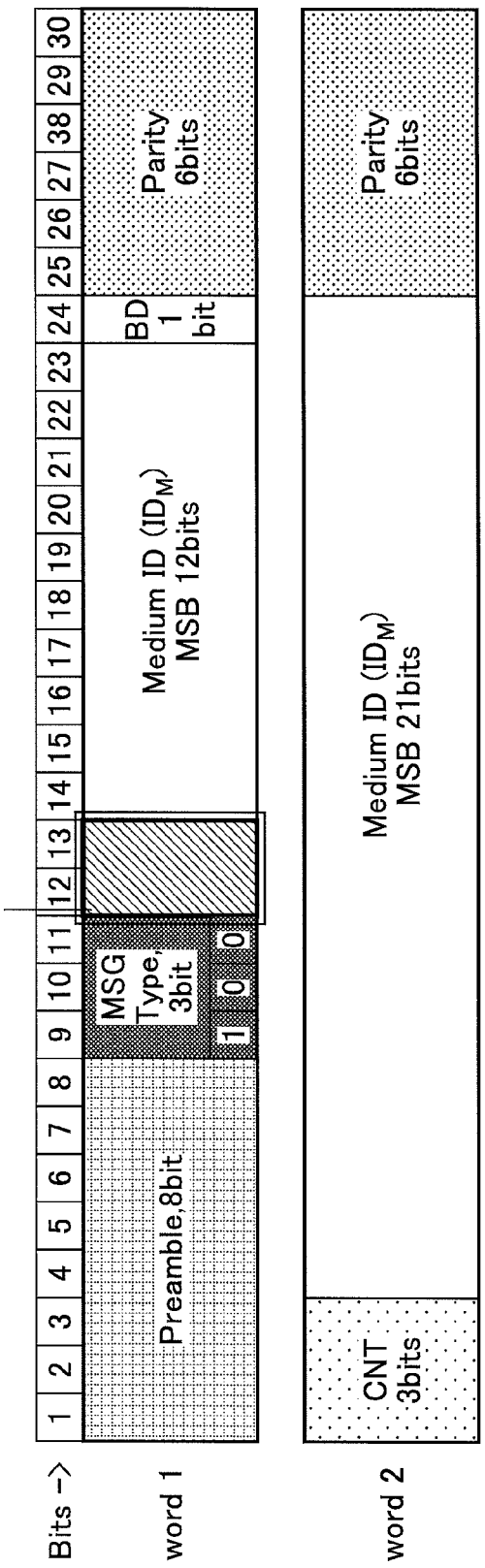
FIG. 38 is a schematic diagram illustrating yet another example of a frame format (frame structure) according to the third example of the present invention.

FIGS. 36-38 illustrates example of frame structures in a case where a signal measurement signal is configured to contain position data X according to the IMES standard along with the two-bit signal strength threshold value illustrated in FIG. 26. As illustrated in FIG. 42, 4 types of MID (Message Type ID) (0, 1, 3, 4) are defined according to the current IMES standard. As illustrated in FIG. 42, a frame format is defined with respect to each MID. FIG. 36 illustrates an example of a frame format having an MID of 1. In the frame format of FIG. 36, "Reserved" spaces totaling to 6 bits are prepared, so that a predetermined signal strength threshold data of 2 bits can be stored in any of the "Reserved" spaces. Similarly, FIG. 37 illustrates an example of a frame format having an MID of 3. In the frame format of FIG. 37, a portion of a "Short ID" space is prepared, so that a predetermined signal strength threshold data of 2 bits can be stored in the portion of the "Short ID". Similarly, FIG. 38 illustrates an example of a frame format having an MID of 4. In the frame format of FIG. 38, a portion of "Medium ID" is prepared, so that a predetermined signal strength threshold data of 2 bits can be stored in the portion of the "Medium ID". With the frame formats illustrated in FIGS. 37 and 38, position data and signal strength control data cannot be included in the same frame. Therefore, the signal strength control data included in the frame of FIG. 37 or FIG. 38 is to be used in combination with position data included in a frame that is transmitted immediately before or immediately after the frame including the signal strength control data. The frame formats illustrated in FIGS. 36-38 are merely examples. Thus, the frame formats may include other values besides the signal strength threshold value of FIG. 26 and express the other values with an arbitrary number of bits.

Figure 39:
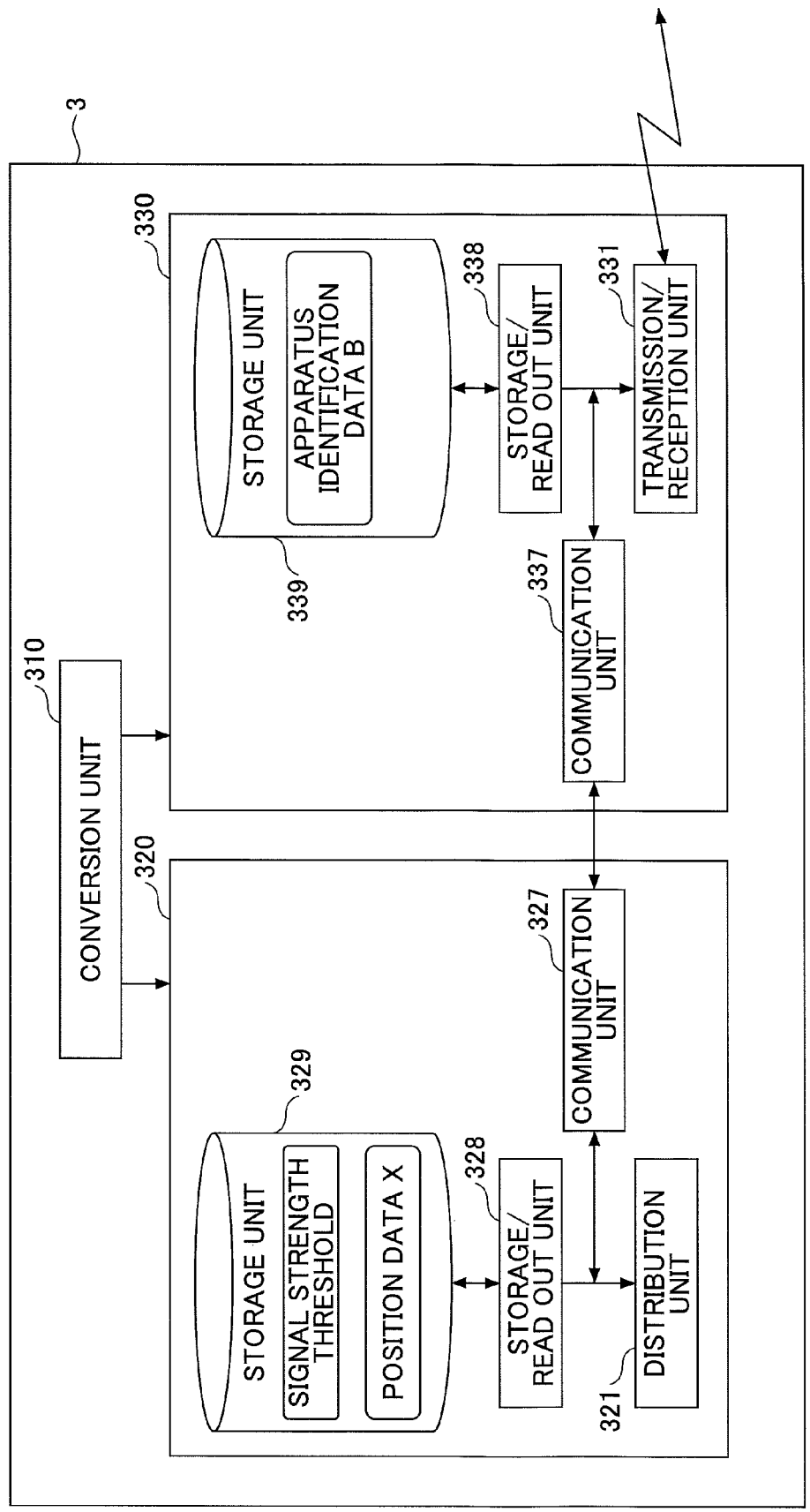
FIG. 39 is a block diagram illustrating functions (function components) of a distribution apparatus according to the third example of the present invention.

Next, a functional configuration of the distribution apparatus 3 according to the third example is described with reference to FIG. 39. Among the elements illustrated in FIG. 39, a conversion unit 310, a distribution unit 321, a communication unit 327, a storage/readout unit 328, a storage unit 329, a transmission/reception unit 331, a communication unit 337, a storage/readout unit 338, and a storage unit 339 corresponds to the conversion unit 10, the distribution unit 21, the communication unit 27, the storage/readout unit 28, the storage unit 29, the transmission/reception unit 31, the communication unit 37, the storage/readout unit 38, and the storage unit 39 of FIG. 14, respectively. The storage unit 329 also stores signal strength threshold values.

The distribution unit 321 has a function of distributing (transmitting) position data X and a signal strength threshold value (read out from the storage unit 329) within a distributable (transmittable) range.

Further, the transmission/reception unit 331 may have a function of receiving data pertaining to the results of determining the current position data P of the communication terminal 5 by the below-described determination unit 371. The received determination results may be transmitted to, for example, the position data management system 9.

Figure 40:
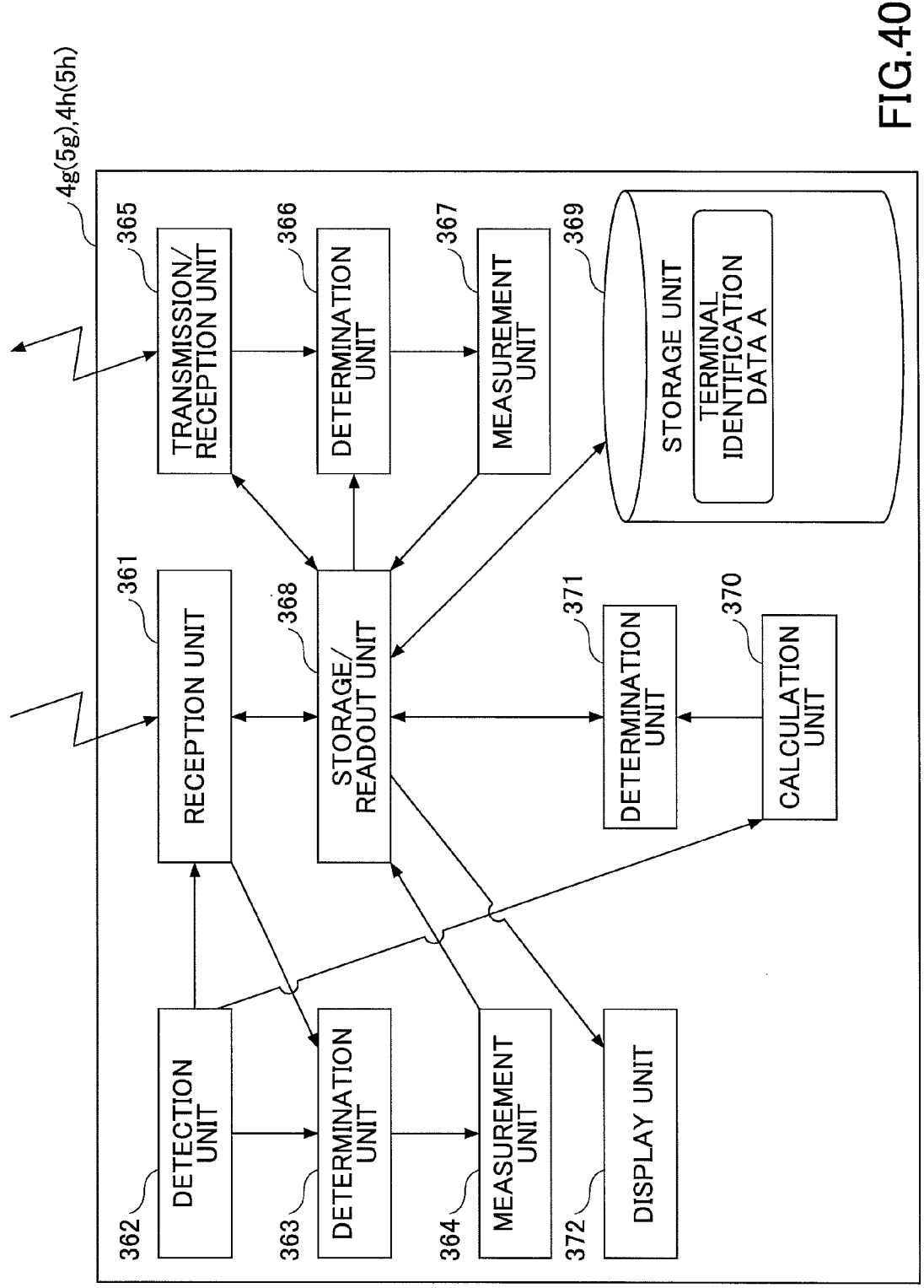
FIG. 40 is a block diagram illustrating functions (function components) of a communication terminal according to the third example of the present invention.

Next, a functional configuration of the communication terminal 5 according to the third example is described with reference to FIG. 40. Among the elements illustrated in FIG. 40, a reception unit 361, a detection unit 362, a determination unit 363, a measurement unit 364, a transmission/reception unit 365, a determination unit 366, a measurement unit 367, a storage/readout unit 368, a storage unit 369, a calculation unit 370, a determination unit 371, a display unit 372 correspond to the reception unit 161, the detection unit 162, the determination unit 163, the measurement unit 164, the transmission/reception unit 165, the determination unit 166, the measurement unit 167, the storage/readout unit 168, the storage unit 169, the calculation unit 170, the determination unit 171, and the display unit 172 of FIG. 28 (first example), respectively.

The reception unit 361 also includes a function of receiving position data X and a signal strength threshold value distributed (transmitted) by the distribution apparatus 3. The storage unit 369 may have a function of temporarily or semi-permanently storing the received position data X and the signal strength threshold value.

Unlike the determination unit 171 of the first example (which uses the signal strength threshold value of the signal strength threshold data S stored in the storage unit 169), the determination unit 371 uses the signal strength threshold value obtained from the distribution apparatus 3 for determining the current position data P.

Figure 41:
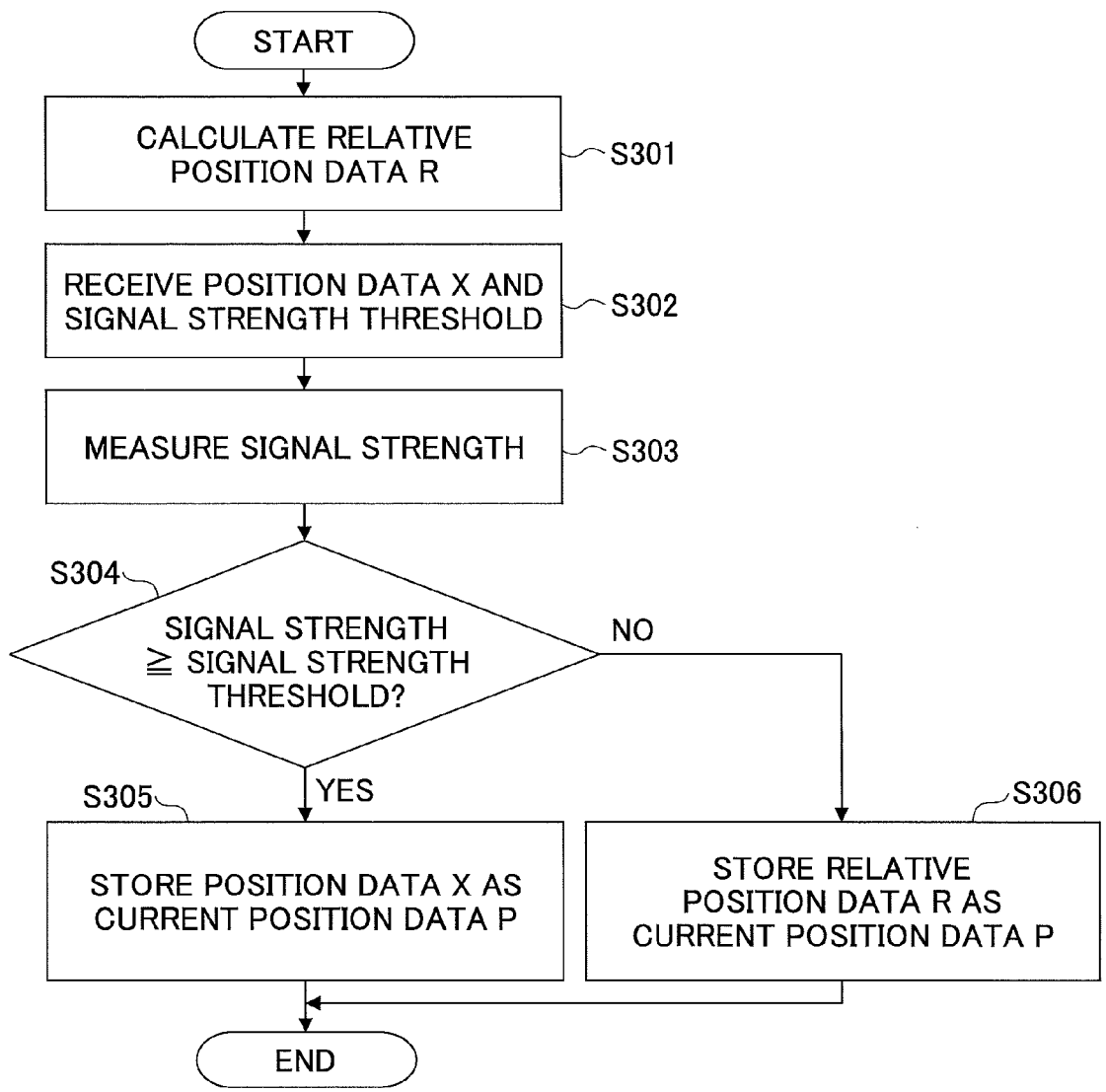
FIG. 41 is a flowchart illustrating an operation for determining a current position data by a communication terminal according to the third example of the present invention.

Next, an operation(s) of the communication terminal 5 according to the third example is described with reference to FIG. 41.

The calculation unit 370 of the communication terminal 5 calculates the relative position data R of the communication terminal R based on movement of the communication terminal 5 detected by the detection unit 362 (Step S301). A given existing PDR method may be used for calculating the relative position data R. Then, the reception unit 361 receives the position data X and the signal strength threshold value from the distribution apparatus 3 (Step S302). Then, the measurement unit 364 measures the signal strength of the position measurement signal containing the position data X (Step S303).

Then, the determination unit 371 compares the signal strength measured in Step S303 and corresponding signal strength threshold data received in Step S302) (Step S304). In a case where the measured signal strength is equal to or greater than the received signal strength threshold value (Yes in Step S304), the determination unit 371 determines that the position data X contained in the position measurement signal received in Step S302 is the current position data P of the communication terminal 5 and stores the position data X as the current position data P of the communication terminal 5 (Step S305). In a case where the measured signal strength is less than the received signal strength threshold value (No in Step S304), the determination unit 371 determines that the relative position data R calculated in Step S301 is the current position data P of the communication terminal 5 and stores the relative position data R as the current position data P of the communication terminal 5 (Step S306).

Then, the display unit 372 displays a map that indicates the position data P as the current position of the communication terminal 5. By successively performing the above-described steps, position data obtained by relative positioning can be appropriately corrected by using position data that is highly reliable among the position data obtained by IMES. For example, if a highly reliable (credible) position data obtained by IMES is acquired in a case of using an application performing navigation of a pedestrian traveling indoors, the current position can be appropriately corrected by using the position data.

Although the third example is described with a case of receiving a single position measurement signal containing position data X, the third example can be applied to a case of receiving multiple position measurement signals that contain position data X. In a case of receiving multiple position measurement signals that contain position data X, the position measurement signal having the strongest signal strength among the multiple position measurement signals may be used.

Hence, with the above-described example, the current position of the communication terminal 5 can be determined by receiving position data from the distribution apparatus 3 and using the signal strength threshold value associated with the position data. In the following example, the current position of the communication terminal 5 can be determined by receiving identification data unique to the distribution apparatus 3 instead of receiving position data from the distribution apparatus 3.

(1) In the fourth example, a distribution apparatus distributes (transmits) identification data by using a given wireless communication method (e.g., ZigBee (registered trademark), Bluetooth (registered trademark), WiFi). A wireless terminal obtains position data and a signal strength threshold value that are associated with the distributed identification data and determines a current position of the wireless terminal.

(2) In the fifth example, the distribution apparatus distributes (transmits) identification data that is pre-assigned to the distribution apparatus by using IMES.

Fourth Example

First, the fourth example is described with reference to FIGS. 43-46. In the fourth example, a distribution apparatus distributes (transmits) identification data by using a given wireless communication method, and a wireless terminal obtains position data and a signal strength threshold value that are associated with the distributed identification data and determines a current position of the wireless terminal.

<Hardware Configuration>

The hardware configuration of the distribution apparatus 3 according to the fourth example is substantially the same as the hardware configuration illustrated in FIG. 5. However, the distribution apparatus 3 of the fourth example does not need to include the position data communication unit 12. On the other hand, the wireless communication unit 13 of distribution apparatus 3 according to the fourth example may perform data communications (transmission/reception) in a given frequency band (e.g., 2 GHz) and is not limited to performing data communications in a frequency band of 920 MHz. Further, the communication circuit 304 of the distribution apparatus 3 according to the fourth example may not only perform data communications with an antenna 304*a* based on a IEEE802.15.4 standard (including ZigBee) but may also perform data communications based on an IEEE802.11 standard (wireless LAN) or an IEEE802.15 standard (Bluetooth).

Further, the hardware configuration of the communication terminal 5 according to the fourth example is substantially the same as the hardware configuration illustrated in FIG. 7. However, the communication terminal 5 of the fourth example does not need to include the control unit 14. Further, in a case where the communication terminal 5 is a mobile phone, the hardware configuration of the communication terminal 5 may be substantially the same as the hardware configuration illustrated in FIG. 10 except that the GPS reception unit 614 need not be included. On the other hand, the wireless communication unit 15 of the communication terminal 5 according to the fourth example has substantially the same configuration as the wireless communication unit 13. Further, the wireless communication unit 15 of the communication terminal 5 according to the fourth example performs data communications with the wireless communication unit 13 of the distribution apparatus 3 by using the same frequency band used by the wireless communication unit 13.

The hardware configurations of the gateway 7 and the position data management system 9 according to the fourth example are substantially the same as the hardware configurations illustrated in FIGS. 11 and 12, respectively.

<Function>

Figure 44:
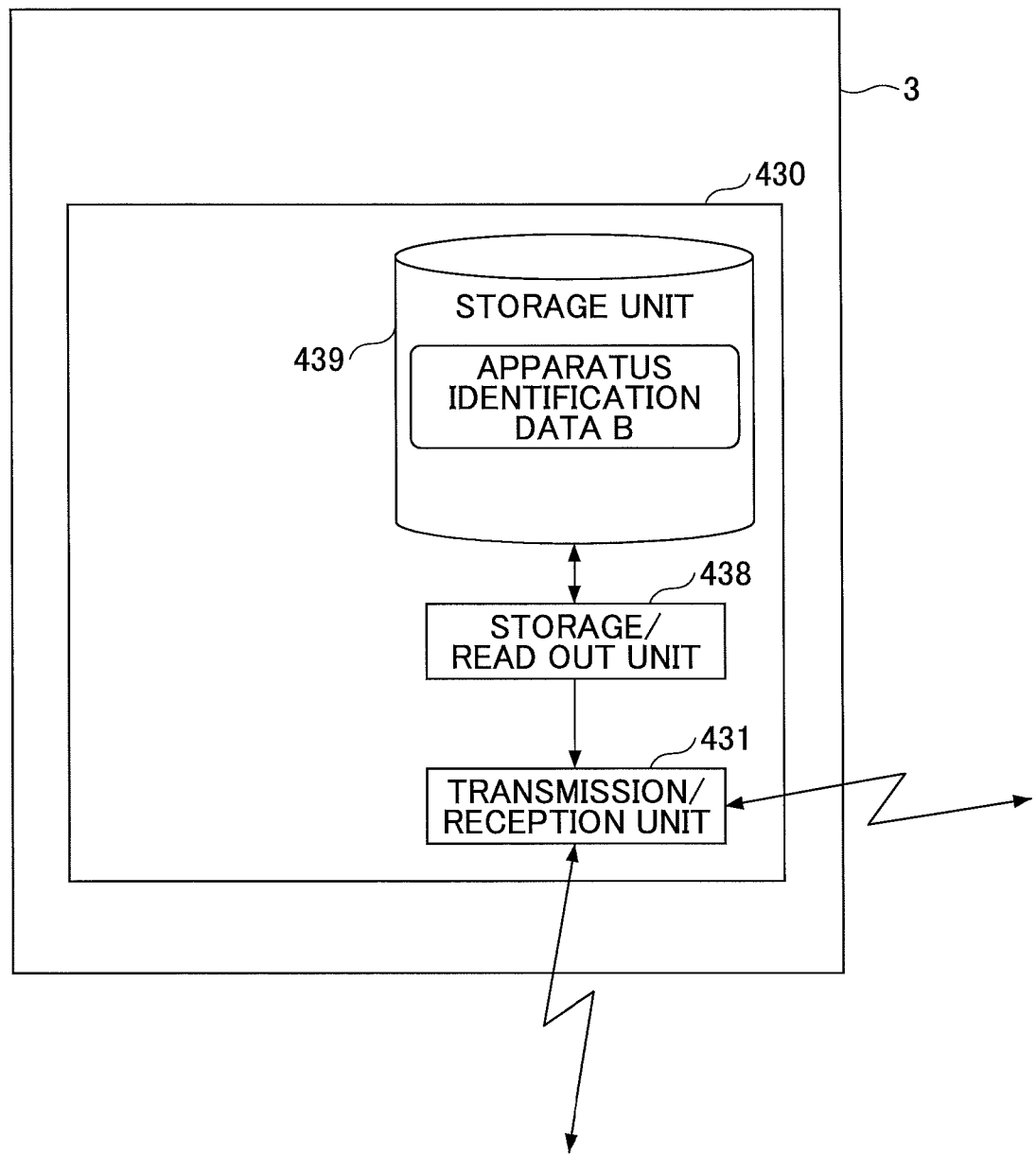
FIG. 44 is a block diagram illustrating functions (function components) of a distribution apparatus according to the fourth example of the present invention.

FIG. 44 is a block diagram illustrating functions (function components) of the distribution apparatus 3 according to the fourth example. Among the elements illustrated in FIG. 44, a storage/readout unit 438 and a storage unit 439 included in a wireless communication control unit 430 correspond to the storage/readout unit 38 and the storage unit 39 included in the wireless communication control unit 30 of FIG. 14, respectively.

The transmission/reception unit 431 according to the fourth example transmits radio waves in a predetermined range in accordance with the communication method used for performing data communications. The radio waves transmitted by the transmission/reception unit 431 includes apparatus identification data B stored in the storage unit 439. For example, in a case where the wireless communication unit 13 of the distribution apparatus 3 performs wireless data communications based on the IEEE802.15.4 standard or the IEEE802.11 standard, the transmission/reception unit 431 transmits radio waves including apparatus identification data B (e.g., MAC address) as a beacon in a predetermined range. Further, in a case where the wireless communication unit 13 of the distribution apparatus 3 performs wireless data communications based on the IEEE802.15 standard, the transmission/reception unit 431, in response to an inquiry from the communication terminal 5, transmits radio waves including apparatus identification data B (e.g., apparatus name or MAC address) in a predetermined range.

Figure 45:
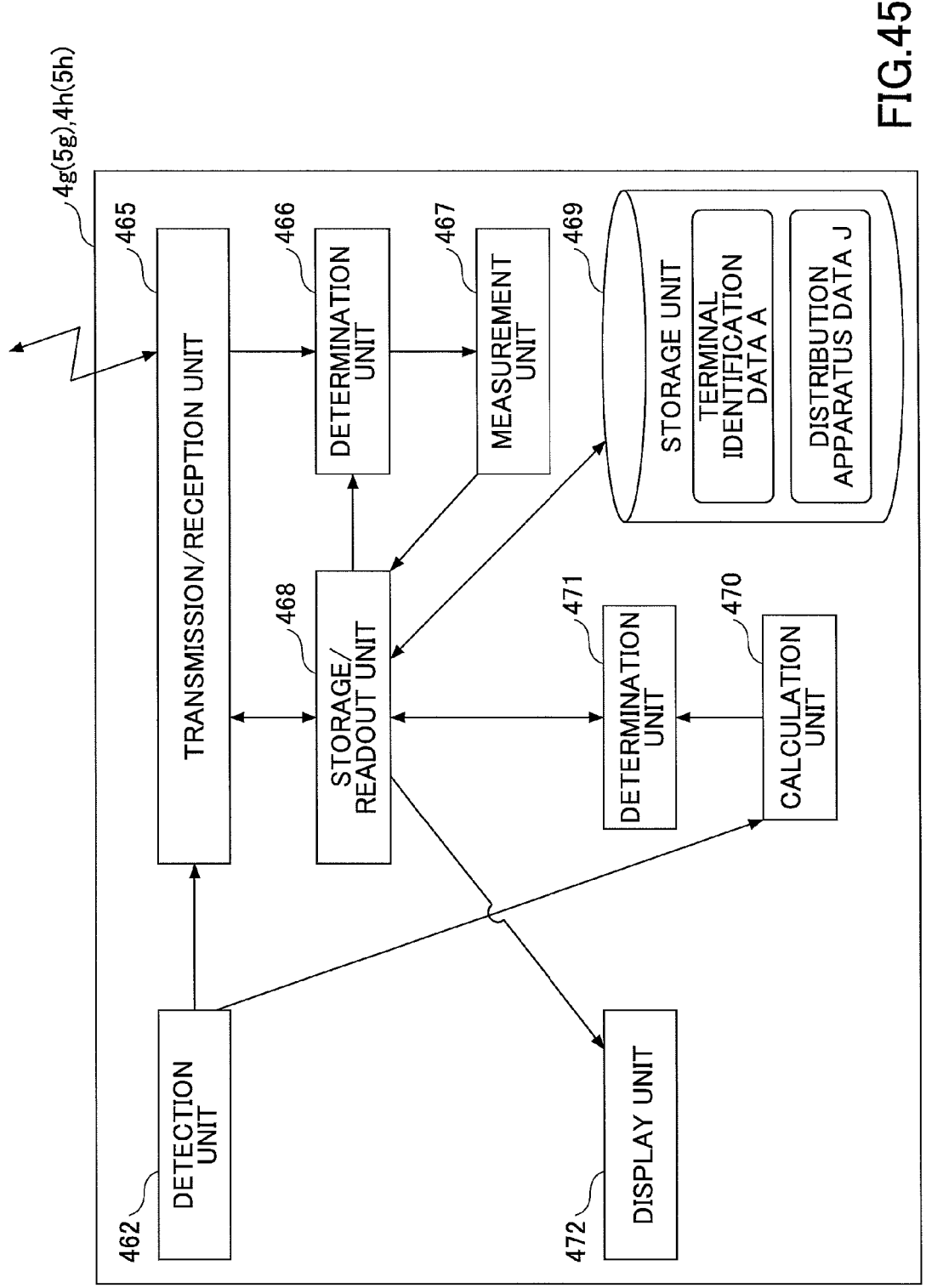
FIG. 45 is a block diagram illustrating functions (function components) of a communication terminal according to the fourth example of the present invention.

FIG. 45 is a block diagram illustrating functions (function components) of the communication terminal 5 according to the fourth example. Among the elements illustrated in FIG. 45, a transmission/reception unit 465, a determination unit 466, a measurement unit 467, a storage/readout unit 468, a storage unit 469, and a display unit 472 correspond to the transmission/reception unit 165, the determination unit 166, the measurement unit 167, the storage/readout unit 168, the storage unit 169, and the display unit 172 of FIG. 28, respectively.

Instead of storing the signal strength threshold data S, the storage unit 469 of the fourth example stores distribution apparatus data J including the following data items.

<Distribution Apparatus Data J>

Apparatus identification data B: Apparatus identification data stored in the storage unit 439 of the distribution apparatus 3 (e.g., MAC address).

Position Data X (Longitude, Latitude, Floor No., Building No.): Position data indicating a position at which the distribution apparatus 3 is installed.

Signal strength threshold value: Threshold of signal strength of signal distributed (transmitted) by the distribution apparatus 3.

The detection unit 462 of the fourth example detects data pertaining to, for example, acceleration, angular rate, and direction (inclination (tilt)) and sends the detected data to the calculation unit 470.

Similar to the calculation unit 170 of FIG. 28, the calculation unit 470 of the fourth example calculates the current position of the communication terminal 5 based on the data sent from the detection unit 462. The calculation unit 470 calculates the current position by using a given existing PDR method.

The determination unit 471 of the fourth example searches through the distribution apparatus data J stored in the storage unit 469 and uses the apparatus identification data B obtained by the transmission/reception unit 465 as a key to identify corresponding position data X and a corresponding signal strength threshold value T that are associated to the apparatus identification data B. Then, the determination unit 471 compares the signal strength measured by the measurement unit 467 and the identified signal strength threshold data T. In a case where the measured signal strength is equal to or greater than the signal strength threshold value T, the determination unit 471 determines that the position data X identified with the distribution apparatus data J is the current position data P of the communication terminal 5. In a case where the measured signal strength is less than the signal strength threshold value T, the determination unit 471 determines that the relative position data R calculated by relative positioning is the current position data P of the communication terminal 5. Then, the determination unit 471 stores the determined current position data P of the communication terminal 5 in the storage unit 469.

<Operation Example>

Next, an operation(s) of the communication terminal 5 according to the fourth example is described with reference to FIG. 46.

The calculation unit 470 of the communication terminal 5 calculates the relative position data R of the communication terminal 5 based on movement of the communication terminal 5 detected by the detection unit 462 (Step S401). A given existing PDR method may be used for calculating the relative position data R. Then, the transmission/reception unit 465 receives a wireless signal (which contains apparatus identification data B) distributed (transmitted) from the distribution apparatus 3 (Step S402). Then, the measurement unit 467 measures the signal strength of the wireless signal containing the apparatus identification data B (Step S402). Then, the determination unit 471 refers to the distribution apparatus data J (see, for example, FIG. 27) stored in the storage unit 469 and reads out a position data X and a signal strength threshold value T corresponding to the distribution apparatus data J (Step S404).

Then, the determination unit 471 compares the signal strength measured in Step S402 and corresponding signal strength threshold value T read out in Step S404 (Step S405). In a case where the measured signal strength is equal to or greater than the read out signal strength threshold value T (Yes in Step S405), the determination unit 471 determines that the position data X read out in Step S404 is the current position data P of the communication terminal 5 and stores the position data X as the current position data P of the communication terminal 5 (Step S406). In a case where the measured signal strength is less than the read out signal strength threshold value T (No in Step S405), the determination unit 471 determines that the relative position data R calculated in Step S401 is the current position data P of the communication terminal 5 and stores the relative position data R as the current position data P of the communication terminal 5 (Step S407).

Then, the display unit 472 displays a map that indicates the position data P as the current position of the communication terminal 5. By successively performing the above-described steps, position data obtained by relative positioning can be appropriately corrected by using highly reliable absolute position data. In the fourth example, obtaining of absolute position data and determining reliability (credibility) of position data can be facilitated by associating identification data contained in a wireless signal (e.g., beacon signal) with position data and a signal strength threshold value.

Although the fourth example is described with a case of receiving a single wireless signal from the distribution apparatus 3, the fourth example can be applied to a case of receiving multiple wireless signals from the distribution apparatus 3. In a case of receiving multiple wireless signals from the distribution apparatus 3, the wireless signal having the strongest signal strength among the multiple wireless signals may be used.

Figure 46:
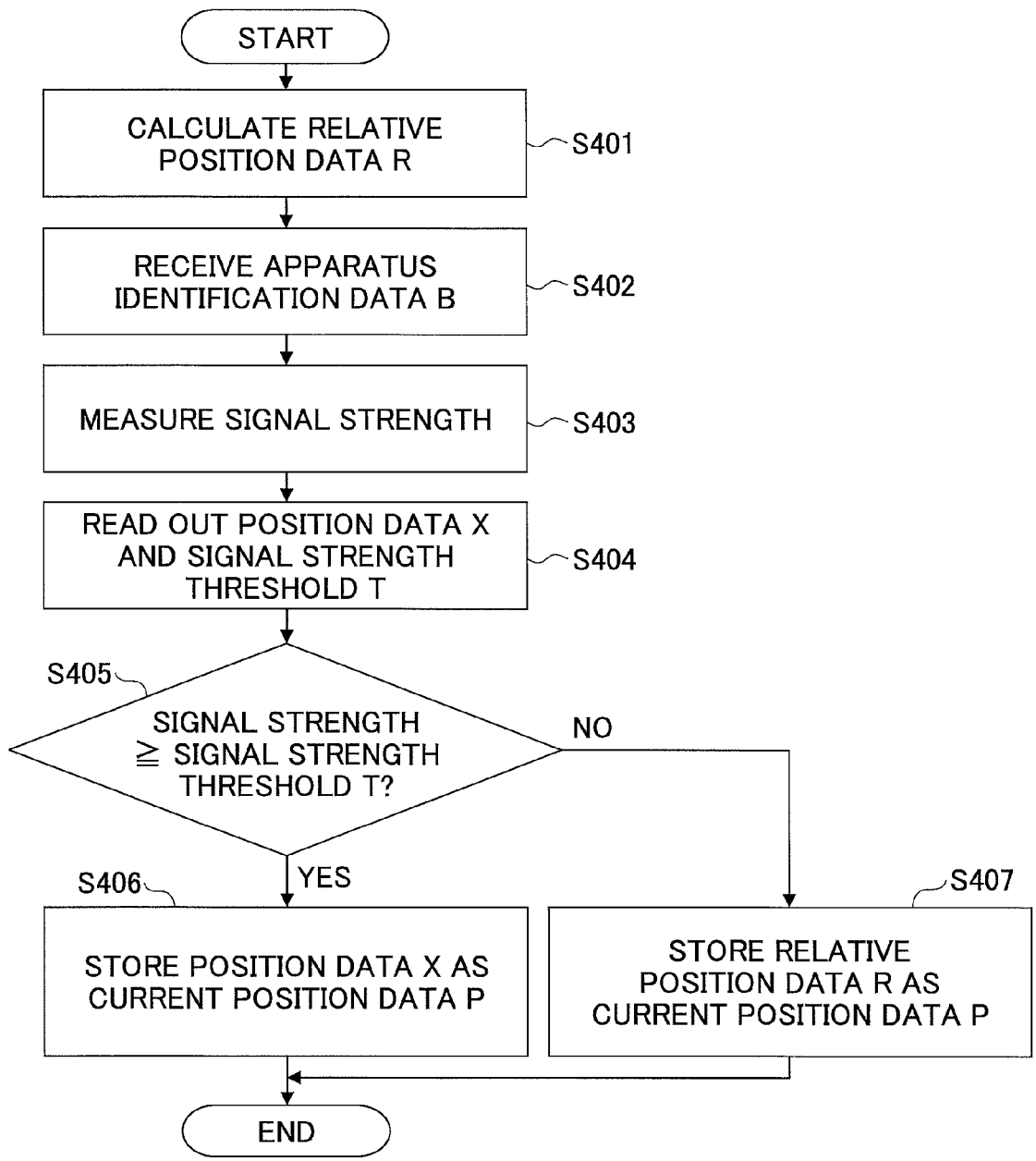
FIG. 46 is a flowchart illustrating an operation for determining a current position data by a communication terminal according to the fourth example of the present invention.

In the operation of FIG. 46, the current position data P is determined based on a single wireless signal received from a single distribution apparatus 3. Alternatively, as illustrated in the operation of FIG. 30, the position data X may be determined as the current position data P in a case where two or more wireless signals are consecutively (continuously) received from the same distribution apparatus 3. Thus, in a case where wireless signals having signal strengths equal to or greater than a signal strength threshold value are not consecutively (continuously) received from the same distribution apparatus 3, the communication terminal 5 stores the relative position data R as the current position data P. Therefore, the position data X corresponding to the position of the distribution apparatus 3 is used as the current position data P only in a state where wireless signals can be steadily (consistently) received (e.g., a state where the communication terminal 5 is not moving). Thus, the reliability (credibility) of the absolute position data can be increased.

In the fourth example, the distribution apparatus data J is stored beforehand in the storage unit 469 of the communication terminal 5. Alternatively, the distribution apparatus data J may be stored in, for example, the position data management system 9, so that the distribution apparatus data J can be referred by communicating with the position data management system 9. In this case, the determination unit 471 of the communication terminal 5 may transmit the apparatus identification data B to the position data management system 9 by way of the transmission/reception unit 465 and obtain the position data X and the signal strength threshold value T corresponding to the apparatus identification data B. Thereby, the distribution apparatus data J need not be stored in the communication terminal 5 beforehand.

Fifth Example

Next, the fifth example is described with reference to FIGS. 47-52. In the fifth example, a distribution apparatus distributes (transmits) identification data to a wireless terminal. Then, the wireless terminal obtains position data and a signal strength threshold value associated to the identification data beforehand, and determines the current position of the wireless terminal.

<Hardware Configuration>

The hardware configurations of the distribution apparatus 3, the communication terminal 5, the gateway 7, and the position data management system 9 according to the fifth example are substantially the same as those illustrated in FIGS. 5, 7, 10, 11, and 12, respectively.

<Function>

Figure 48:
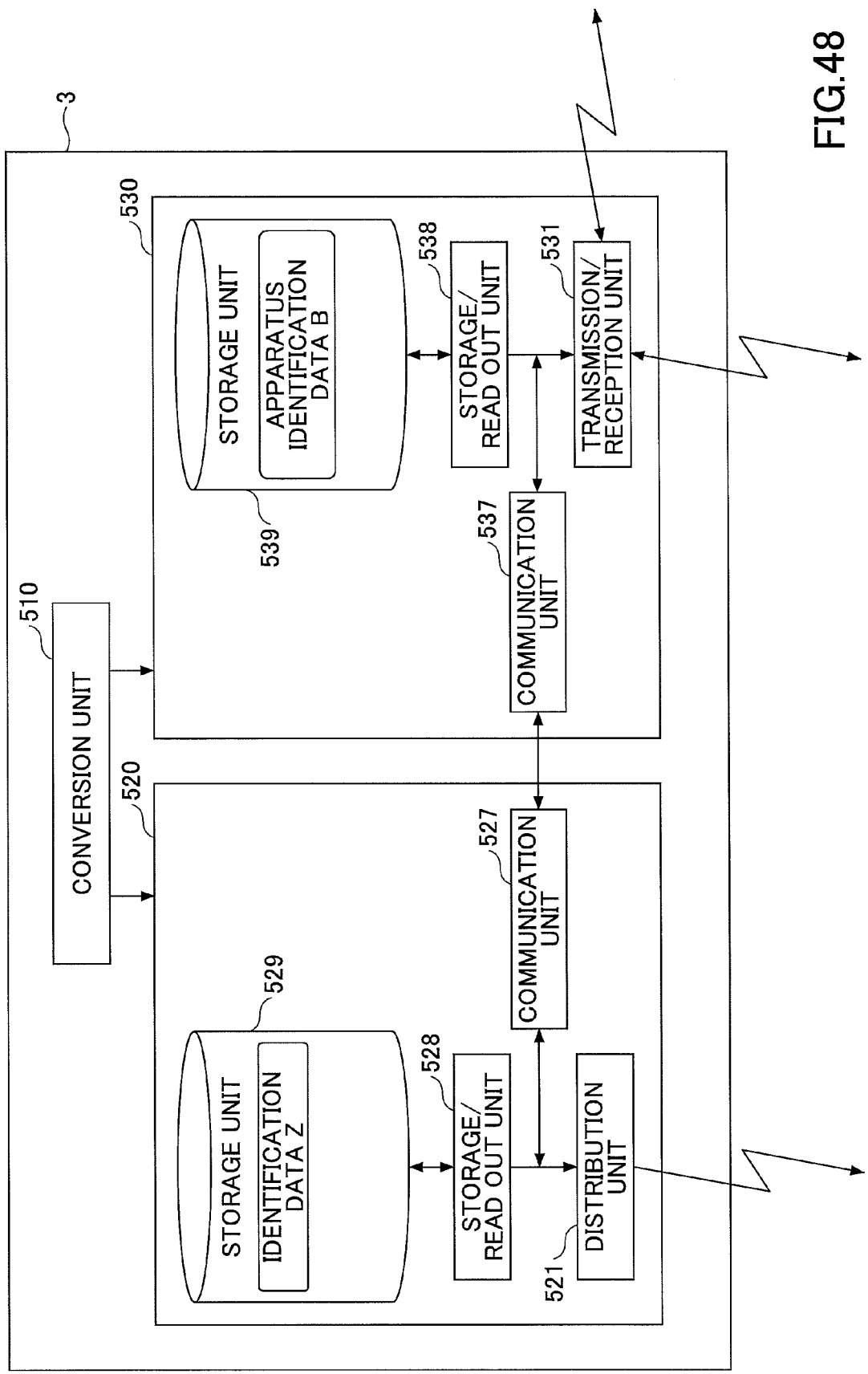
FIG. 48 is a block diagram illustrating functions (function components) of a distribution apparatus according to the fifth example of the present invention.

FIG. 48 is a block diagram illustrating functions (function components) of the distribution apparatus 3 according to the fifth example. Among the elements illustrated in FIG. 48, a conversion unit 510, a distribution unit 521, a communication unit 527, a storage/readout unit 528, a storage unit 529, a transmission/reception unit 531, a communication unit 537, a storage/readout unit 538, and a storage unit 539 corresponds to the conversion unit 310, the distribution unit 321, the communication unit 327, the storage/readout unit 328, the storage unit 329, the transmission/reception unit 331, the communication unit 337, the storage/readout unit 338, and the storage unit 339 of FIG. 39 (third example), respectively. Instead of storing the position data X, the storage unit 529 stores identification data Z.

Figure 51:
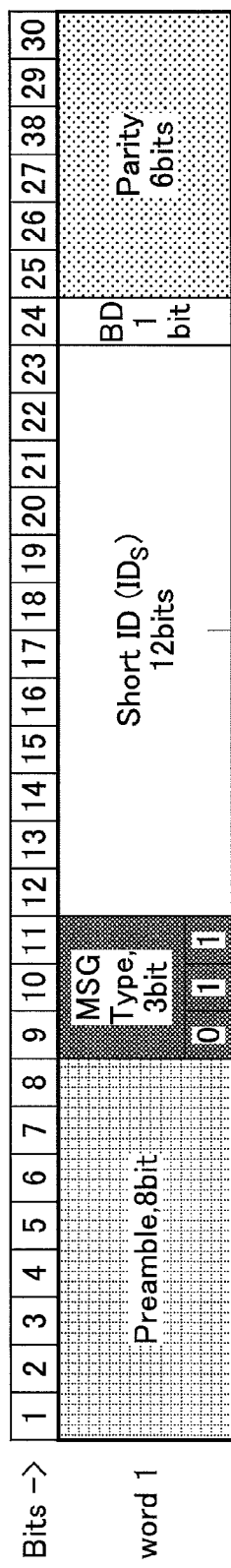
FIG. 51 is a schematic diagram illustrating an example of a frame format (frame structure) according to the fifth example of the present invention.
Figure 52:
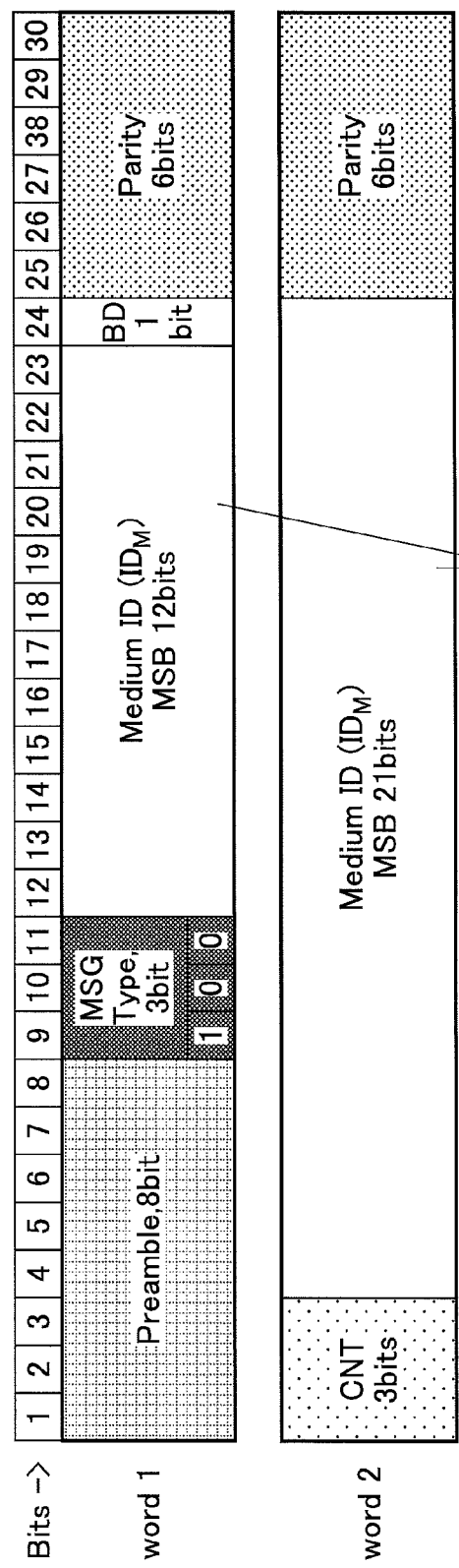
FIG. 52 is a schematic diagram illustrating an example of a frame format (frame structure) according to the fifth example of the present invention.

The identification data Z is identification data stored as a Short ID or a Medium ID of a frame format according to the IMES standard (i.e. frame format having an MID of 3 or a frame format having an MID of 4). FIG. 51 illustrates an example of a frame structure of a frame format having an MID of 3. FIG. 52 illustrates an example of a frame structure of a frame format having an MID of 4. In a case where the identification data Z is a Short ID, the length of the identification data Z may be, for example 12 bits. In a case where the identification data Z is a Medium ID, the length of the identification data Z may be for example, 33 bits. The distribution unit 521 of the fifth example generates a frame structure (frame format having an MID of 3 or 4) according to the IMES standard to distribute (transmit) a position measurement signal containing a unique identification data Z in a predetermined range.

Figure 49:
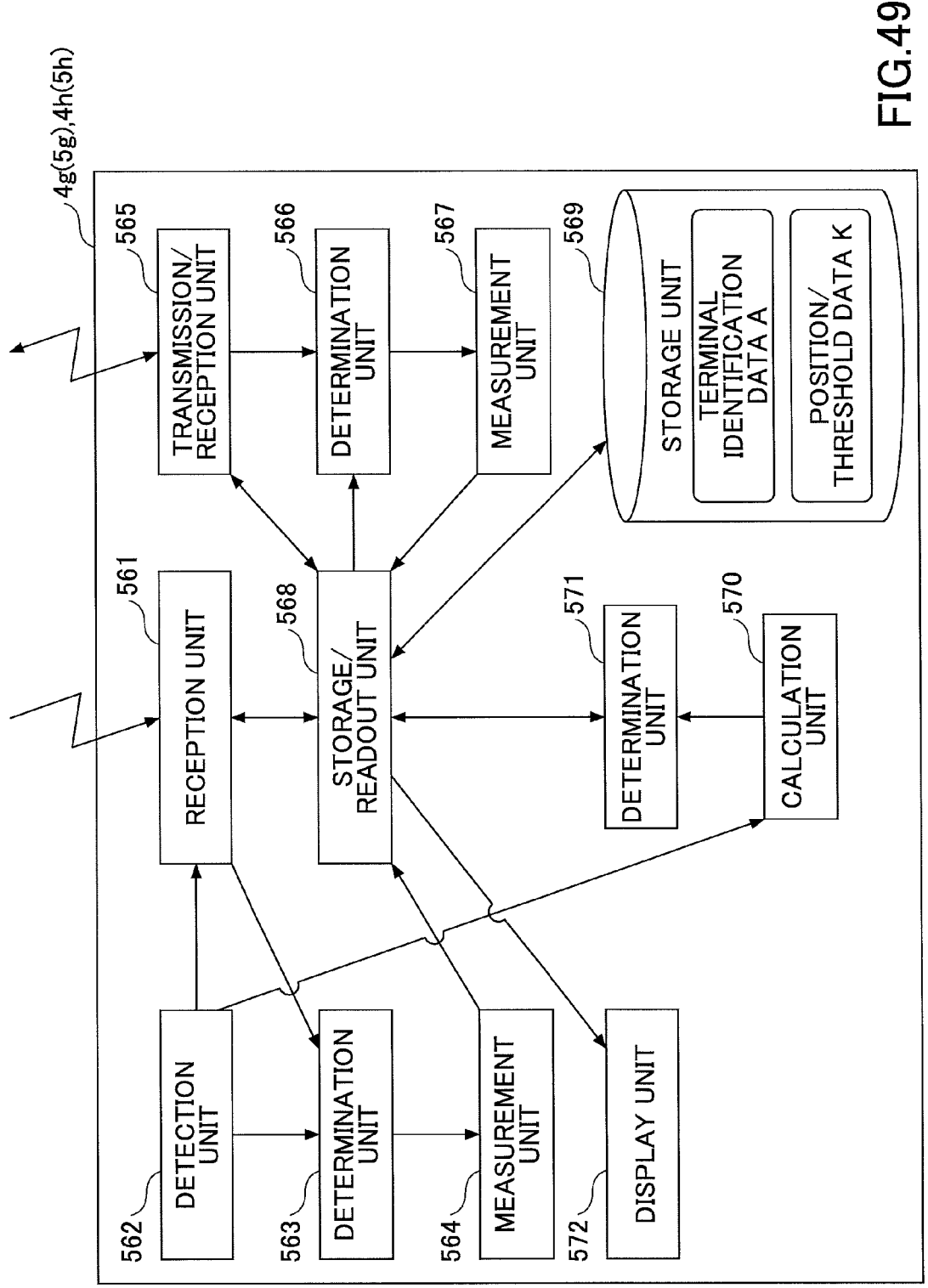
FIG. 49 is a block diagram illustrating functions (function components) of a communication terminal according to the fifth example of the present invention.

Next, a functional configuration of the communication terminal 5 according to the fifth example is described with reference to FIG. 49. Among the elements illustrated in FIG. 49, a reception unit 561, a detection unit 562, a determination unit 563, a measurement unit 564, a transmission/reception unit 565, a determination unit 566, a measurement unit 567, a storage/readout unit 568, a storage unit 569, a calculation unit 570, and a display unit 572 correspond to the reception unit 361, the detection unit 362, the determination unit 363, the measurement unit 364, the transmission/reception unit 365, the determination unit 366, the measurement unit 367, the storage/readout unit 368, the storage unit 369, the calculation unit 370, and the display unit 372 of FIG. 40 (third example), respectively.

Instead of storing the signal strength threshold data S, the storage unit 569 of the fifth example stores position/threshold data K including the following data items. FIG. 47 is a schematic diagram illustrating a table that stores the position/threshold data K.

<Position/Threshold Data K>

Identification data Z: Short ID or Medium ID contained in a position measurement signal transmitted (distributed) from the distribution apparatus 3

Position Data X (Longitude, Latitude, Floor No., Building No.): Position data indicating a position at which the distribution apparatus 3 is installed.

Signal strength threshold value T: Threshold of signal strength of signal transmitted by the distribution apparatus 3.

The determination unit 571 of the fifth example searches through the position/threshold data K stored in the storage unit 569 and uses the identification data Z obtained by the reception unit 531 as a key to identify corresponding position data X and a corresponding signal strength threshold value T that are associated to the identification data Z.

Then, the determination unit 571 compares the signal strength measured by the measurement unit 564 and the identified signal strength threshold value T. In a case where the measured signal strength is equal to or greater than the signal strength threshold value T, the determination unit 571 determines that the position data X identified with the position/threshold data K is the current position data P of the communication terminal 5. In a case where the measured signal strength is less than the signal strength threshold value T, the determination unit 571 determines that the relative position data R calculated by relative positioning is the current position data P of the communication terminal 5.

Then, the determination unit 571 stores the determined current position data P of the communication terminal 5 in the storage unit 569.

<Operation Example>

Next, an operation(s) of the communication terminal 5 according to the fifth example is described with reference to FIG. 50.

The calculation unit 570 of the communication terminal 5 calculates the relative position data R of the communication terminal 5 based on movement of the communication terminal 5 detected by the detection unit 562 (Step S501). A given existing PDR method may be used for calculating the relative position data R. Then, the reception unit 561 receives a position measurement signal (which contains identification data Z) distributed (transmitted) from the distribution apparatus 3 (Step S502). Then, the measurement unit 564 measures the signal strength of the position measurement signal containing the identification data Z (Step S503). Then, the determination unit 571 refers to the position/threshold data K (see, for example, FIG. 47) stored in the storage unit 569 and reads out a position data X and a signal strength threshold value T corresponding to the identification data Z received in Step S502 (Step S504).

Then, the determination unit 571 compares the signal strength measured in Step S503 and the signal strength threshold value T read out in Step S504 (Step S505). In a case where the measured signal strength is equal to or greater than the read out signal strength threshold value T (Yes in Step S505), the determination unit 571 determines that the position data X read out in Step S504 is the current position data P of the communication terminal 5 and stores the position data X as the current position data P of the communication terminal 5 (Step S506). In a case where the measured signal strength is less than the read out signal strength threshold value T (No in Step S505), the determination unit 571 determines that the relative position data R calculated in Step S501 is the current position data P of the communication terminal 5 and stores the relative position data R as the current position data P of the communication terminal 5 (Step S507).

Then, the display unit 572 displays a map that indicates the position data P as the current position of the communication terminal 5. By successively performing the above-described steps, position data obtained by relative positioning can be appropriately corrected by using highly reliable absolute position data. In the fifth example, obtaining of absolute position data and determining reliability (credibility) of position data can be achieved by associating identification data contained in a position measurement signal using IMES (which can be received by a conventional GPS receiver) with position data and a signal strength threshold value.

Although the fifth example is described with a case of receiving a single position measurement signal from the distribution apparatus 3, the fifth example can be applied to a case of receiving multiple position measurement signals from multiple distribution apparatuses 3. In a case of receiving multiple position measurement signals from the multiple distribution apparatuses 3, the position measurement signal having the strongest signal strength among the multiple position measurement signals may be used.

Figure 50:
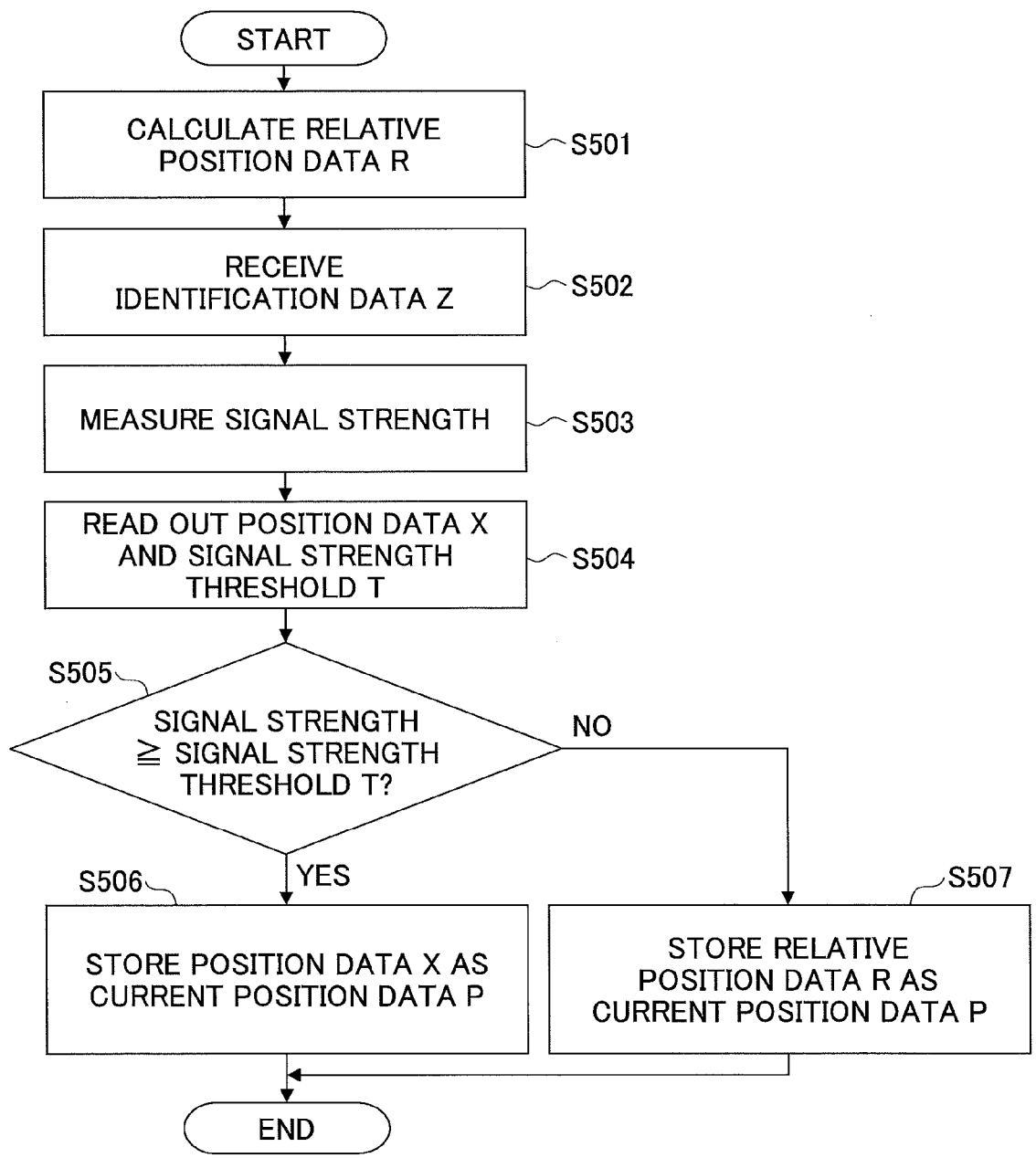
FIG. 50 is a flowchart illustrating an operation for determining a current position data by a communication terminal according to the fifth example of the present invention.

In the operation of FIG. 50, the current position data P is determined based on a single position measurement signal received from a single distribution apparatus 3. Alternatively, as illustrated in the operation of FIG. 30, the position data X may be determined as the current position data P in a case where two or more position measurement signals are consecutively (continuously) received from the same distribution apparatus 3. Thus, in a case where position measurement signals having signal strengths equal to or greater than a signal strength threshold value are not consecutively (continuously) received from the same distribution apparatus 3, the communication terminal 5 stores the relative position data R as the current position data P. Therefore, the position data X corresponding to the position of the distribution apparatus 3 is used as the current position data P only in a state where position measurement signals can be steadily (consistently) received (e.g., a state where the communication terminal 5 is not moving). Thus, the reliability (credibility) of the absolute position data can be increased.

In the fifth example, the position/threshold data K is stored beforehand in the storage unit 569 of the communication terminal 5. Alternatively, the position/threshold data K may be stored in, for example, the position data management system 9, so that the position/threshold data K can be referred by communicating with the position data management system 9. In this case, the determination unit 571 of the communication terminal 5 may transmit the identification data Z to the position data management system 9 by way of the transmission/reception unit 565 and obtain the position data X and the signal strength threshold value T corresponding to the identification data Z. Thereby, the position/threshold data K need not be stored in the communication terminal 5 beforehand.

The present invention is not limited to the specifically disclosed embodiments, and variations and modifications may be made without departing from the scope of the present invention.

The present application is based on and claims benefit of priority of Japanese Priority Application Nos. 2012-226947 and 2013-112081 filed on Oct. 12, 2012 and May 28, 2013, respectively, the entire contents of which are hereby incorporated by reference.

What is claimed is:

1. A data processing system comprising:
a communication terminal; and
at least one or more distribution apparatuses configured to distribute a wireless signal to the communication terminal;
wherein each of the at least one or more distribution apparatuses distributes a wireless signal that contains position data that indicates a position of the distribution apparatus;
wherein the communication terminal stores beforehand in the communication terminal a predetermined threshold value with respect to a signal strength of a wireless signal distributed by a distribution apparatus, compares the predetermined threshold value and a signal strength of one wireless signal that is distributed from a first distribution apparatus among the at least one or more distribution apparatuses, and has a determination unit that determines that position data obtained from a relative position measuring method is indicative of a current position of the communication terminal when the strength of the one wireless signal is below the predetermined threshold value; and determines that position data received from the first distribution apparatus is indicative of the current position of the communication terminal when (i) 2 or more wireless signals containing position data are consecutively received from the first distribution apparatus, and (ii) when the signal strengths of the 2 or more wireless signals are above the predetermined threshold value.

* * * * *